US012726662B2

(12) United States Patent
Yu

(10) Patent No.: US 12,726,662 B2
(45) Date of Patent: Sep. 1, 2026

(54) IMAGE AND VIDEO DATA PROCESSING METHOD AND SYSTEM

(71) Applicant: Jianghong Yu, Beijing (CN)

(72) Inventor: Jianghong Yu, Beijing (CN)

( * ) Notice: Subject to any disclaimer, the term of this patent is extended or adjusted under 35 U.S.C. 154(b) by 113 days.

(21) Appl. No.: 18/945,467

(22) Filed: Nov. 12, 2024

(65) Prior Publication Data

US 2025/0071339 A1 Feb. 27, 2025

Related U.S. Application Data

(63) Continuation-in-part of application No. 17/525,900, filed on Nov. 13, 2021, now Pat. No. 12,184,844, which is a continuation-in-part of application No. 17/384,805, filed on Jul. 26, 2021, now Pat. No. 11,503,306, which is a continuation-in-part of application No. 17/324,103, filed on May 19, 2021, now Pat. No. 11,528,488, which is a continuation-in-part of application No. 17/086,407, filed on Nov. 1, 2020, now Pat. No. 11,064,207.

(30) Foreign Application Priority Data

| | | |
|---|---|---|
| Apr. 9, 2020 | (CN) | 202010276253.7 |
| Jun. 5, 2020 | (CN) | 202010504349.4 |
| Aug. 20, 2020 | (CN) | 202010841245.2 |
| Jan. 5, 2021 | (CN) | 202110008566.9 |
| Mar. 1, 2021 | (CN) | 202110225315.6 |

(51) Int. Cl.
*H04N 19/80* (2014.01)
*H04N 19/172* (2014.01)

(52) U.S. Cl.
CPC ........... *H04N 19/80* (2014.11); *H04N 19/172* (2014.11)

(58) Field of Classification Search
CPC .. H04N 19/117; H04N 19/159; H04N 19/172; H04N 19/86
See application file for complete search history.

(56) References Cited

U.S. PATENT DOCUMENTS

2003/0039396 A1* 2/2003 Irvine .................. H04N 19/119 382/233
2009/0180531 A1* 7/2009 Wein ....................... G10L 19/08 375/240
2020/0126186 A1* 4/2020 Kim ....................... H04N 19/46

* cited by examiner

*Primary Examiner* — Joseph W Becker

(57) ABSTRACT

A data processing method and system provided in this disclosure may perform a boundary adjustment and encoding spectrum modulation on original data to enhance a boundary within a preset range in an original frame and smoothly decrease an amplitude of the original frame in a selected region, thereby reducing an amount of data information, reducing a data loss, and avoiding a loss of details while improving data compression efficiency; when decompressing compressed data, perform decoding spectrum modulation on the compressed data with parameters corresponding to the encoding spectrum modulation, perform a boundary correction on boundary information within the preset range to eliminate noise, and perform noise reduction on the data while restoring the data, so that decompressed data becomes clearer. The method and system can improve the data compression efficiency, improve transmission efficiency, and reduce data loss, while improving the definition of decompressed data.

8 Claims, 20 Drawing Sheets

IMAGE AND VIDEO DATA PROCESSING METHOD AND SYSTEM

RELATED APPLICATIONS

This application claims the benefit of priority to U.S. application Ser. No. 17/525,900, filed on Nov. 13, 2021; the U.S. application Ser. No. 17/525,900 claims the benefit of priority to Chinese Application No. 202110008566.9, entitled Data Processing Method and System, filed on Jan. 5, 2021, and is a continuation-in-part of U.S. application Ser. No. 17/384,805, filed Jul. 26, 2021.

U.S. application Ser. No. 17/384,805 claims the benefit of priority to Chinese Patent Application No. 202110225315.6, filed on Mar. 1, 2021, which further claims the benefit of priority to Chinese Patent Application No. 202010841245.2, filed on Aug. 20, 2020. U.S. application Ser. No. 17/384,805 is also a continuation-in-part of U.S. application Ser. No. 17/324,103, filed on May 19, 2021.

U.S. application Ser. No. 17/324,103 claims the benefit of priority to Chinese Patent Application No. 202010504349.4, filed on Jun. 5, 2020, and is a continuation-in-part of U.S. application Ser. No. 17/086,407, filed on Nov. 1, 2020 (now U.S. Pat. No. 11,064,207).

The U.S. application Ser. No. 17/086,407 (now U.S. Pat. No. 11,064,207) claims the benefit of priority to Chinese Patent Application No. 202010276253.7, filed on Apr. 9, 2020.

The contents of the foregoing documents are incorporated herein by reference in their entirety.

TECHNICAL FIELD

This disclosure relates to the data processing field, and in particular, to an image and video data processing method and system.

BACKGROUND

As Internet technologies are increasingly popularized, and in particular, as mobile terminals are popularized, there are more types of data in a communications network. However, with popularity of computers, more data, such as video data and audio data, is occupying more network resources and storage resources. The data usually contains a huge amount of information, often having high requirements on storage and transmission. For ease of storage and transmission, the data is usually compressed, and when needed, the data is restored through decompression of the compressed data. Therefore, data compression and decompression technologies have more applications.

For example, video and image compression technologies have seen more and more applications in the past several decades. A video usually contains a huge amount of information. From the traditional radio, film, and television to current multitudinous surveillance and Internet applications, compressed videos and images are occupying more network resources and storage resources. Therefore, when original data of a video is transmitted from one terminal to another terminal through a network, a lot of network resources will be occupied. As a result, it is difficult to have smooth transmission of images in some scenarios of real-time video transmission. Therefore, before video data is transmitted, a data compression device needs to perform compression processing on the video data first to facilitate the transmission. After the compressed video is transmitted to a data decompression device through a transmission medium, the data decompression device then decompresses the video to at least partially restore video images.

The main existing video compression standards include the ITU-T Recommendations H.264 and H.265. Before transmission, a video is generally subjected to global compression by an encoder according to the ITU-T Recommendation H.264 or H.265, and then after transmission, the compressed data is subjected to global decompression by a decoder according to the ITU-T Recommendation H.264 or H.265. However, due to the following reason, performance of the foregoing processing method for global compression of the video is still not satisfactory in terms of balancing between an amount of calculation and definition of the decompressed video. When processing the original video, according to the ITU-T Recommendations H.264 and H.265, various complex algorithms need to be used to generate a predictive frame of an original frame, and then a residual between the original frame and the predictive frame is recorded. The closer the predictive frame to the original frame, the smaller the residual, and the amount of data in an encoded video segment is smaller. To make the encoding easier, a commonly used method is to reduce high-frequency information in the original frame image by filtering the original frame. According to a Fourier transform, it may be known that frequency information of a boundary part of an object in an image is often relatively rich and that a high-frequency component of the boundary part is usually larger than those in flat regions. Therefore, although the frame image with reduced high-frequency information becomes visually blurred (that is, the definition of the image is reduced), the residual between the predictive frame and the filtered original frame can be made smaller. In this way, an amount of calculation required for video encoding and an encoded data stream are both greatly reduced. However, a frame prediction technology is complex and may consume a lot of computing resources. Taking a video codec system as an example, an average increase in encoding efficiency by 30% to 40% requires an increase in the amount of calculation by approximately 10 times. In addition, after data transmission and decompression, the definition may be reduced, and various types of noise such as a block effect or a ringing effect usually exist. The block effect is a phenomenon of discontinuity at a boundary of an image resulting from a block-based Fourier transform in image processing. The ringing effect refers to that in image processing, when spectrum modulation processing is performed on one image, if a selected spectrum modulation function is subjected to a fast value change (that is, there is a region with a drastic derivative change), a grayscale oscillation is generated, accompanying a drastic grayscale change in an output image, as if an air oscillation is generated after ringing of a bell. The noise often occurs at a boundary of an image. If there is strong noise in an output image, people's growing requirements on image clarity cannot be satisfied. Therefore, how to further improve data compression efficiency while improving definition of decompressed data and eliminating the noise has become a goal pursued in the field of data compression and decompression technologies.

Therefore, to improve data transmission efficiency and definition of decompressed data, a data processing method and system having higher compression efficiency and higher definition of decompressed data are needed.

SUMMARY

This disclosure provides a data processing method and system having higher compression efficiency and higher definition of decompressed data. Using video data as an example, the data processing method and system can adjust a boundary within a small range in an original frame in original video data by using a gamma algorithm within the small range, to avoid a loss of boundary information within the small range with a small difference between adjacent pixels in an image during data compression (prediction and residual calculation) and avoid a loss of details. In addition, the method and system can perform encoding spectrum modulation on the original frame to reduce signal strength of the original frame in a selected frequency region and smoothly decrease an amplitude of the original frame in the selected frequency region, thereby reducing an amount of data information; and then encode spectrum-modulated data (perform a prediction and residual calculation) to obtain a compressed frame, to improve data compression efficiency. The encoding spectrum modulation can reduce the amount of data information in the original frame. The data compression efficiency can be improved during the prediction and residual calculation. When performing data decompression, the method and system can perform decoding spectrum modulation and a boundary correction on the compressed frame. The method and system can first decode the compressed frame, and then use parameters corresponding to those of an encoder to perform decoding spectrum modulation on decoded data. The decoding spectrum modulation can filter out components of the decoded data in an intermediate-frequency region and a high-frequency region and obtain data more blurred than the decoded data. Boundary information of the original frame can be obtained by performing subtraction between the decoded data and decoding-spectrum-modulated data in which the intermediate-frequency region and the high-frequency region are filtered out. Then the method and system can weaken a boundary within a small range in the boundary information by using a gamma algorithm within the small range, to perform the boundary correction and eliminate noise in the boundary information. Finally, the method and system can superimpose the noise-reduced boundary information on the decoded data to obtain a decompressed frame. The decoding spectrum modulation corresponds to the encoding spectrum modulation, and a correspondence exists between an encoding spectrum modulation function and a decoding spectrum modulation function, so that definition of compressed data that undergoes the encoding spectrum modulation can be restored to definition of the original frame or even be higher than that of the original frame. In other words, without significantly increasing an amount of codec calculation, a decoder needs to at least restore definition of data at a salient frequency in the decoded data to the definition of the original frame, or can even obtain definition higher than that of the original frame. In a salient frequency region, the original frame undergoes only signal attenuation in frequency domain rather than filtering in frequency domain, and information of the original frame in the salient frequency region is not lost. Therefore, the encoding spectrum modulation function and the decoding spectrum modulation function can be designed based on a relationship between the encoding spectrum modulation function and the decoding spectrum modulation function and features of these two functions, to restore the information of the original frame at the salient frequency. The method and system can significantly improve the data compression efficiency, improve data transmission efficiency, reduce the data loss, and avoid the loss of details, while eliminating the noise and improving the definition of the decompressed data.

To this end, according to a first aspect, this disclosure provides a data processing method, including: selecting, from original data, an original frame including a preset quantity of bytes of the original data; and performing data compression on the original frame to obtain a compressed frame, where the data compression includes: performing a boundary adjustment on the original frame, and performing encoding spectrum modulation on an under-compression-frame, where the under-compression-frame includes the original frame and any data state during the data compression before obtaining the compressed frame, and the encoding spectrum modulation includes using an encoding convolution kernel to convolve the under-compression-frame to smoothly decrease an amplitude of the under-compression-frame in an intermediate-frequency region in a frequency domain.

According to a second aspect, this disclosure provides a data processing system, including: at least one storage medium storing a set of instructions for data processing; and at least one processor in communication with the at least one storage medium, where during operation, the at least one processor executes the set of instructions to: select, from original data, an original frame including a preset quantity of bytes of the original data; and perform data compression on the original frame to obtain a compressed frame, where the data compression includes: performing a boundary adjustment on the original frame, and performing encoding spectrum modulation on an under-compression-frame, where the under-compression-frame includes the original frame and any data state during the data compression before obtaining the compressed frame, and the encoding spectrum modulation includes using an encoding convolution kernel to convolve the under-compression-frame to smoothly decrease an amplitude of the under-compression-frame in an intermediate-frequency region in a frequency domain.

According to a third aspect, this disclosure provides a data processing method, including: obtaining compressed data including a compressed frame obtained by performing data compression on an original frame; and performing data decompression on the compressed frame to obtain a decompressed frame, including: performing decoding spectrum modulation and a boundary correction on an under-decompression-frame, where the under-decompression-frame includes the compressed frame and any data state during the data decompression before obtaining the decompressed frame, the decoding spectrum modulation includes using a decoding convolution kernel to convolve the under-decompression-frame so as to smoothly decrease an amplitude of the under-decompression-frame in a frequency domain to filter out a component in a region of intermediate-frequency to high-frequency, the decoding spectrum modulation has a preset association relationship with an encoding spectrum modulation, and the boundary correction includes correcting a boundary whose boundary value is within a second preset range in a boundary of the under-decompression-frame by using a second gamma algorithm to reduce noise.

According to a fourth aspect, this disclosure provides a data processing system, including: at least one storage medium storing a set of instructions for data processing; and at least one processor in communication with the at least one storage medium, where during operation, the at least one processor executes the set of instructions to: obtain compressed data including a compressed frame obtained by performing data compression on an original frame; and perform data decompression on the compressed frame to obtain a decompressed frame, including: performing decoding spectrum modulation and a boundary correction on an under-decompression-frame, where the under-decompression-frame includes the compressed frame and any data state during the data decompression before obtaining the decompressed frame, the decoding spectrum modulation includes using a decoding convolution kernel to convolve the under-decompression-frame so as to smoothly decrease an amplitude of the under-decompression-frame in a frequency domain to filter out a component in a region of intermediate-frequency to high-frequency, the decoding spectrum modulation has a preset association relationship with an encoding spectrum modulation, and the boundary correction includes correcting a sub-boundary whose boundary value is within a second preset range in a boundary of the under-decompression-frame by using a second gamma algorithm to reduce noise.

Other functions of the data processing method and system provided in this disclosure are partially listed in the following description. Based on the description, content described in the following figures and examples is obvious to a person of ordinary skill in the art. The inventive aspects of the data processing method and system and storage medium provided in this disclosure may be fully explained by practicing or using the method, apparatus, and a combination thereof in the following detailed examples.

BRIEF DESCRIPTION OF DRAWINGS

To clearly describe the technical solutions in the embodiments of this disclosure, the following briefly describes the accompanying drawings required for describing the embodiments. Apparently, the accompanying drawings in the following description show merely some exemplary embodiments of this disclosure, and a person of ordinary skill in the art may still derive other drawings from these accompanying drawings without creative efforts.

DETAILED DESCRIPTION

Figure 1:
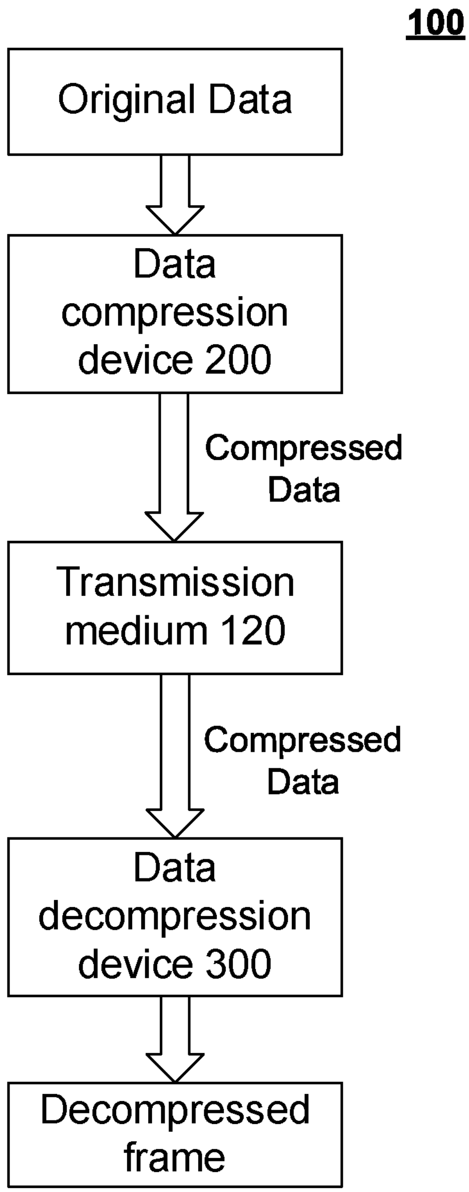
FIG. 1 is a schematic diagram of a data processing system according to some exemplary embodiments of this disclosure.

The following description provides specific application scenarios and requirements of this disclosure to enable a person skilled in the art to make and use content of this disclosure. Various partial modifications to the disclosed exemplary embodiments are obvious to a person skilled in the art. General principles defined herein can be applied to other embodiments and applications without departing from the scope of this disclosure. Therefore, this disclosure is not limited to the illustrated exemplary embodiments, but is to be accorded the widest scope consistent with the claims.

The terms used herein are only intended to describe specific exemplary embodiments and are not restrictive. As used herein, singular forms “a”, “an”, and “the” may also include plural forms, unless otherwise clearly indicated in a context. When used in this disclosure, the terms “comprising”, “including”, and/or “containing” indicate presence of associated integers, steps, operations, elements, and/or components, yet do not preclude presence of one or more other features, integers, steps, operations, elements, components, and/or groups thereof or addition of other features, integers, steps, operations, elements, components, and/or groups thereof to the system/method.

In view of the following description, these features and other features of this disclosure, operations and functions of related elements of structures, and economic efficiency in combining and manufacturing components can be significantly improved. All of these constitute part of this disclosure with reference to the drawings. However, it should be clearly understood that the drawings are only for illustration and description purposes and are not intended to limit the scope of this disclosure. It should also be understood that the drawings are not drawn to scale.

Flowcharts used in this disclosure show operations implemented by the system according to some exemplary embodiments of this disclosure. It should be clearly understood that operations in the flowcharts may be implemented in a different order. Conversely, the operations may be implemented in a reverse order or simultaneously. In addition, one or more other operations may be added to the flowcharts, and one or more operations may be removed from the flowcharts.

In a first aspect, this disclosure provides a data processing system 100 (hereinafter referred to as the system 100). In a second aspect, this disclosure describes a data processing method P200 for compressing data. In a third aspect, this disclosure describes a data processing method P300 for decompressing a compressed frame. The data processing methods P200 and P300 and the system 100 may be used for data compression and decompression to improve the data transmission efficiency and save resources and spaces. The data may be non-real-time data or real-time data. There are various types of data from the traditional radio, film, and television to current multitudinous surveillance and Internet applications. For example, the data may be non-real-time video data, audio data, or image data. The data may also be real-time map data, real-time sensor data, real-time video surveillance data, network monitoring data, meteorological data, aerospace data, or the like. For example, the data may be map data received from a base station by an autonomous vehicle during driving. A specific type of the data is not limited in this disclosure. In this disclosure, methods and steps used for processing different types of data by the data processing methods P200 and P300 and system 100 are consistent. For ease of presentation, video data processing is used as an example for description in this disclosure.

During data compression and data decompression, compression and decompression are usually performed the unit of frame. A frame is a processing unit that makes up a data sequence. Original data may include one or more original frames. Each original frame includes original data of a preset quantity of bytes. During video decompression, the original data may be original video data, and the original frame may be a frame image in the original video data. In a traditional video compression technology, ITU-T Recommendations H.264 and H.265 are usually used to encode original video data to achieve an objective of compressing the video data. A technique mainly used by the ITU-T Recommendations H.264 and H.265 to encode the video data is predictive coding. To be specific, original data in the video data is predicted to obtain a predictive value, and then the predictive value is subtracted from an original value of the original data to obtain a residual value, thereby compressing the video data. During restoration and decompression (that is, decoding), the original frame may be restored by adding the residual value to the predictive value.

When performing data compression, the data processing methods P200 and P300 and system 100 provided in this disclosure may use a combination of encoding spectrum modulation and encoding to reduce an amount of data during encoding and improve video data compression efficiency; and when performing data decompression, may use a combination of decoding spectrum modulation and decoding to decompress compressed data that undergoes the encoding spectrum modulation and encoding, so that decompressed data is restored to original data.

FIG. 1 is a schematic diagram of the data processing system 100. The system 100 may include a data compression device 200, a data decompression device 300, and a transmission medium 120.

The data compression device 200 may receive an original frame in original data to be compressed, and compress the original data by using the data processing method P200 provided in this disclosure to generate a compressed frame. The data compression device 200 may store data or an instruction(s) for performing the data processing method P200 described in this disclosure, and execute the data and/or the instruction(s).

The data processing method P200 may perform data compression on video data. The data compression may include performing a boundary adjustment on an original frame in the video data, and performing encoding spectrum modulation and encoding on the video data. Specifically, the data processing method P200 may perform the boundary adjustment on a boundary within a small range in the video data by using a gamma algorithm, so as to avoid a loss of a boundary with a small difference between pixel values of adjacent pixels and avoid a loss of details. In addition, the data processing method P200 may further use a combination of encoding spectrum modulation and encoding to perform data compression on the video data to obtain a compressed frame, so as to further improve a compression ratio of the video data and efficiency of video transmission. Specifically, the data processing method P200 may use a gamma algorithm whose gamma value is less than 1 to perform the boundary adjustment on the video data. The encoding spectrum modulation refers to modulating the amplitude of a spectrum graph of the data to be processed. For example, the encoding spectrum modulation may perform amplitude attenuation on the data to be processed in a frequency domain, thereby reducing an amount of information in the data to be processed, for example, attenuate an amplitude of the data to be processed in a selected frequency region in the frequency domain, for example, an amplitude in the intermediate-frequency region or an amplitude in the high-frequency region, for example, an amplitude in a low-frequency to intermediate-frequency region, or for another example, an amplitude in an intermediate-frequency to high-frequency region. A person of ordinary skill in the art would understand that a frequency component of the data that undergoes the encoding spectrum modulation in the selected frequency region becomes smaller, and thus the amount of information in the data is reduced. Therefore, efficiency of encoding the data that undergoes the encoding spectrum modulation may be improved and the compression ratio may also be improved.

The data decompression device 300 may receive the compressed frame, and decompress the compressed frame by using the data processing method P300 provided in this disclosure to obtain a decompressed frame. The data decompression device 300 may store data or an instruction(s) for performing the data processing method P300 described in this disclosure, and execute the data and/or the instruction (s).

The data processing method P300 may perform data decompression on the compressed frame on which the data compression is performed by the data processing method 200 to restore the video data. The data decompression may be performing decoding spectrum modulation and a boundary correction on the compressed frame. The data processing method P300 may use a combination of decoding (that is, restoring an under-compression-frame based on a residual value and a predictive value) and decoding spectrum modulation to perform data decompression on the compressed frame to restore the data in the compressed frame. The data processing method P300 may perform the decoding spectrum modulation on compressed data by using a decoding spectrum modulation function; calculate a difference between the compressed data and decoded data to obtain boundary information of the original frame; perform the boundary correction on the boundary information by using a gamma algorithm to weaken a boundary within a small range and eliminate noise information in the boundary information; and superimpose the noise-eliminated boundary information on the decoded data to obtain the decompressed frame, where the boundary correction may eliminate the noise information, so that definition of the decompressed frame becomes higher. Specifically, the decoding spectrum modulation may use a smoothly transitioned low-pass filter to filter out components in an intermediate-frequency region and a high-frequency region in the decoded data. Therefore, a ringing effect of the decoded data may be effectively avoided, so that the decoded data becomes clearer. The decoding spectrum modulation may enable the data that undergoes the encoding spectrum modulation to be fully restored or approximately restored to a state before the encoding spectrum modulation without considering other calculation errors, or even to exceed a state before the encoding spectrum modulation.

Therefore, the data processing methods P200 and P300 and system 100 may significantly improve the compression efficiency of the video data, reduce the data loss during the video data compression, improve the video transmission efficiency and a video restoration rate and definition of a decompressed video, and reduce noise in the decompressed video. Specific processes of the encoding spectrum modulation and the boundary correction, as well as the decoding spectrum modulation and the boundary correction will be described in detail in the following description.

The data compression device 200 and the data decompression device 300 may include a wide range of apparatuses. For example, the data compression device 200 and the data decompression device 300 may include desktop computers, mobile computing apparatuses, notebook (for example, laptop) computers, tablet computers, set top boxes, smartphones, and other handheld devices, televisions, cameras, display apparatuses, digital media players, video game consoles, in-vehicle computers, or the like.

As shown in FIG. 1, the data compression device 200 and the data decompression device 300 may be connected by the transmission medium 120. The transmission medium 120 may facilitate transmission of information and/or data. The transmission medium 120 may be any data carrier that can transmit a compressed frame from the data compression device 200 to the data decompression device 300. For example, the transmission medium 120 may be a storage medium (for example, an optical disc), or a wired or wireless communications medium. The communications medium may be a network. In some exemplary embodiments, the transmission medium 120 may be any type of wired or wireless network, or may be a combination thereof. For example, the transmission medium 120 may include a cable network, a wired network, an optical fiber network, a telecommunications network, an intranet, the Internet, a local area network (LAN), a wide area network (WAN), a wireless local area network (WLAN), a metropolitan area network (MAN), a wide area network (WAN), a public switched telephone network (PSTN), a Bluetooth network, a ZigBee network, a near field communication (NFC) network, or the like. One or more components in the data decompression device 300 and the data compression device 200 may be connected to the transmission medium 120 to transmit data and/or information. The transmission medium 120 may include a router, a switch, a base station, or another device that facilitates communication from the data compression device 200 to the data decompression device 300. In some exemplary embodiments, the transmission medium 120 may be a storage medium, such as a mass memory, a removable memory, a volatile read-write memory, a read-only memory (ROM), or the like, or any combination thereof. Exemplary mass memories may include non-transitory storage media, such as magnetic disks, optical discs, and solid-state drives. Removable memories may include flash drives, floppy disks, optical discs, memory cards, zip magnetic disks, magnetic tapes, and the like. A typical volatile read-write memory may include a random access memory (RAM). The RAM may include a dynamic RAM (DRAM), a double data rate synchronous dynamic RAM (DDR SDRAM), a static RAM (SRAM), a thyristor RAM (T-RAM), a zero-capacitance RAM (Z-RAM), or the like. The ROM may include a mask ROM (MROM), a programmable ROM (PROM), a programmable erasable ROM (PEROM), an electronic programmable ROM (EEPROM), an optical disc (CD-ROM), a digital versatile disc ROM, or the like. In some exemplary embodiments, the transmission medium 120 may be a cloud platform. Only as an example, the cloud platform may include a private cloud, a public cloud, a hybrid cloud, a community cloud, a distributed cloud, an inter-cloud cloud, or the like, or any combination of the foregoing forms.

As shown in FIG. 1, the data compression device 200 may receive original data, and execute an instruction of the data processing method P200 described in this disclosure to perform data compression on the original data to generate a compressed frame, where the compressed frame may be transmitted to the data decompression device 300 through the transmission medium 120; and the data decompression device 300 may execute an instruction(s) of the data processing method P300 described in this disclosure to perform data decompression on the compressed frame to obtain a decompressed frame.

Figure 2:
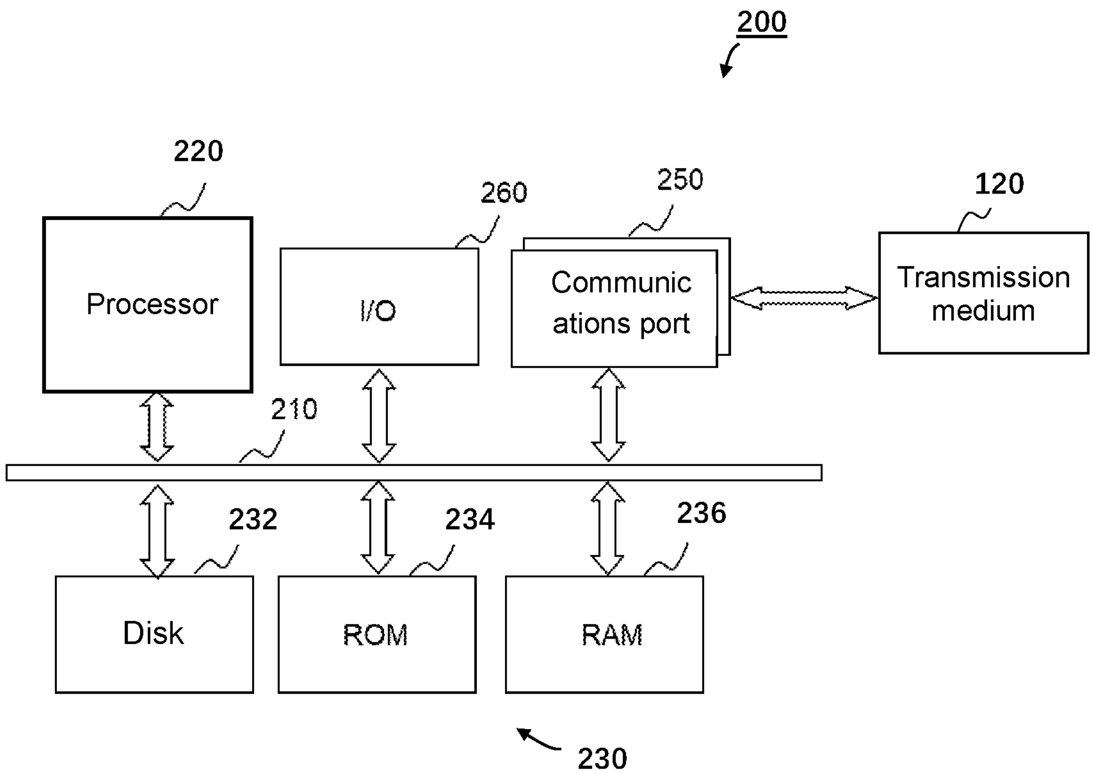
FIG. 2 is a schematic diagram of a data compression device for data processing according to some exemplary embodiments of this disclosure.

FIG. 2 is a schematic diagram of the data compression device 200 for data processing. The data compression device 200 may perform the data processing method P200 described in this disclosure. The data processing method P200 is described in other parts of this disclosure. For example, the data processing method P200 is described in the descriptions of FIG. 4A to FIG. 9.

As shown in FIG. 2, the data compression device 200 may include at least one storage medium 230 and at least one compression processor 220. In some exemplary embodiments, the data compression device 200 may further include a communications port 250 and an internal communications bus 210. In addition, the data compression device 200 may further include an I/O component 260.

The internal communications bus 210 may connect different system components, including the storage medium 230 and the compression processor 220.

The I/O component 260 supports input/output between the data compression device 200 and another component.

The storage medium 230 may include a data storage apparatus. The data storage apparatus may be a non-transitory storage medium, or may be a transitory storage medium. For example, the data storage apparatus may include one or more of a magnetic disk 232, a read-only memory (ROM) 234, or a random access memory (RAM) 236. The storage medium 230 may further include at least one instruction set stored in the data storage apparatus. The instruction set may be computer program code, and the computer program code may include a program, a routine, an object, a component, a data structure, a process, a module, and the like for performing the data processing method provided in this disclosure.

The communications port 250 may be used by the data compression device 200 to perform external data communications. For example, the data compression device 200 may be connected to the transmission medium 120 through the communications port 250.

The at least one compression processor 220 may be in communication with the at least one storage medium 230 through the internal communications bus 210. The at least one compression processor 220 may be configured to execute the at least one instruction set. When the system 100 operates, the at least one compression processor 220 reads the at least one instruction set, and performs the data processing method P200 based on the at least one instruction set. The compression processor 220 may perform all steps included in the data processing method P200. The compression processor 220 may be in a form of one or more processors. In some exemplary embodiments, the compression processor 220 may include one or more hardware processors, for example, a microcontroller, a microprocessor, a reduced instruction set computer (RISC), an application-specific integrated circuit (ASIC), an application-specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), another type of circuit or processor that can perform one or more functions, and the like, or any combination thereof. For a purpose of description, only one compression processor 220 is described in the data compression device 200 in this disclosure. However, it should be noted that the data compression device 200 in this disclosure may further include a plurality of processors. Therefore, the operations and/or method steps disclosed in this disclosure may be performed by one processor in this disclosure, or may be performed jointly by a plurality of processors. For example, if the compression processor 220 of the data compression device 200 in this disclosure performs step A and step B, it should be understood that step A and step B may also be performed jointly or separately by two different compression processors 220 (for example, the first processor performs step A, and the second processor performs step B, or the first processor and the second processor jointly perform step A and step B).

Although the data compression device 200 is described in the foregoing structure, the structure is also applicable to the data decompression device 300. The data decompression device 300 may perform the data processing method P300 described in this disclosure. The data processing method P300 is described in other parts of this disclosure. For example, the data processing method P300 is described in the descriptions of FIG. 10 to FIG. 14B.

When the system 100 may perform the data compression on the video data, the encoding spectrum modulation and the encoding may be interchangeable in order, or may be performed alternately. The boundary adjustment may be performed before the encoding spectrum modulation or after the encoding spectrum modulation. Likewise, when the system 100 performs the data decompression on the compressed frame, the decoding spectrum modulation and the decoding may be interchanged in order, or may be performed alternately. It should be noted that to ensure that decompressed data information can be restored to the information in the original data, the order of the decoding spectrum modulation and the decoding in the data decompression should correspond to the order of the encoding spectrum modulation and the encoding in the data compression, that is, the decoding spectrum modulation and the decoding may be performed in a reverse order with respect to the encoding spectrum modulation and the encoding. For example, if a compressed frame is obtained by performing the encoding spectrum modulation before the encoding, the compressed frame should be subjected to the decoding and then the decoding spectrum modulation during the data decompression. For ease of description, the data in the original frame prior to data compression processing is defined as $P_0$, the encoding spectrum modulation function corresponding to the encoding spectrum modulation is defined as $H_1(f)$, the data in the decompressed frame obtained through decompression by the data decompression device 300 is defined as $P_4$, and the decoding spectrum modulation function corresponding to the decoding spectrum modulation is defined as $H_2(f)$.

In the data processing method P200, when performing the data compression on the original frame, the data compression device 200 may first perform the boundary adjustment on the original frame and then perform the encoding spectrum modulation; or may first perform the encoding spectrum modulation on the original frame and then perform the boundary adjustment. FIG. 3A to FIG. 3D are some flowcharts of data compression and data decompression according to some exemplary embodiments of this disclosure. In the flowcharts of data compression and data decompression shown in FIG. 3A to FIG. 3C, the data compression device 200 first performs the boundary adjustment on the original frame and then performs the encoding spectrum modulation. In a flowchart of data compression and data decompression shown in FIG. 3D, the data compression device 200 first performs the encoding spectrum modulation on the original frame and then performs the boundary adjustment.

Figure 3A:
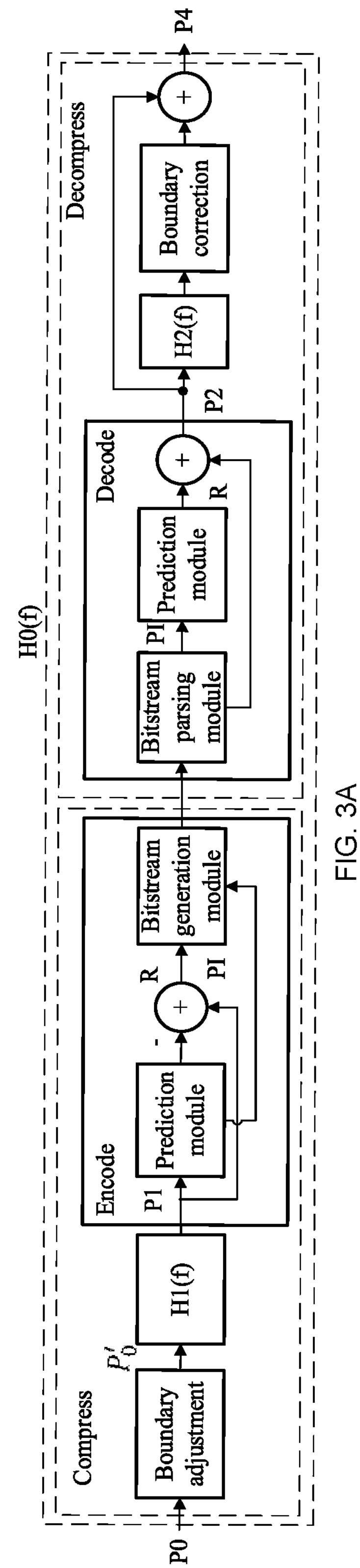
FIG. 3A is a flowchart of data compression and data decompression according to some exemplary embodiments of this disclosure.

FIG. 3A is a flowchart of data compression and data decompression according to some exemplary embodiments of this disclosure. As shown in FIG. 3A, that the data compression device 200 performs data compression on the original data may be as follows: the data compression device 200 first performs the boundary adjustment on a boundary of the original frame $P_0$ to obtain a first enhanced frame. For ease of description, data in the first enhanced frame is defined as $$P_0'.$$

Then the encoding spectrum modulation and the encoding are performed on the first enhanced frame $$P_0'.$$

That the encoding spectrum modulation and the encoding are performed on the first enhanced frame $$P_0'$$

may be as follows: the data compression device 200 first performs the encoding spectrum modulation on the first enhanced frame $$P_0'$$

by using the encoding spectrum modulation function $H_1(f)$, and then encodes the first enhanced frame $P_0'$ after the encoding spectrum modulation, that is, performs a prediction on the first enhanced frame $P_0'$ after the encoding spectrum modulation and calculates a residual to obtain predictive data PI and residual data R, and inputs the predictive data PI and the residual data R into a bitstream generation module for combining to obtain the compressed frame. For ease of presentation, the data obtained by performing the encoding spectrum modulation by using the encoding spectrum modulation function $H_1(f)$ is defined as $P_1$. Specific processes of the boundary adjustment and the encoding spectrum modulation will be described in detail in the subsequent description. The data compression method shown in FIG. 3A may improve encoding efficiency, further reduce an amount of data in the compressed frame, and improve the compression ratio, while reducing the data loss and avoiding the loss of details.

As shown in FIG. 3A, that the data decompression device 300 performs data decompression on the compressed frame may be as follows: the data decompression device 300 first decodes the compressed frame, that is, parses the compressed frame based on a bitstream parsing module to generate the predictive data PI and the residual data R; and then obtains a predictive frame by performing a prediction based on the predictive data PI, and superimposes the residual data R on the predictive frame to obtain a decoded frame. For ease of description, data in the decoded frame is defined as $P_2$. Then the decoding spectrum modulation is performed on the decoded frame $P_2$ by using the decoding spectrum modulation function $H_2(f)$, the boundary correction is performed, and the data that undergoes the boundary correction is superimposed on the decoded frame to obtain the decompressed frame $P_4$ for outputting. Detailed content of the decoding spectrum modulation and the boundary correction will be described in detail in the subsequent description.

For ease of presentation, a transfer function between the decompressed frame $P_4$ and the original data $P_0$ is defined as a global spectrum modulation function $H_0(f)$. The manner shown in FIG. 3A may reduce the amount of data in the compressed frame, and therefore improve the compression ratio and encoding efficiency of the original data, and improve transmission efficiency of the original data, while reducing the data loss and avoiding the loss of details.

Alternatively, that the data compression device 200 may perform data compression on the original data may be as follows: the encoding spectrum modulation is integrated into the encoding process. The encoding spectrum modulation may be performed at any stage in the encoding process. Correspondingly, the decoding spectrum modulation may also be performed at a corresponding stage in the decoding process.

Figure 3B:
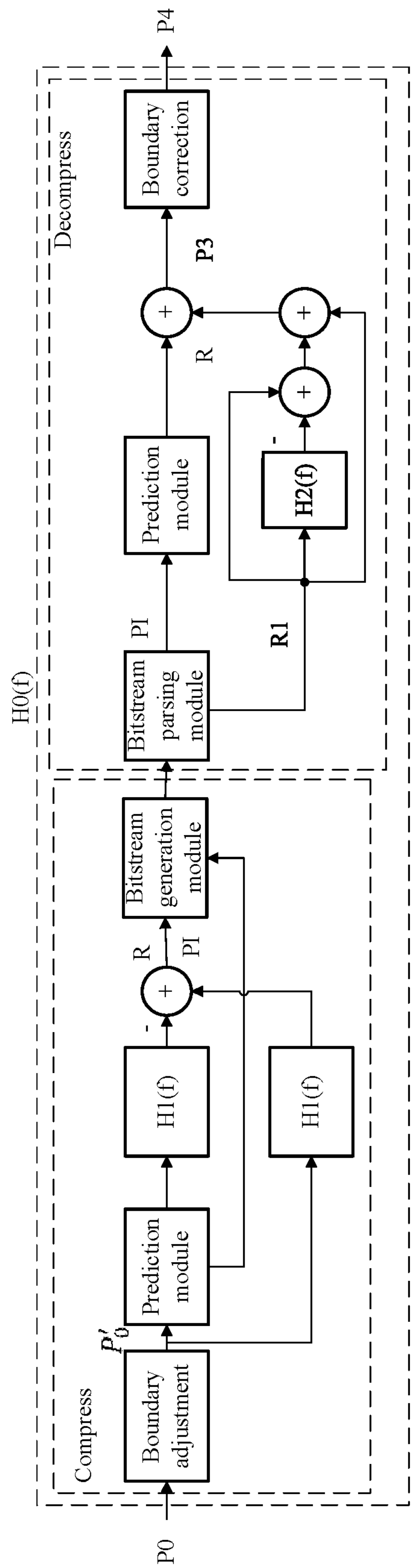
FIG. 3B is a flowchart of data compression and data decompression according to some exemplary embodiments of this disclosure.

FIG. 3B is a flowchart of data compression and data decompression according to some exemplary embodiments of this disclosure. As shown in FIG. 3B, that the data compression device 200 may perform data compression on the original data may be as follows: the data compression device 200 first performs the boundary adjustment on a boundary of the original frame $P_0$ to obtain a first enhanced frame $$P_0',$$

and then perform the encoding spectrum modulation and the encoding on the first enhanced frame $$P_0'.$$

The performing of the encoding spectrum modulation and the encoding on the first enhanced frame $$P_0'$$

may be as follows: the data compression device 200 performs a prediction on the first enhanced frame $$P_0'$$

to obtain a predictive frame and predictive data PI, performs the encoding spectrum modulation on the predictive frame and the first enhanced frame $$P_0'$$

separately by using the encoding spectrum modulation function $H_1(f)$ and then calculates a residual to obtain residual data R, and inputs the predictive data PI and the residual data R into a bitstream generation module for combining to generate the compressed frame. Specific operations of the data compression shown in FIG. 3B are the same as those of the manner shown in FIG. 3A, except that the order of operations is different. Content of the boundary adjustment and the encoding spectrum modulation will be described in detail in the subsequent description.

As shown in FIG. 3B, that the data decompression device 300 performs data decompression on the compressed frame may be as follows: the data decompression device 300 parses the compressed frame based on a bitstream parsing module to generate the predictive data PI and residual data R1; performs the decoding spectrum modulation on the residual data R1 by using the decoding spectrum modulation function $H_2(f)$, calculates a difference between the residual data R1 and the data that undergoes the decoding spectrum modulation, to obtain a boundary of the residual data R1, and superimposes the residual data R1 on the data after the difference calculation (the boundary of the residual data R1) to obtain the residual data R; then obtains a predictive frame by performing a prediction based on the predictive data PI, and superimposes the residual data R on the predictive frame to obtain a superimposed frame; and then performs the boundary correction on a boundary of the superimposed frame, and uses the data that undergoes the boundary correction as the decompressed frame $P_4$ for outputting. For ease of description, data in the superimposed frame is defined as $P_3$. Specifically, a specific process of performing the boundary correction on the boundary of the superimposed frame $P_3$ will be described in detail in the subsequent description.

The manner shown in FIG. 3B may reduce the amount of data in the compressed frame, and therefore improve the compression ratio and encoding efficiency of the original data, and improve transmission efficiency of the original data, while reducing the data loss and avoiding the loss of details.

Figure 3D:
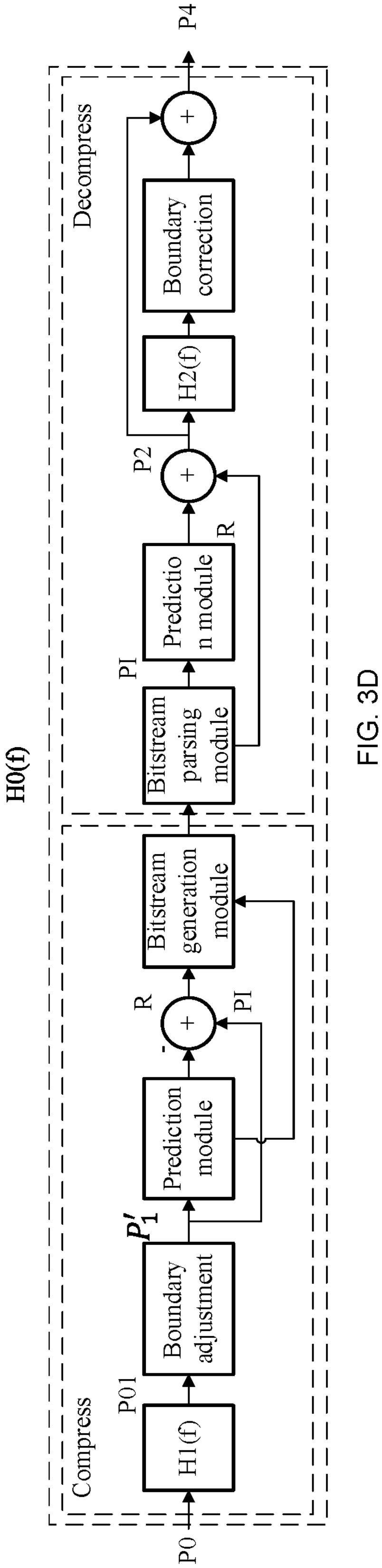
FIG. 3D is a flowchart of data compression and data decompression according to some exemplary embodiments of this disclosure.
Figure 3C:
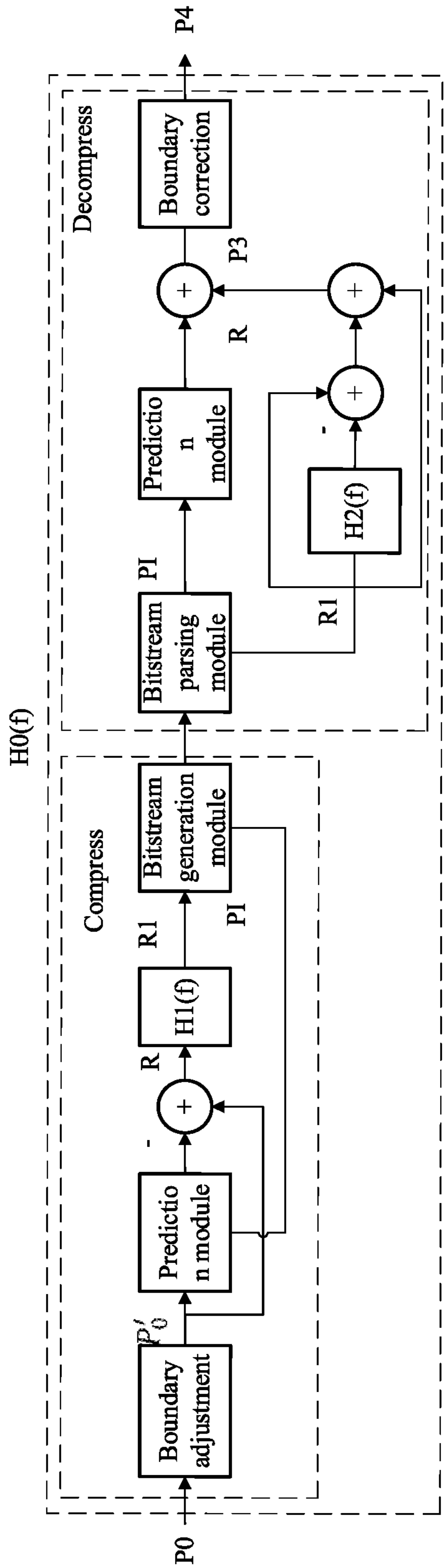
FIG. 3C is a flowchart of data compression and data decompression according to some exemplary embodiments of this disclosure.

FIG. 3C is a flowchart of data compression and data decompression according to some exemplary embodiments of this disclosure. As shown in FIG. 3C, that the data compression device 200 performs data compression on the original data may be as follows: the data compression device 200 first performs the boundary adjustment on a boundary of the original frame $P_0$ to obtain a first enhanced frame $$P_0',$$

and then performs the encoding spectrum modulation and the encoding on the first enhanced frame $$P_0'.$$

The performing of the encoding spectrum modulation and the encoding on the first enhanced frame $$P_0'$$

may be as follows: the data compression device 200 first encodes the first enhanced frame $$P_0',$$

that is, performs a prediction and calculates a residual to obtain predictive data PI and residual data R, and then performs the encoding spectrum modulation on the residual data R by using the encoding spectrum modulation function $H_1(f)$; and inputs residual data R1 that undergoes the encoding spectrum modulation and the predictive data PI into a bitstream generation module for combining to generate the compressed frame. Specific operations of data compression shown in FIG. 3C are the same as those of the manner shown in FIG. 3A, except that an order of operations is different. Content of the boundary adjustment and the encoding spectrum modulation will be described in detail in the subsequent description.

As shown in FIG. 3C, that the data decompression device 300 may perform data decompression on the compressed frame may be as follows: the data decompression device 300 parses the compressed frame based on a bitstream parsing module to generate the predictive data PI and the residual data R1; performs the decoding spectrum modulation on the residual data R1 by using the decoding spectrum modulation function $H_2(f)$, calculates a difference between the residual data R1 and the data that undergoes the decoding spectrum modulation to obtain a boundary of the residual data R1, and superimposes the residual data R1 on the data after the difference calculation (the boundary of the residual data R1) to obtain the residual data R; then obtains a predictive frame by performing a prediction based on the predictive data PI, and superimposes the residual data R on the predictive frame to obtain a superimposed frame $P_3$; and then performs the boundary correction on a boundary of the superimposed frame, and uses the data that undergoes the boundary correction as the decompressed frame $P_4$ for outputting. Specifically, a specific process of performing the boundary correction on the boundary of the superimposed frame $P_3$ will be described in detail in the subsequent content.

The manner shown in FIG. 3C may reduce the amount of data in the compressed frame, and therefore improve the compression ratio and encoding efficiency of the original data, and improve transmission efficiency of the original data, while reducing the data loss and avoiding the loss of details.

FIG. 3D is a flowchart of data compression and data decompression according to some exemplary embodiments of this disclosure. As shown in FIG. 3D, that the data compression device 200 performs data compression on the original data may be as follows: the data compression device 200 first performs the encoding spectrum modulation on the original frame $P_0$ by using the encoding spectrum modulation function $H_1(f)$, and then performs the boundary adjustment to obtain data $$P_1';$$

and then encodes the data $$P_1',$$

that is, performs a prediction on the data $$P_1'$$

and calculates a residual to obtain predictive data PI and residual data R, and inputs the predictive data PI and the residual data R into a bitstream generation module for combining to obtain the compressed frame. Content of the boundary adjustment and the encoding spectrum modulation is described in detail in the subsequent description. The data compression method shown in FIG. 3D may improve encoding efficiency, further reduce an amount of data in the compressed frame, and improve the compression ratio, while reducing the data loss and avoiding the loss of details.

As shown in FIG. 3D, that the data decompression device 300 may perform data decompression on the compressed frame may be as follows: the data decompression device 300 first decodes the compressed frame, that is, parses the compressed frame based on a bitstream parsing module to generate the predictive data PI and the residual data R; and then obtains a predictive frame by performing a prediction based on the predictive data PI, and superimposes the residual data R on the predictive frame to obtain a decoded frame. For ease of description, data in the decoded frame is defined as $P_2$. Then the decoding spectrum modulation is performed on the decoded frame $P_2$ by using the decoding spectrum modulation function $H_2(f)$, the boundary correction is performed, and the data that undergoes the boundary correction is superimposed on the decoded frame to obtain the decompressed frame $P_4$ for outputting. Detailed content of the decoding spectrum modulation and the boundary correction will be described in detail in the subsequent description.

The manner shown in FIG. 3D may reduce the amount of data in the compressed frame, and therefore improve the compression ratio and encoding efficiency of the original data, and improve transmission efficiency of the original data, while reducing the data loss and avoiding the loss of details. Specific processes of the data compression and data decompression will be described in subsequent descriptions.

FIG. 4A to FIG. 4D are flowcharts of the data processing method P200 for data compression according to some exemplary embodiments of this disclosure. As described above, the data compression device 200 may perform the data processing method P200. Specifically, the storage medium of the data compression device 200 may store at least one instruction set. The instruction set may be configured to instruct the compression processor 220 in the data compression device 200 to implement the data processing method P200. When the data compression device 200 operates, the compression processor 220 may read the instruction set and perform the data processing method P200.

Figure 4A:
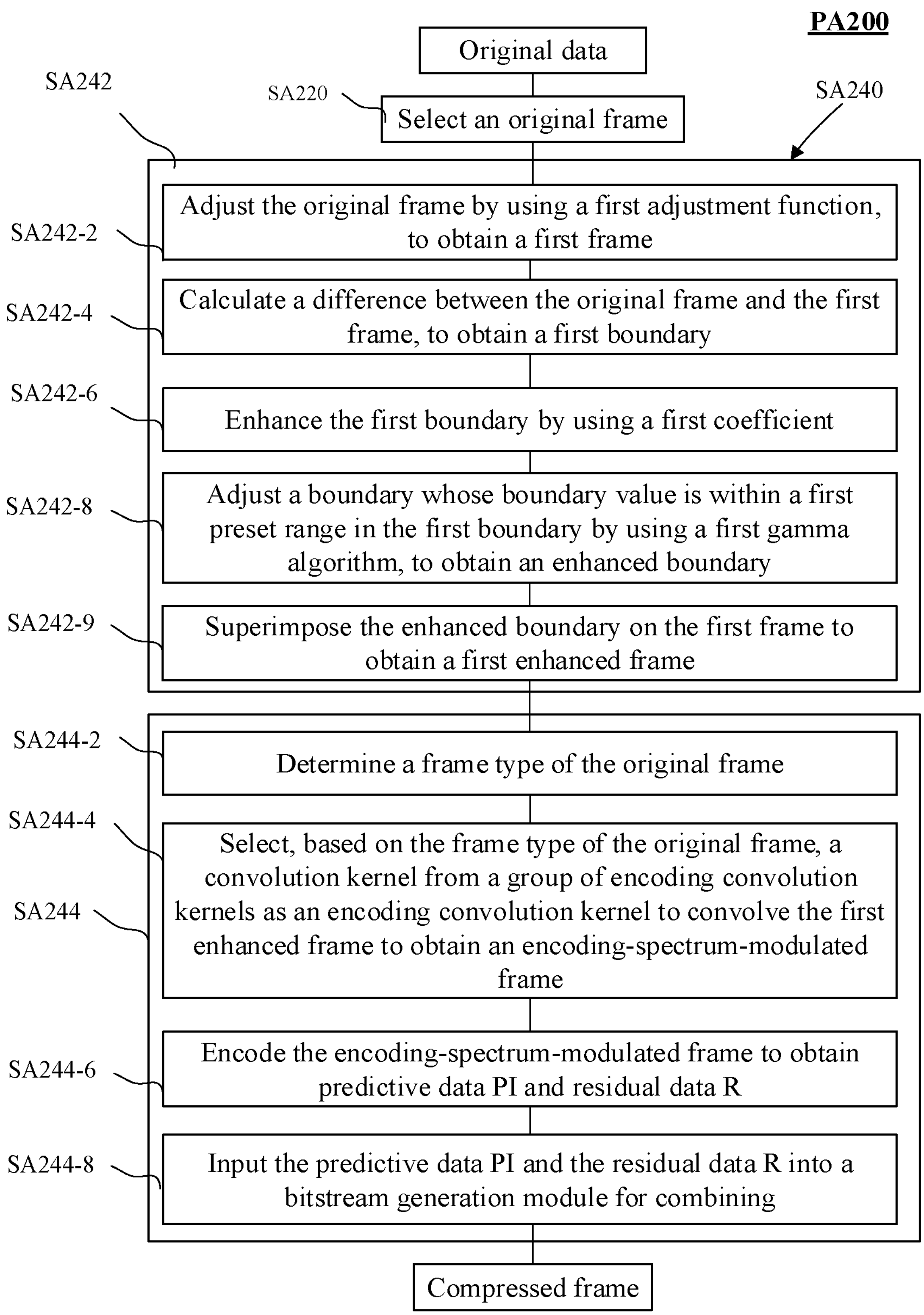
FIG. 4A is a flowchart of a data processing method for data compression according to some exemplary embodiments of this disclosure.
Figure 4B:
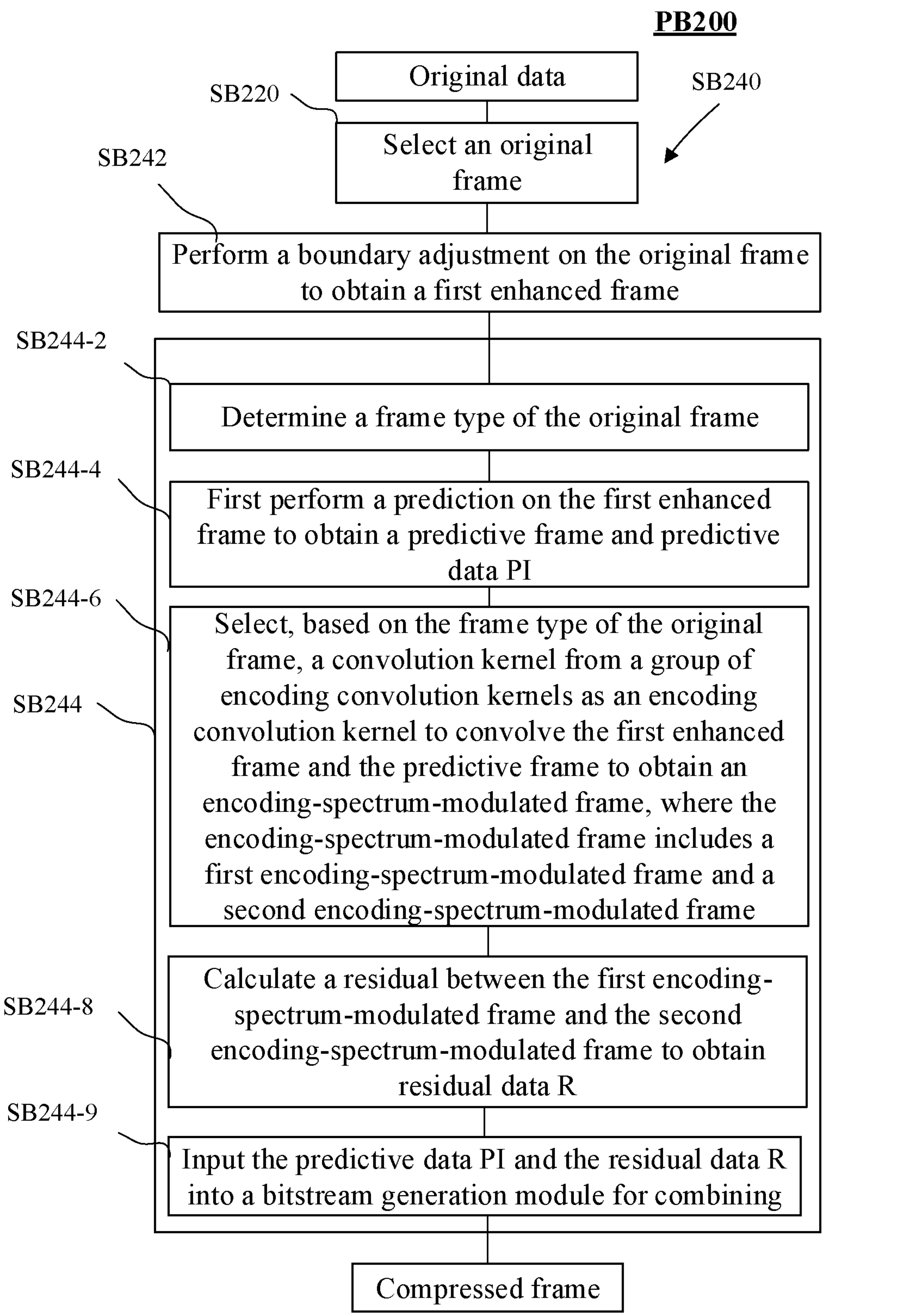
FIG. 4B is a flowchart of a data processing method for data compression according to some exemplary embodiments of this disclosure.
Figure 4C:
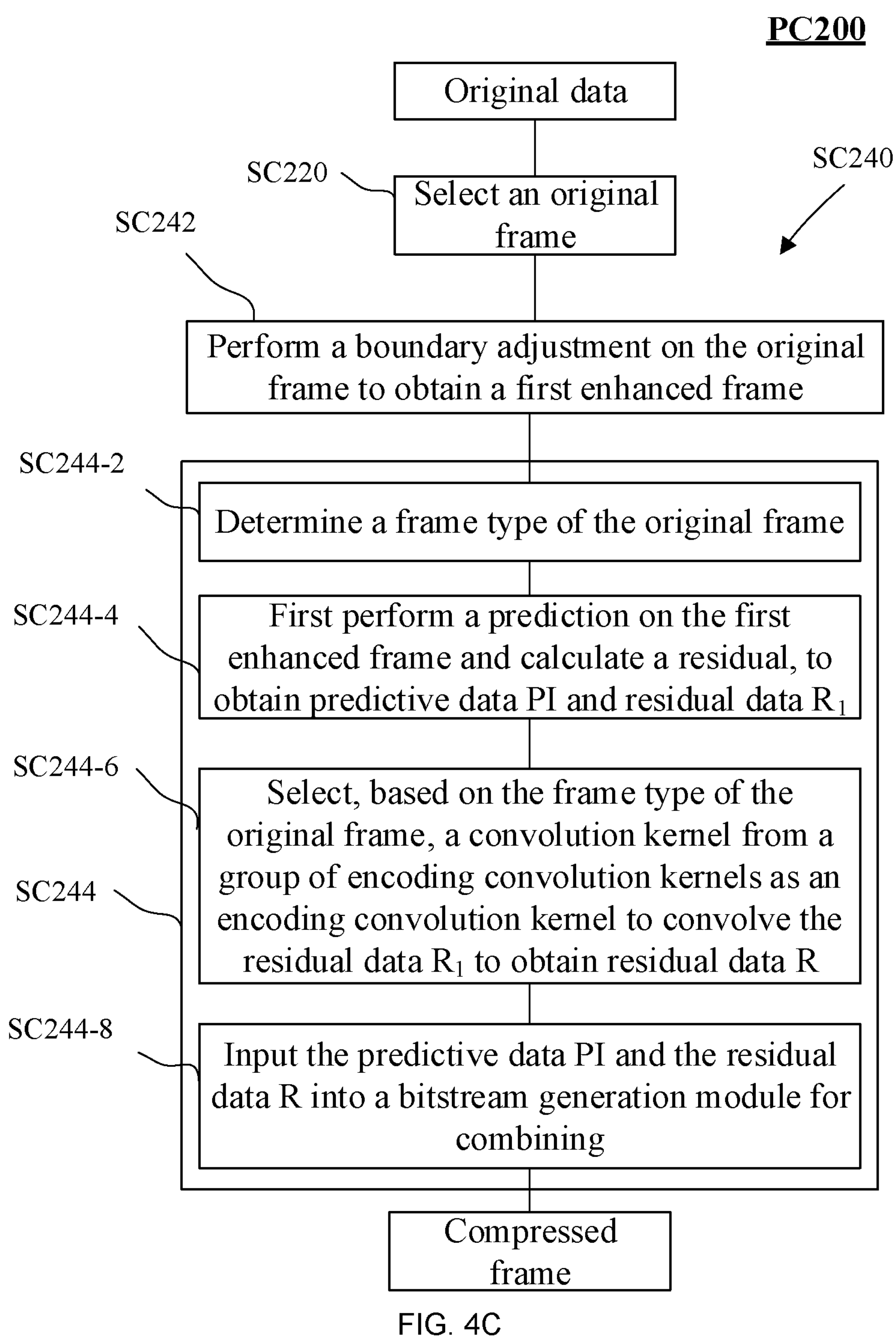
FIG. 4C is a flowchart of a data processing method for data compression according to some exemplary embodiments of this disclosure.
Figure 4D:
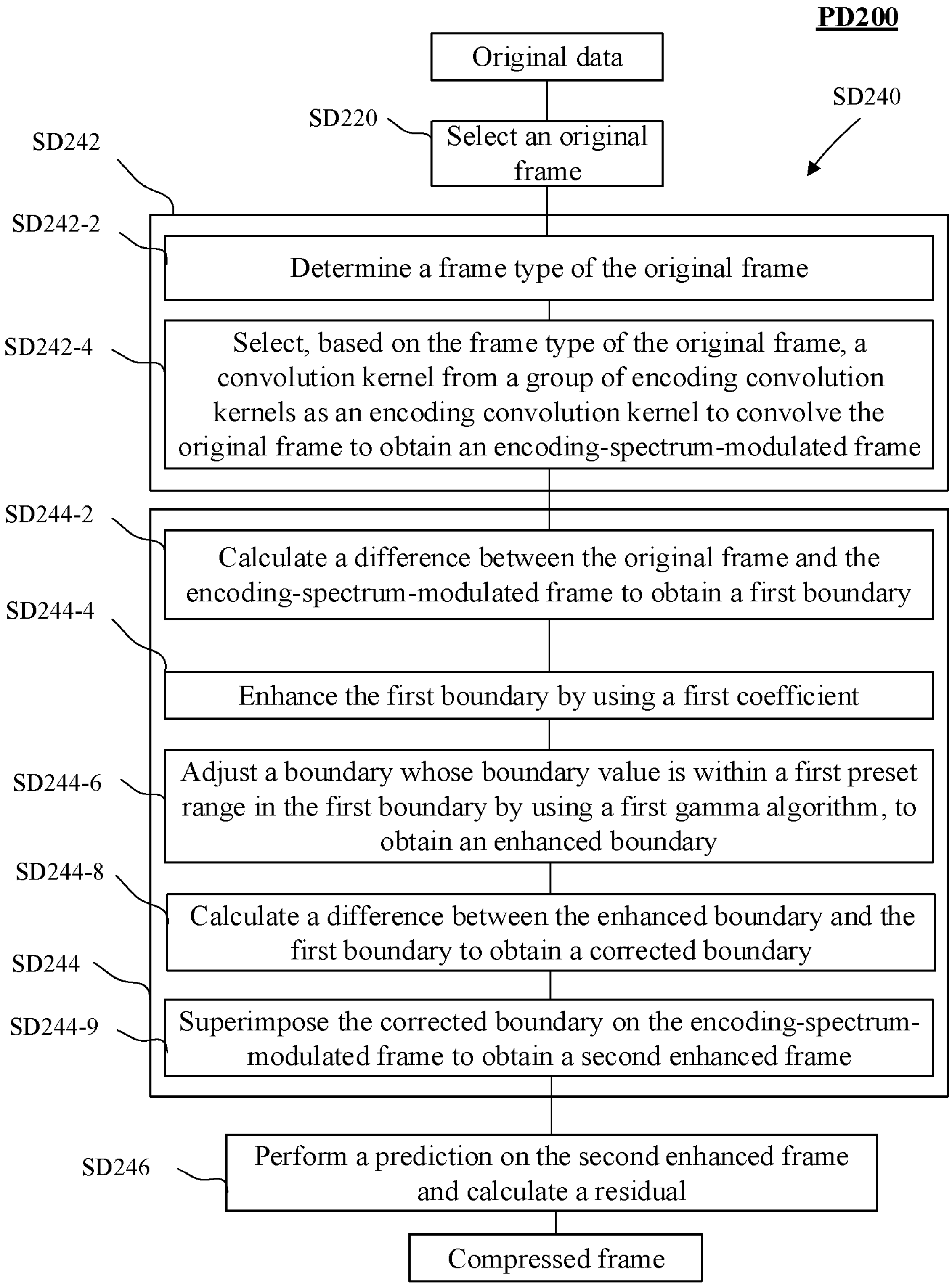
FIG. 4D is a flowchart of a data processing method for data compression according to some exemplary embodiments of this disclosure.

The data processing method P200 may be a data processing method PA200 shown in FIG. 4A, or may be a data processing method PB200 shown in FIG. 4B, or may be a data processing method PC200 shown in FIG. 4C, or may be a data processing method PD200 shown in FIG. 4D. The data processing method PA200 shown in FIG. 4A corresponds to the flowchart shown in FIG. 3A. The data processing method PB200 shown in FIG. 4B corresponds to the flowchart shown in FIG. 3B. The data processing method PC200 shown in FIG. 4C corresponds to the flowchart shown in FIG. 3C. The data processing method PD200 shown in FIG. 4D corresponds to the flowchart shown in FIG. 3D.

As shown in FIG. 4A, the method PA200 may include the following steps.

SA220. Select an original frame from original data.

A frame is a processing unit that makes up a data sequence. In data processing, calculation is often performed the unit of frame. The original data may include one or more original frames. The original frame may include original data of a preset quantity of bytes. As described above, this disclosure is described by using video data as an example. Therefore, the original data may be original video data, and the original frame may be a frame image in the original video data. In step SA220, the data compression device 200 may select some frame images in the original data as the original frames, or may select all frame images in the original data as the original frames. The data compression device 200 may select the original frame based on an application scenario of the original data. If the original data is applied in a scenario that does not require high precision and compression quality, some frame images may be selected as the original frames. For example, for surveillance images of a quiet place; in most cases, there are no foreign objects in the pictures; therefore, most frame images of the surveillance images of this place may be the same, and the data compression device 200 may select some frame images as the original frames for compression and transmission. In another example to ensure a desirable viewing effect of a high-definition television video, the data compression device 200 may select all frame images as the original frames for compression and transmission.

SA240. Perform the data compression on the original frame to obtain a compressed frame.

The data compression may include performing the boundary adjustment on the original frame and performing the encoding spectrum modulation on an under-compression-frame. The performing of the boundary adjustment on the original frame may be adjusting a boundary whose boundary value is within a first preset range in a boundary of the original frame by using a first gamma algorithm.

The performing of the encoding spectrum modulation on the under-compression-frame may include performing the encoding spectrum modulation by inputting the under-compression-frame into an encoding spectrum modulator. The encoding spectrum modulation refers to modulating an amplitude of a spectrum graph of the under-compression-frame. For example, the encoding spectrum modulation may be implemented by an attenuator. The attenuator may attenuate an amplitude of the under-compression-frame in a frequency domain, thereby reducing an amount of data information in the under-compression-frame.

The attenuator may be configured to decrease an amplitude of the under-compression-frame in a selected region in the frequency domain, for example, an amplitude in an intermediate-frequency region or an amplitude in a high-frequency region, in another example, an amplitude in a low-frequency to intermediate-frequency region, in another example, an amplitude in an intermediate-frequency to high-frequency region. For different forms of data, a receiver's sensitivity to frequencies is different. Therefore, in the data compression operation, different regions in the frequency domain may be selected for amplitude attenuation based on the different forms of data. As described above, using the video data as an example, because there are rich intermediate-frequency information and high-frequency information at an edge of an object in an image, but an intermediate-frequency region and a high-frequency region carry more data, reducing an amplitude in an intermediate-frequency to high-frequency region may visually blur boundary data of the under-compression-frame, and also greatly reduce an amount of information in the image. It should be noted that decreasing an amplitude in a low-frequency region may also reduce the amount of information in the image. A person of ordinary skill in the art would understand that, as compared with a case without encoding spectrum modulation processing, frequency components in a low-frequency to high-frequency region in an intermediate state frame that undergoes the encoding spectrum modulation processing are reduced, and an amount of data information is also reduced. Therefore, the intermediate state frame that undergoes the encoding spectrum modulation processing may have a higher compression ratio in encoding. For different types of data, the low-frequency region, the intermediate-frequency region, and the high-frequency region may be defined differently. In some exemplary embodiments, high frequencies may include frequencies within a range of (0.33, 0.5] in a normalized frequency domain. For example, the high frequencies may include an interval between any two frequencies of 0.33, 0.34, 0.35, 0.36, 0.37, 0.38, 0.39, 0.4, 0.41, 0.42, 0.43, 0.44, 0.45, 0.46, 0.47, 0.48, 0.49, and 0.5 in the normalized frequency domain, where 0.5 is a maximum frequency that is normalized.

Taking video data compression as an example, the data processing method P200 may use a combination of the encoding spectrum modulation and encoding to compress the original frame, and smoothly decrease the amplitude in the intermediate-frequency region, so as to reduce the amount of data information, and further improve a compression ratio of the video data and efficiency of video transmission. The under-compression-frame may include the original frame and any data state before the original frame becomes the compressed frame during the data compression, for example, any data state of the original frame during the encoding spectrum modulation and the encoding, for example, the original frame, a predictive frame, or a residual frame. In FIG. 3A and FIG. 4A, the under-compression-frame may be the original frame.

Step SA240 may be as follows: first performing the boundary adjustment on the original frame, and then performing the encoding spectrum modulation. Specifically, step SA240 may include:

SA242. Perform the boundary adjustment on the original frame $P_0$ to obtain a first enhanced frame $P_0'$.

For a piece of image data or video data, after the encoding spectrum modulation is performed, the image or video may become blurred, and an amount of data information in the image data or video data become smaller, consequently, a difference between adjacent pixels becomes smaller. Encoding the image data or video data by using the ITU-T Recommendation H.264/H.265 may cause a loss of some details of the image or video to some extent. In other words, after a boundary with a small difference between adjacent pixels undergoes the encoding processing, the difference between adjacent pixels may become smaller or even disappear, and consequently, details in the image data or video data are lost. Therefore, to avoid a loss of a boundary with a small difference between adjacent pixels during encoding and decoding, the boundary adjustment needs to be performed on the boundary with a small difference between adjacent pixels to enhance the boundary, so that after the encoding and decoding, a detail part may still be retained. For a boundary with a large difference between adjacent pixels, even if the encoding spectrum modulation processing is performed, the retained boundary is still sufficiently large, and after the encoding and decoding processing, the boundary does not disappear. Therefore, the boundary adjustment may not be performed on the boundary with a large difference between adjacent pixels.

Figure 5A:
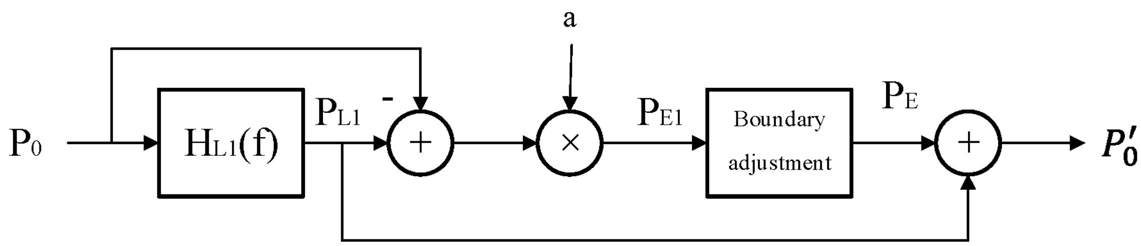
FIG. 5A is a flowchart of obtaining a first enhanced frame according to some exemplary embodiments of this disclosure.

FIG. 5A is a flowchart of obtaining the first enhanced frame according to some exemplary embodiments of this disclosure. As shown in FIG. 4A and FIG. 5A, step SA242 may include:

SA242-2. Adjust the original frame $P_0$ by using a first adjustment function $H_{L1}(f)$ to obtain a first frame.

For ease of description, data in the first frame is defined as $P_{L1}$. In a frequency domain, the first adjustment function $H_{L1}(f)$ may be a low-pass filter to smoothly decrease an amplitude of the original frame $P_0$ in the frequency domain, and retain a component of the original frame $P_0$ in the low-frequency region in the frequency domain, but attenuate a component in the intermediate-frequency to high-frequency region to obtain the first frame $P_{L1}$. The first frame $P_{L1}$ is a blurred image. The first adjustment function $H_{L1}(f)$ may be any smoothly transitioned low-pass filter in any form. This is not limited in this disclosure.

SA242-4. Calculate a difference between the original frame $P_0$ and the first frame $P_{L1}$ to obtain a first boundary.

For ease of description, data in the first boundary is defined as $P_{E1}$. The first boundary $P_{E1}$ includes boundary information of the original frame $P_0$. The first boundary $P_{E1}$ may be expressed by using the following formula:

$$P_{E1} = P_0 - P_{L1} = P_0 - P_0 * H_{L1}(f) \quad \text{formula (1)}$$

Intermediate-frequency to high-frequency components in a spectrum of each frame of data are mainly centralized in a region in which data changes dramatically in the frame of data, that is, boundary data of the frame. For example, for a frame image, the intermediate-frequency to high-frequency data may be mainly centralized in a boundary of an object in the image, that is, boundary data of the frame image. The first adjustment function $H_{L1}(f)$ smoothly decreases the amplitude of the original frame $P_0$ in the frequency domain to attenuate the component in the intermediate-frequency to high-frequency region. Therefore, the first frame $P_{L1}$ may be understood as data from which the boundary information of the original frame $P_0$ is removed. Next, the difference between the original frame $P_0$ and the first frame $P_{L1}$ is calculated, and the boundary of the original frame $P_0$, that is, the first boundary $P_{E1}$, may be obtained.

In some exemplary embodiments, step SA242 may further include:

SA242-6. Enhance the first boundary $P_{E1}$ by using a first coefficient a.

The first coefficient a may be any number greater than 1. In some exemplary embodiments, the first boundary $P_{E1}$ may be data obtained by calculating the difference between the original frame $P_0$ and the first frame $P_{L1}$. In some exemplary embodiments, the first boundary $P_{E1}$ may be the boundary enhanced by using the first coefficient a. In this case, the first boundary $P_{E1}$ may also be expressed by using the following formula:

$$P_{E1} = a * (P_0 - P_{L1}) = a * (P_0 - P_0 * H_{L1}(f)) \quad \text{formula (2)}$$

As described above, when the boundary adjustment is performed on the boundary of the original frame, the boundary adjustment is performed only on the boundary with a small difference between adjacent pixels. To prevent the boundary adjustment from affecting another boundary that does not need to be adjusted, the data compression device 200 may first perform signal amplification on the first boundary $P_{E1}$ by using the first coefficient a greater than 1.

SA242-8. Adjust a boundary whose boundary value is within the first preset range in the first boundary $P_{E1}$ by using the first gamma algorithm to obtain an enhanced boundary.

For ease of description, data in the enhanced boundary is defined as $P_E$. As described above, when the boundary adjustment is performed on the boundary of the original frame, the boundary adjustment is performed only on the boundary with a small difference between adjacent pixels. The first preset range may be a boundary value that requires the boundary adjustment. The boundary value may be a value corresponding to each pixel in the first boundary $P_{E1}$. Specifically, the first preset range may be a range of [−R1, R1]. R1 may be a boundary threshold. For example, R1 may be 30, 40, or 50. In some exemplary embodiments, R1 may be any number from 5 to 30.

Figure 5B:
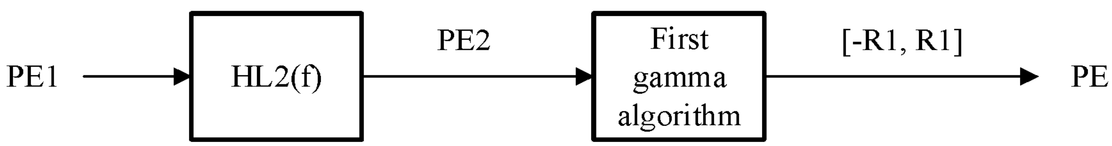
FIG. 5B is a flowchart of performing a boundary adjustment according to some exemplary embodiments of this disclosure.

FIG. 5B is a flowchart of performing the boundary adjustment according to some exemplary embodiments of this disclosure. As shown in FIG. 5B, step SA242-8 may be as follows: the data compression device 200 adjusts the first boundary $P_{E1}$ by using a second adjustment function $H_{L2}(f)$ to obtain a second boundary $P_{E2}$; and adjusts a boundary whose boundary value is within the first preset range [−R1, R1] in the second boundary $P_{E2}$ to obtain the enhanced boundary $P_E$.

A lot of components in the intermediate-frequency to high-frequency region may be included in a boundary that does not require the boundary enhancement in the boundary of the original frame (first boundary $P_{E1}$). Therefore, to prevent the boundary enhancement from affecting another boundary that does not need to be adjusted, the data compression device 200 may first filter the first boundary $P_{E1}$ to filter out the components in the intermediate-frequency to high-frequency region. The second adjustment function $H_{L2}(f)$ may be a low-pass filter whose direct current DC component is equal to 1, so as to retain a component of the first boundary $P_{E1}$ in the low-frequency region in the frequency domain, but filter out a component thereof in the intermediate-frequency to high-frequency region.

Figure 6:
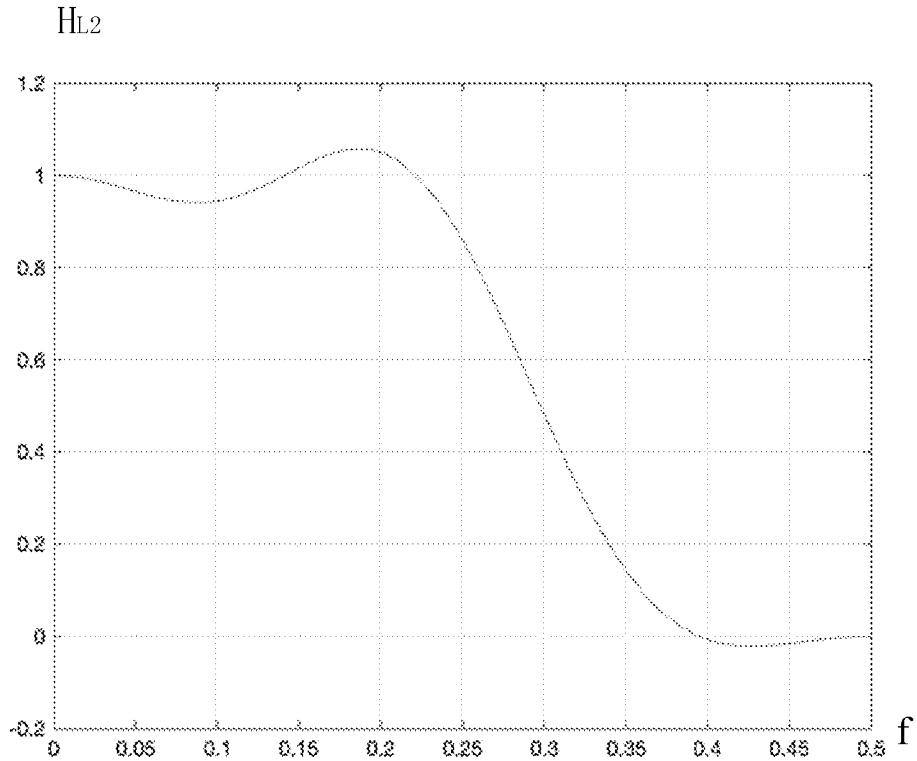
FIG. 6 is a graph of a second adjustment function according to some exemplary embodiments of this disclosure.

FIG. 6 is an amplitude frequency response of the second adjustment function $H_{L2}(f)$ according to some exemplary embodiments of this disclosure. A horizontal axis is a normalized frequency $f$, and a vertical axis is an amplitude modulation gain $H_{L2}$ of the second adjustment function $H_{L2}(f)$. The normalized frequency $f$ on the horizontal axis may be divided into a low-frequency region, a medium-low-frequency region, an intermediate-frequency region, a medium-high-frequency region, and a high-frequency region. As shown in FIG. 6, a maximum value of the normalized frequency on the horizontal axis is 0.5. As described above, the high-frequency region may include frequencies within (d, 0.5] in the normalized frequency domain, where d is a lower frequency limit of the high-frequency region. For example, d may be any frequency of 0.35, 0.36, 0.37, 0.38, 0.39, 0.4, 0.41, 0.42, 0.43, 0.44, and 0.45 in the normalized frequency domain. The intermediate-frequency region may include frequencies within (b, c], where b is a lower frequency limit of the intermediate-frequency region, and c is an upper frequency limit of the intermediate-frequency region. For example, the lower frequency limit b of the intermediate-frequency region may be any frequency of 0.15, 0.16, 0.17, 0.18, 0.19, 0.2, 0.21, 0.22, 0.23, 0.24, 0.25, 0.26, 0.27, and 0.28 in the normalized frequency domain; and the upper frequency limit c of the intermediate-frequency region may be any frequency of 0.35, 0.34, 0.33, 0.32, and 0.31 in the normalized frequency domain. The low-frequency region may include frequencies within [0, a] in the normalized frequency domain, where a is an upper frequency limit of the low-frequency region. The upper frequency limit a of the low-frequency region may be any frequency of 0.01, 0.02, 0.03, 0.04, 0.05, 0.06, 0.07, 0.08, 0.09, 0.10, 0.12, 0.13, 0.14, and 0.15 in the normalized frequency domain. When the low-frequency region is not connected to the intermediate-frequency region, a frequency region between these two is referred to as the medium-low-frequency region. When the intermediate-frequency region is not connected to the high-frequency region, a frequency region between these two is referred to as the medium-high-frequency region.

The second adjustment function $H_{L2}(f)$ may filter out the component in the intermediate-frequency to high-frequency region. A stop band interval in the second adjustment function $H_{L2}(f)$ may be any interval between frequencies 0.25 and 0.50. For example, the stop band interval in the second adjustment function $H_{L2}(f)$ may be within an interval specified by any two values of 0.25, 0.27, 0.29, 0.31, 0.33, 0.35, 0.37, 0.39, 0.41, 0.43, 0.45, and 0.50. A pass band interval in the second adjustment function $H_{L2}(f)$ may be any interval between frequencies 0 and 0.35. For example, the pass band interval in the second adjustment function $H_{L2}(f)$ may be within an interval specified by any two different values selected from 0, 0.02, 0.04, 0.06, 0.08, 0.10, 0.12, 0.14, 0.15, 0.17, 0.19, 0.21, 0.23, 0.25, 0.27, 0.29, 0.21, 0.23, and 0.35.

Figure 7:
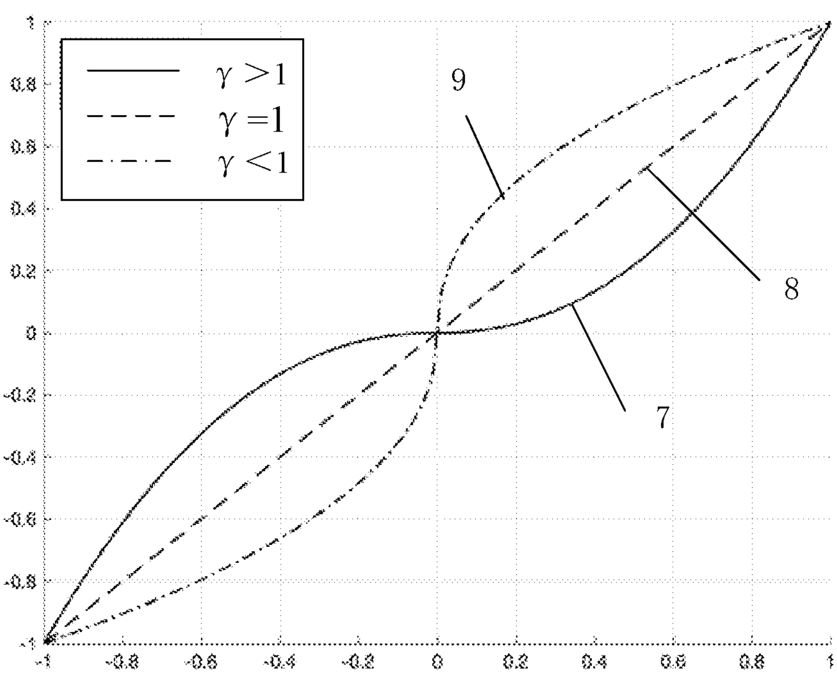
FIG. 7 is a graph of a gamma algorithm according to some exemplary embodiments of this disclosure.

FIG. 7 is a graph of a gamma algorithm according to an embodiment of this disclosure. The gamma algorithm is a method for adjusting brightness of a nonlinear image and video. A curve of a normalized function thereof is shown in FIG. 7. The gamma algorithm is an algorithm for dynamically adjusting pixel values of an image. As shown in FIG. 7, a horizontal axis is a value without adjusting by the gamma algorithm, and a vertical axis is a value with adjusting by the gamma algorithm. A curve 7 represents a curve on which a gamma value γ is greater than 1. A curve 8 represents a curve on which a gamma value γ is equal to 1. A curve 9 represents a curve on which γ is less than 1. When γ is greater than 1, after the image is corrected by using the gamma algorithm, an absolute value of a global grayscale value becomes smaller. When γ is less than 1, after the image is corrected by using the gamma algorithm, an absolute value of a global grayscale value becomes larger. The gamma algorithm shown in FIG. 7 is an extended gamma algorithm. To be specific, using an origin (0, 0) as a symmetric point, the gamma algorithm is extended to a third quadrant in a centrosymmetric manner.

In step SA242-8, the data compression device 200 may perform a boundary correction on the boundary of the original frame by using the first gamma algorithm. The data compression device 200 may perform the boundary adjustment on pixels of the second boundary $P_{E2}$ one by one. Specifically, the data compression device 200 may compare a boundary value corresponding to each pixel in the second boundary $P_{E2}$ with the boundary threshold R1; and when the boundary value is within [−R1, R1], adjust the boundary value by using the first gamma algorithm; or when the boundary value is beyond [−R1, R1], perform no adjustment.

In some exemplary embodiments, the data compression device 200 may use the first gamma algorithm to perform the boundary adjustment on the second boundary $P_{E2}$ to enhance the boundary. In this case, the first gamma algorithm may be a gamma algorithm whose gamma value γ is less than 1. The data compression device 200 may perform the boundary enhancement on the pixels of the second boundary $P_{E2}$ one by one. Specifically, the data compression device 200 may compare the boundary value corresponding to each pixel in the second boundary $P_{E2}$ with the boundary threshold R1; and when the boundary value is within [−R1, R1], enhance the boundary value by using the first gamma algorithm, so that an absolute value of the boundary value becomes larger; or when the boundary value is beyond [−R1, R1], perform no enhancement. The data compression device 200 may perform the boundary adjustment by using a table lookup method. The data compression device 200 may store Table 1. Table 1 stores a correspondence between an input boundary value and an output boundary value in the first gamma algorithm, that is, a correspondence between a boundary value before the adjustment and a boundary value after the adjustment. Using R1=5 as an example, Table 1 may be expressed as follows:

TABLE 1

| | | | | | | | | | | | |
|---|---|---|---|---|---|---|---|---|---|---|---|
| Input boundary value | −5 | −4 | −3 | −2 | −1 | 0 | 1 | 2 | 3 | 4 | 5 |
| Output boundary value | −5 | −5 | −4 | −3 | −2 | 0 | 2 | 3 | 4 | 5 | 5 |

In some exemplary embodiments, the data compression device 200 may further use the first gamma algorithm to perform the boundary adjustment on the second boundary $P_{E2}$ to weaken the boundary, so as to reduce the noise. In this case, the first gamma algorithm may be a gamma algorithm whose gamma value γ is greater than 1. Specifically, the data compression device 200 may use the gamma algorithm whose gamma value γ is greater than 1 to weaken a boundary within the first preset range [−R1, R1] in the second boundary $P_{E2}$ to reduce the absolute value of the boundary value, thereby eliminating noise from the second boundary $P_{E2}$ and increasing definition of the original data. Noise in the image mostly exists in the boundary areas where boundary values are small. Weakening the boundary within the first preset range [−R1, R1] may effectively eliminate the noise.

In some exemplary embodiments, the data compression device 200 may perform the boundary adjustment on the second boundary $P_{E2}$ by using the first gamma algorithm to perform the boundary enhancement and the boundary weakening on the second boundary $P_{E2}$ simultaneously and obtain an enhanced and noise-reduced image, where the image may be used for preprocessing before image compression, so that better image quality is obtained. In this case, the first gamma algorithm may be a gamma algorithm whose gamma value γ is less than 1 within [−R1, −R2] and [R2, R1] and whose gamma value γ is greater than 1 within [−R2, R2], where R2<R1. The data compression device 200 may perform the boundary adjustment on the pixels of the second boundary $P_{E2}$ one by one. Specifically, the data compression device 200 may compare the boundary value corresponding to each pixel in the second boundary $P_{E2}$ with boundary thresholds R1 and R2; and when the boundary value is within [−R1, −R2] or [R2, R1], use the gamma algorithm whose gamma value γ is less than 1 to enhance the boundary value, so that the absolute value of the boundary value becomes larger; when the boundary value is within [−R2, R2], use the gamma algorithm whose gamma value γ is greater than 1 to weaken the boundary value to reduce the absolute value of the boundary value, thereby eliminating noise in the second boundary $P_{E2}$; or when the boundary value is beyond [−R1, R1], perform no adjustment. The data compression device 200 may perform the boundary enhancement and the boundary weakening on the second boundary $P_{E2}$ by using Table 2. Taking R1=5 and R2=1 as an example, Table 2 may be expressed as follows:

TABLE 2

| | | | | | | | | | | | |
|---|---|---|---|---|---|---|---|---|---|---|---|
| Input boundary value | −5 | −4 | −3 | −2 | −1 | 0 | 1 | 2 | 3 | 4 | 5 |
| Output boundary value | −5 | −5 | −4 | −3 | 0 | 0 | 0 | 3 | 4 | 5 | 5 |

As shown in Table 2, when the boundary value is within [−1, 1], the boundary weakening is performed by using the gamma value γ greater than 1 to reduce the noise. When the boundary value is within [−5, −1] and [1, 5], the boundary enhancement is performed by using the gamma value γ less than 1.

Figure 5C:
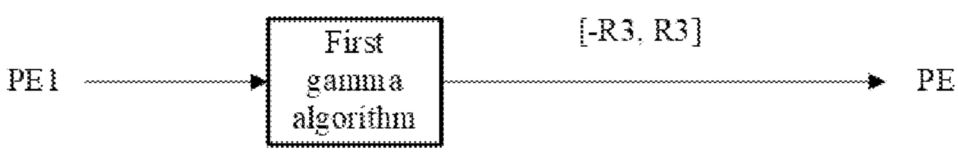
FIG. 5C is another flowchart of performing a boundary adjustment according to some exemplary embodiments of this disclosure.

FIG. 5C is a flowchart of performing the boundary adjustment according to some exemplary embodiments of this disclosure. As shown in FIG. 5C, step SA242-8 may also be as follows: the data compression device 200 directly adjusts a boundary whose boundary value is within the first preset range [−R3, R3] in the first boundary $P_{E1}$ by using the first gamma algorithm to obtain the enhanced boundary $P_E$. R3 may be different from R1, or may be the same as R1.

Step SA242 may further include:

SA242-9. Superimpose the enhanced boundary $P_E$ on the first frame $P_{L1}$ to obtain the first enhanced frame $$P_0'.$$

Step SA240 may further include:

SA244. Perform the encoding spectrum modulation and the encoding on the first enhanced frame $$P_0'.$$

In step SA244, the data compression device 200 may first perform the encoding spectrum modulation on the first enhanced frame $$P_0'$$

to smoothly decrease an amplitude of the first enhanced frame $$P_0'$$

in the frequency domain, thereby blurring boundary information of the first enhanced frame $$P_0',$$

obtaining an encoding-spectrum-modulated frame, reducing an amount of information in the first enhanced frame $$P_0',$$

and reducing space resources occupied by the first enhanced frame $$P_0'$$

after the compression; then encode the encoding-spectrum-modulated frame, that is, perform a prediction and calculate a residual to perform a prediction on the encoding-spectrum-modulated frame and obtain a predictive frame of the encoding-spectrum-modulated frame and the predictive data PI; and then perform subtraction between the predictive frame of the encoding-spectrum-modulated frame and the original frame of the encoding-spectrum-modulated frame to obtain residual data R of the encoding-spectrum-modulated frame, and input the residual data R and the predictive data PI into a bitstream generation module for combining to obtain the compressed frame. The data processing method P200 may improve encoding efficiency of the encoding-spectrum-modulated frame, further reduce an amount of data in the compressed frame, improve encoding efficiency, and improve a compression ratio. Because an object of the encoding spectrum modulation is the first enhanced frame $$P_0',$$

the under-compression-frame is the first enhanced frame $$P_0'.$$

Taking the video data as an example, step SA244 may include:

SA244-2. Determine a frame type of the original frame.

As described above, when the ITU-T Recommendation H.264 or H.265 is used to encode the video data, frames are often compressed into different frame types based on frame images. Therefore, before performing the encoding spectrum modulation on the under-compression-frame (first enhanced frame $$P_0'),$$

the data compression device 200 may need to first determine the frame type of the original frame, and an encoding convolution kernel selected for different frame types may also be different.

For a video frame sequence, specific frame types may include an intra predictive frame (I-frame), a forward predictive frame (P-frame), and a bidirectional predictive frame (B-frame). For a frame sequence with only one frame, the frame sequence is usually processed as an intra predictive frame (I-frame). The I-frame is an encoded frame compressed within a full frame. During decoding, only data of the I-frame is needed to reconstruct complete data without referring to other pictures; and the I-frame may be used as a reference frame for several subsequent frames. The P-frame is an encoded frame in which transmitted data is compressed by sufficiently reducing temporal redundancy information of a previously encoded frame in the image sequence. The P-frame is a predictive frame obtained based on a previous P-frame or I-frame. The P-frame is compressed based on a difference between the P-frame and one or more adjacent previous frames. A method of jointly compressing the P-frame and the I-frame may achieve higher compression without a significant compression trace. The P-frame only refers to an adjacent previous I-frame or P-frame. The B-frame is compressed based on differences between several adjacent previous frames, the B-frame, and several subsequent frames, that is, only the differences between the B-frame and the previous and subsequent frames are recorded. In general, the I-frame has the lowest compression efficiency, the P-frame has higher compression efficiency, and the B-frame has the highest compression efficiency. During video data encoding, some video frames may be compressed into I-frames, some may be compressed into P-frames, and others may be compressed into B-frames. The frame type of the original frame may include at least one or more of the I-frame, P-frame, and B-frame.

SA244-4. Select, based on the frame type of the original frame, a convolution kernel from a group of encoding convolution kernels as the encoding convolution kernel to convolve the under-compression-frame to obtain the encoding-spectrum-modulated frame.

Specifically, step SA244-4 may be performing the encoding spectrum modulation on the under-compression-frame (first enhanced frame $$P_0')$$

to obtain the encoding-spectrum-modulated frame. The encoding spectrum modulation may include using the encoding convolution kernel to convolve the under-compression-frame to smoothly decrease an amplitude of the under-compression-frame in the intermediate-frequency region in the frequency domain.

Performing spectrum modulation on the under-compression-frame may be performed by multiplying the under-compression-frame by a transfer function $H_1(f)$ (that is, an encoding spectrum modulation function) in the frequency domain, or performing corresponding convolution calculation in a time domain. If the under-compression-frame is digitized data, the convolution calculation may be convolution calculation performed by selecting an encoding convolution kernel corresponding to the encoding spectrum modulation function $H_1(f)$. For ease of description, the convolution in the time domain is used as an example in this disclosure to describe the spectrum modulation. However, a person skilled in the art should understand that a manner of performing spectrum modulation by performing multiplication by the encoding spectrum modulation function $H_1(f)$ in the frequency domain also falls within the protection scope of this disclosure.

As described above, performing the encoding spectrum modulation on the under-compression-frame may be performed by convolving the under-compression-frame in the time domain. The storage medium of the data compression device 200 may store a plurality of encoding spectrum modulators, that is, a group of encoding spectrum modulators. Each encoding spectrum modulator includes a group of encoding convolution kernels. In other words, the storage medium of the data compression device 200 may include the group of encoding convolution kernels, and the group of encoding convolution kernels may include at least one convolution kernel. When convolving the under-compression-frame, the data compression device 200 may select a convolution kernel from the group of encoding convolution kernels as the encoding convolution kernel based on a frame type of the under-compression-frame corresponding to the original frame, and then convolve the under-compression-frame. When the under-compression-frame corresponding to the original frame is an I-frame or a P-frame, convolving the I-frame or P-frame by the data compression device 200 may include: selecting a convolution kernel from the group of encoding convolution kernels as the encoding convolution kernel, and then convolving the I-frame or P-frame. Any one of the convolution kernels in the group of convolution kernels may decrease the amplitude of the I-frame or P-frame in the frequency domain, so that the amplitude in the intermediate-frequency region is smoothly decreased. The data compression device 200 may also select a convolution kernel with a best compression effect from the group of encoding convolution kernels as the encoding convolution kernel according to an encoding quality requirement of the original frame. When the under-compression-frame (in this exemplary embodiment, the first enhanced frame) corresponding to the original frame may be a B-frame, the encoding convolution kernel for the under-compression-frame may be the same as an encoding convolution kernel corresponding to a reference frame closest to the under-compression-frame, or the encoding convolution kernel for the under-compression-frame may be the same as an encoding convolution kernel corresponding to a reference frame with highest attenuation in adjacent reference frames closest in two directions, or the encoding convolution kernel for the under-compression-frame is an average value of encoding convolution kernels corresponding to adjacent reference frames closest in two directions. When distances between the B-frame and two adjacent reference frames are the same, the encoding convolution kernel for the under-compression-frame may be an encoding convolution kernel corresponding to either of the reference frames in two directions. For example, a convolution kernel corresponding to an adjacent reference frame in a forward direction is selected for the current B-frame. In this way, an effect of decreasing the amplitude of the under-compression-frame is better, and an effect of the encoding spectrum modulation is better, so that the compression ratio of the video data is higher.

Figure 8A:
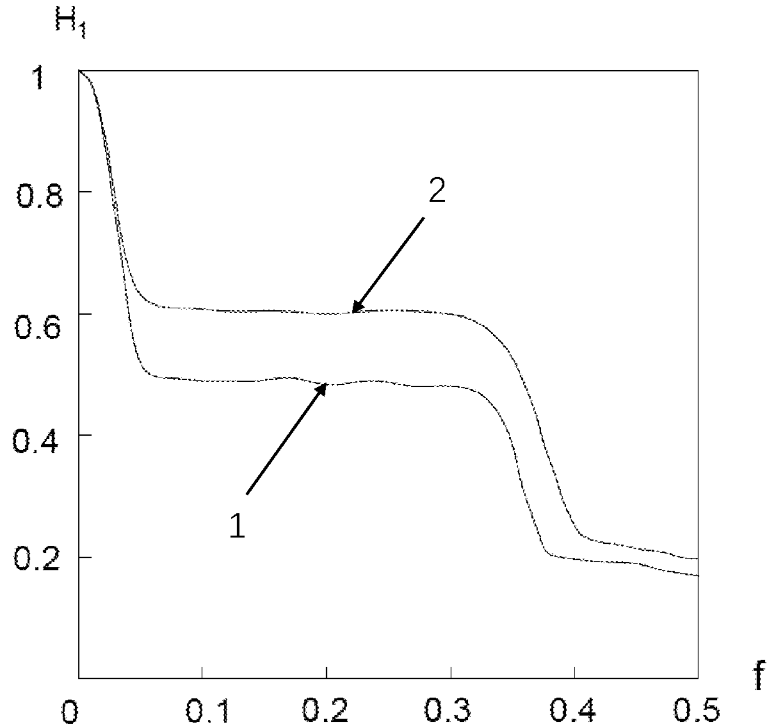
FIG. 8A is a graph of an encoding spectrum modulation function according to some exemplary embodiments of this disclosure.

FIG. 8A is a graph of an encoding spectrum modulation function $H_1(f)$ according to some exemplary embodiments of this disclosure. As shown in FIG. 8A, a horizontal axis is a normalized frequency $f$, and a vertical axis is an amplitude modulation gain $H_1$ of the encoding spectrum modulation function $H_1(f)$. A curve 1 and a curve 2 in FIG. 8A represent different encoding spectrum modulation functions $H_1(f)$ corresponding to different encoding convolution kernels. Using the video data as an example, because human eyes are more sensitive to data in the low-frequency to intermediate-frequency region than data in the high-frequency region, when the encoding spectrum modulation is performed on the video data, information in the low-frequency to intermediate-frequency region included in the original frame should be retained as much as possible without any loss, and amplitude gains in the intermediate-frequency region and low-frequency region should be relatively stable. Therefore, the information in the low-frequency to intermediate-frequency region is retained as stable and complete as possible, so that the information in the low-frequency to intermediate-frequency region may be better restored during decompression. Therefore, an amplitude modulation gain $H_1$ of the encoding spectrum modulation function $H_1(f)$ used for the encoding spectrum modulation of the under-compression-frame at any frequency $f$ in the low-frequency to intermediate-frequency region in frequency domain may be greater than zero, amplitudes at all frequencies processed by the encoding spectrum modulation function $H_1(f)$ in the low-frequency to intermediate-frequency region are also greater than zero, and no data of any frequency in the low-frequency to intermediate-frequency region is lost. Therefore, when the compressed data is decompressed, data within all frequency ranges in the low-frequency to intermediate-frequency region may be restored. Otherwise, if the encoding spectrum modulation function $H_1(f)$ has a zero point in the low-frequency to intermediate-frequency region, data of a frequency part corresponding to the zero point may be lost, and a decoder cannot restore the lost data during decompression. As a result, the original data cannot be restored. As described above, data obtained after the first enhanced frame $$P_0'$$

is processed by the encoding spectrum modulation function $H_1(f)$ is defined as $P_1$. Therefore, data of the encoding-spectrum-modulated frame is defined as $P_1$. Because $$P_0'$$

is only an enhancement of $P_0$ in a small range, and there is no enhancement in regions beyond the first preset range, $$P_0'$$

and $P_0$ are consistent in the regions beyond the first preset range. Therefore, a relationship between $P_0$ and $P_1$ may be expressed by using the following formula:

$$P_1 = H_1(f) \cdot P_0' \approx H_1(f) \cdot P_0 \qquad \text{formula (3)}$$

Because human eyes are relatively insensitive to high-frequency data, when the encoding spectrum modulation is performed on the video data, an amplitude of a high-frequency part may be attenuated to a greater extent, and the amplitude in the high-frequency region is greatly decreased. In this way, data information contained in the first enhanced frame may be reduced, and the compression ratio and encoding efficiency may be improved.

Therefore, the encoding spectrum modulation function $H_1(f)$ used for the encoding spectrum modulation may smoothly decrease the amplitude of the under-compression-frame in the frequency domain. In some exemplary embodiments, the encoding spectrum modulation function $H_1(f)$ used for the encoding spectrum modulation may smoothly decrease the amplitude of the under-compression-frame in the high-frequency region in the frequency domain. The smooth decrease of the amplitude may be that the amplitude is attenuated by a first amplitude modulation gain value in the high-frequency region, or that the amplitude is attenuated within an error range around the first amplitude modulation gain value. For example, the first amplitude modulation gain may be any value between 0 and 1. For example, the first amplitude modulation gain may be within an interval specified by any two values of 0, 0.04, 0.08, 0.12, 0.16, 0.20, 0.24, 0.28, 0.32, 0.36, 0.40, 0.44, 0.48, 0.52, 0.56, 0.60, 0.64, 0.68, 0.72, 0.76, 0.80, 0.84, 0.88, 0.92, 0.96, and 1. The error range may be within an interval specified by any two values of 0, ±1%, ±2%, ±3%, ±4%, ±5%, ±6%, ±7%, ±8%, ±9%, ±10%, ±11%, ±12%, ±13%, ±14%, ±15%, ±16%, ±17%, ±18%, ±19%, ±20%, ±21%, ±22%, ±23%, ±24%, ±25%, ±26%, ±27%, ±28%, ±29%, ±30%, and the like. As shown in FIG. 8A, the first amplitude modulation gain resulting from the encoding spectrum modulation in the high-frequency region (probably within an interval of 0.4 to 0.5) is approximately 0.2.

In some exemplary embodiments, the encoding spectrum modulation function $H_1(f)$ used for the encoding spectrum modulation may smoothly decrease the amplitude of the under-compression-frame in the intermediate-frequency region in the frequency domain. An amplitude modulation gain resulting from the encoding spectrum modulation of the under-compression-frame in the intermediate-frequency region is a second amplitude modulation gain. In some exemplary embodiments, a value of the second amplitude modulation gain may be greater than that of the first amplitude modulation gain, as shown in FIG. 8A. When the encoding spectrum modulation is frequency attenuation (that is, when the encoding spectrum modulator is a frequency attenuator), both the first amplitude modulation gain and the second amplitude modulation gain are less than 1. In other words, the decrease of the amplitude resulting from the encoding spectrum modulation of the under-compression-frame in the intermediate-frequency region may be less than that in the high-frequency region.

In addition, the encoding spectrum modulation function $H_1(f)$ may also smoothly decrease the amplitude of the under-compression-frame in the low-frequency region in the frequency domain. An amplitude modulation gain resulting from the encoding spectrum modulation of the under-compression-frame in the low-frequency region is a third amplitude modulation gain. When the encoding spectrum modulation is frequency attenuation (that is, when the encoding spectrum modulator is a frequency attenuator), both the third amplitude modulation gain and the second amplitude modulation gain are less than 1. A value of the third amplitude modulation gain may be greater than or equal to that of the second amplitude modulation gain. In other words, the decrease of the amplitude resulting from the encoding spectrum modulation of the under-compression-frame in the low-frequency region may be less than or equal to that in the intermediate-frequency region.

Further, to reduce an amount of calculation required in an implementation process and avoid a ringing effect, the encoding spectrum modulation function $H_1(f)$ should achieve a smooth transition of an amplitude of the first enhanced frame $$P'_0$$

in the frequency domain. As described above, when spectrum modulation processing is performed on one image, if a selected spectrum modulation function has a drastic value change in a region, a higher-order convolution kernel or convolution kernel combination may be required in the implementation process. This refers to an increase of unnecessary calculation. In addition, a high-order convolution kernel is more likely to cause a strong color oscillation accompanying a drastic grayscale or color change in an output image, and this is referred to as a ringing effect. The ringing effect often occurs at a boundary of an image. The encoding spectrum modulation function $H_1(f)$ should achieve a smooth transition of the amplitude modulation gain for the first enhanced frame $$P'_0$$

in the frequency domain, so that a drastic change of the amplitude modulation gain may be avoided. For example, when the high-frequency region is not connected to the intermediate-frequency region, the encoding spectrum modulation function $H_1(f)$ may modulate the amplitude of the under-compression-frame in the medium-high-frequency region in the frequency domain, so that the change of the amplitude modulation gain in the medium-high-frequency region is smooth and continuous. When the intermediate-frequency region is not connected to the low-frequency region, the encoding spectrum modulation function $H_1(f)$ may modulate an amplitude of the under-compression-frame in the medium-low-frequency region in the frequency domain, so that a change of an amplitude modulation gain in the medium-low-frequency region is continuous.

The encoding spectrum modulation function $H_1(f)$ may further retain a direct current part, that is, an amplitude modulation gain of a part with a frequency 0 is 1, so as to ensure that basic information in the first enhanced frame $$P'_0$$

may be retained. Average value information may be obtained during data decompression to restore the original data. Therefore, the decrease of the amplitude resulting from the encoding spectrum modulation function $H_1(f)$ used for the encoding spectrum modulation in the low-frequency region may be less than that in the intermediate-frequency region. However, when the amplitude gain of the direct current part (that is, the part with the frequency 0) is not 1, the original data may also be restored by designing an appropriate decoding spectrum modulation function $H_2(f)$. Specifically, a specific relationship between $H_1(f)$ and $H_2(f)$ is described in detail in the subsequent description.

In the graph of the encoding spectrum modulation function $H_1(f)$ shown in FIG. 8A, frequencies within (0, 0.1] are low frequencies; frequencies within (0.1, 0.15] are medium-low frequencies; frequencies within (0.15, 0.33] are intermediate frequencies; frequencies within (0.33, 0.4] are medium-high frequencies; and frequencies within (0.4, 0.5] are high frequencies. The third amplitude modulation gain in the low-frequency region is greater than the second amplitude modulation gain in the intermediate-frequency region. The second amplitude modulation gain in the intermediate-frequency region is greater than the first amplitude modulation gain in the high-frequency region. In addition, the second amplitude modulation gain in the intermediate-frequency region is relatively stable, the curve 1 is about 0.5, and the curve 2 is about 0.6. The first amplitude modulation gain $H_1$ in the high-frequency region is also relatively stable, the curve 1 is slightly lower than 0.2, and the curve 2 is slightly higher than 0.2. The curve of the encoding spectrum modulation function $H_1(f)$ is a smooth curve. In engineering implementation, on a basis of achieving an amplitude decrease, the curve of the encoding spectrum modulation function $H_1(f)$ may be allowed to fluctuate within a small range, and the fluctuation has no impact on a compression effect. For other forms of data than the video data, parameters of the encoding spectrum modulation function $H_1(f)$ may be set according to a receiver's sensitivity to the data. For different forms of data, the receiver's sensitivity to frequencies may also be different.

Figure 8B:
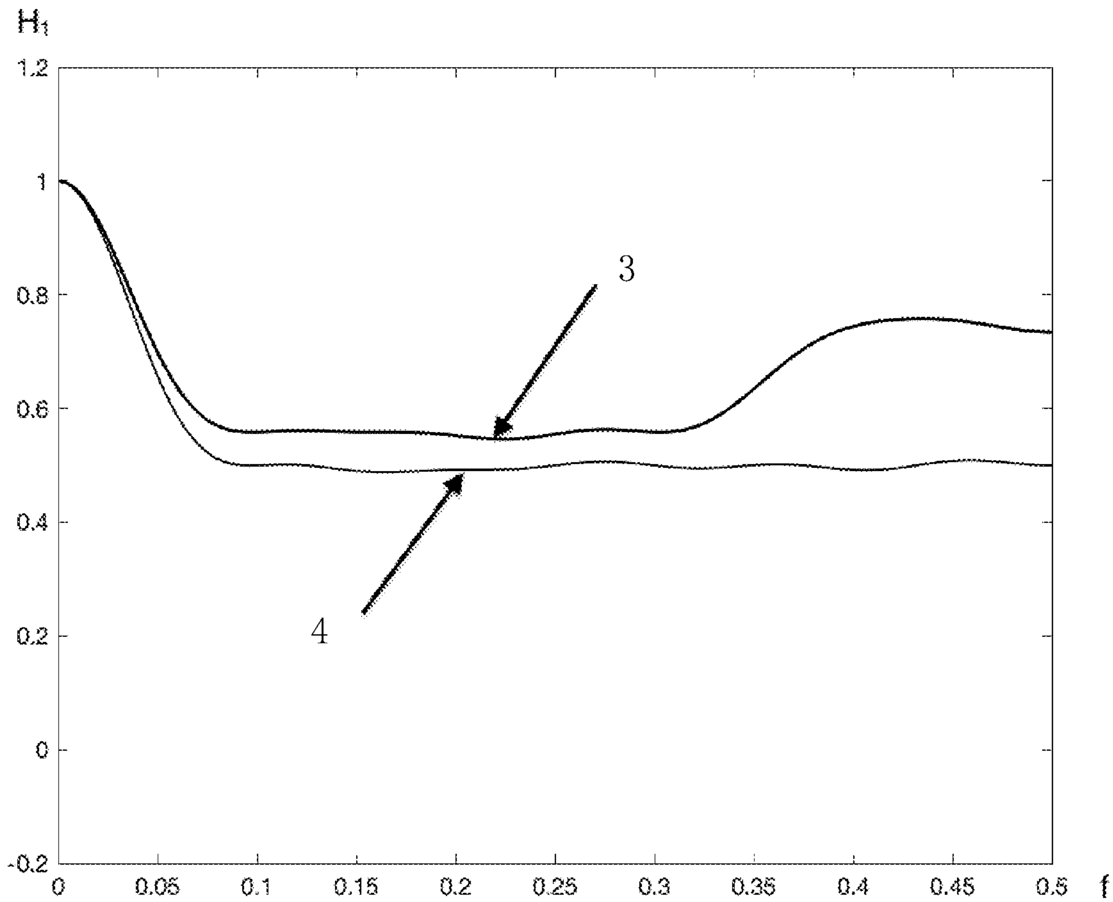
FIG. 8B is a graph of an encoding spectrum modulation function according to some exemplary embodiments of this disclosure.

FIG. 8B is a graph of an encoding spectrum modulation function $H_1(f)$ according to some exemplary embodiments of this disclosure. A curve 3 and a curve 4 in FIG. 8B represent different encoding spectrum modulation functions $H_1(f)$ corresponding to different encoding convolution kernels. With regard to the video data, in some special application scenarios such as reconnaissance scenarios, it is necessary to properly retain more high-frequency components. Therefore, in some exemplary embodiments, in the curve of the encoding spectrum modulation function $H_1(f)$, the first amplitude modulation gain may be greater than the second amplitude modulation gain (curve 3), or equal to the second amplitude modulation gain (curve 4).

With regard to the video data, in some application scenarios that do not require high image quality, high-frequency components may be fully filtered out. Therefore, an amplitude modulation gain $H_1$ of the encoding spectrum modulation function $H_1(f)$ used for the encoding spectrum modulation of the under-compression-frame at any frequency in the low-frequency to intermediate-frequency region in the frequency domain may be greater than zero, but the amplitude modulation gain $H_1$ in the high-frequency region may be equal to 0 (not shown in FIG. 8A and FIG. 8B).

It should be noted that the curves shown in FIG. 8A and FIG. 8B are described only by using the video data as an example. A person skilled in the art should understand that the curve of the encoding spectrum modulation function $H_1(f)$ is not limited to the forms shown in FIG. 8A and FIG. 8B. All encoding spectrum modulation functions $H_1(f)$ that may smoothly decrease an amplitude of the first enhanced frame in the intermediate-frequency region in the frequency domain and a linear combination of encoding spectrum modulation functions $$H_1(f) = \Sigma_{i=1}^{n} k_i H_{1i}(f),$$

or a product combination of encoding spectrum modulation functions $$H_1(f) = \Pi_{j=1}^{n} k_j H_{1j}(f),$$

or a combination of an linear combination and a product combination fall within the protection scope of this disclosure, where $$i \geq 1,\ H_1(f) = \Sigma_{i=1}^{n} k_i H_{1i}(f)$$

represents a linear combination of n functions, $H_{1i}(f)$ represents an ith function, $k_i$ represents a weight corresponding to the ith function, $$j \geq 1,\ H_1(f) = \Pi_{j=1}^{n} k_j H_{1j}(f)$$

represents a product combination of the n functions, $k_j$ represents a weight corresponding to a jth function, and $H_{1j}(f)$ may be any function. Table 3 is a parameter table of an encoding convolution kernel according to some exemplary embodiments of this disclosure. Table 3 exemplarily lists parameters of an encoding convolution kernel, where each row in Table 3 represents an encoding convolution kernel. For a video image of 8 bits, it is necessary to ensure that grayscale values of pixels in the encoding-spectrum-modulated frame obtained after the encoding convolution are within a range of 0 to 255. Therefore, in some exemplary embodiments, it is necessary to divide a convolution result by 256. The encoding convolution kernel is obtained through a Fourier transform based on the encoding spectrum modulation function $H_1(f)$. Table 3 is only an exemplary illustration. A person skilled in the art would know that the encoding convolution kernel is not limited to the parameters shown in Table 3. All encoding convolution kernels that may cause a smooth decrease of the amplitude of the under-compression-frame in the intermediate-frequency region in the frequency domain fall within the protection scope of this disclosure.

TABLE 3

| | | | | | | | | | | | | | | | | | | |
|---|---|---|---|---|---|---|---|---|---|---|---|---|---|---|---|---|---|---|
| 5 | 1 | 1 | 6 | 8 | 6 | 1 | 9 | 23 | 136 | 23 | 9 | 1 | 6 | 8 | 6 | 1 | 1 | 1 |

It should be noted that, to avoid the ringing effect, the encoding spectrum modulation function $H_1(f)$ is a smooth curve, avoiding a drastic change of the amplitude modulation gain in the curve. As described above, the ringing effect refers to that in image processing, when spectrum modulation processing is performed on one image, if a selected spectrum modulation function is subjected to a fast change, "ringing" occurs in the image. The "ringing" is an oscillation that accompanies a drastic grayscale change in an output image, as if an air oscillation is generated after ringing a bell. The ringing effect often occurs at a boundary of an image.

A ratio of an absolute value of a sum of negative coefficients to a sum of non-negative coefficients in the encoding convolution kernel corresponding to the encoding spectrum modulation function $H_1(f)$ should be less than 0.1. For example, in some exemplary embodiments, all convolution kernel coefficients in the encoding convolution kernel may be non-negative. Taking the video data as an example, when there are a lot of negative coefficients in the encoding convolution kernel, there is a great difference between pixel values at a boundary of an image, and a large pixel value multiplied by a negative coefficient causes a final convolution result to become smaller, that is, a dark pixel is shown in the image. If a negative number occurs in the convolution result, and an absolute value of the negative number is large, when the convolution result is calculated by using an unsigned integer, a result of calculation using the unsigned integer may be inverted, and an unsigned complementary code value with a negative value may cause the convolution result to become larger, that is, a bright pixel is shown in the image. Therefore, when the encoding convolution kernel is designed, all coefficients of the encoding convolution kernel may be non-negative, or the ratio of the absolute value of the sum of negative coefficients to the sum of non-negative coefficients in the encoding convolution kernel should be less than 0.1, that is, a few negative coefficients with small absolute values are allowed in the encoding convolution kernel.

When the data compression device 200 uses the encoding convolution kernel to convolve the under-compression-frame, the under-compression-frame (original frame) may be convolved in at least one of a vertical direction, a horizontal direction, and an oblique direction.

It should be noted that when the under-compression-frame is convolved, a data processing unit processed in the convolution may be a frame of data, or may be a part of a frame of data. Taking the video data as an example, the unit may be a frame or a field of image, or a part of a frame or a field of image. For example, in video encoding, an image may be further segmented into slices, tiles, coding units (CUs), macroblocks, or blocks. Convolved objects include, but are not limited to, some image segmentation units described by the foregoing terms. For different processing units, a same encoding convolution kernel may be selected, or different encoding convolution kernels may be selected.

Step SA244 may further include:

SA244-6. Encode the encoding-spectrum-modulated frame (perform a prediction and calculate a residual) to obtain the predictive data PI and the residual data R.

SA244-8. Input the predictive data PI and the residual data R into the bitstream generation module for combining to obtain the compressed frame.

After the data compression device 200 performs the encoding spectrum modulation on the first enhanced frame, the encoding-spectrum-modulated frame is obtained. Low-frequency to high-frequency components in the encoding-spectrum-modulated frame are smaller than low-frequency to high-frequency components in the first enhanced frame. Therefore, the data compression device 200 may improve encoding efficiency of the encoding-spectrum-modulated frame by performing encoding and bitstream generation calculation after performing the encoding spectrum modulation on the under-compression-frame (first enhanced frame), thereby improving the compression ratio of the original frame and transmission efficiency of the original data, while enhancing the boundary and avoiding a loss of details.

The data processing method PB200 shown in FIG. 4B corresponds to the flowchart shown in FIG. 3B. As shown in FIG. 4B, the method PB200 may include the following steps.

SB220. Select an original frame from original data. This step is consistent with step SA220, and will not be described again herein.

SB240. Perform the data compression on the original frame to obtain a compressed frame. Step SB240 may include:

SB242. Perform the boundary adjustment on the original frame $P_0$ to obtain a first enhanced frame $$P'_0.$$

This step is consistent with step SA242, and will not be described again herein.

SB244. Perform the encoding spectrum modulation and the encoding on the first enhanced frame $$P'_0.$$

Step SB244 may include:

SB244-2. Determine a frame type of the original frame. This step is consistent with step SA244-2, and will not be described again herein.

SB244-4. First perform a prediction on the first enhanced frame $$P'_0$$

to obtain a predictive frame and predictive data PI.

SB244-6. Select, based on the frame type of the original frame, a convolution kernel from a group of encoding convolution kernels as the encoding convolution kernel to convolve the under-compression-frame to obtain an encoding-spectrum-modulated frame. The under-compression-frame may include the first enhanced frame $$P'_0$$

and the predictive frame. Step SB244-6 may be equivalent to using the encoding spectrum modulation function $H_1(f)$ to perform the encoding spectrum modulation on the first enhanced frame $$P'_0$$

and the predictive frame. The encoding-spectrum-modulated frame includes a first encoding-spectrum-modulated frame obtained by performing the encoding spectrum modulation on the first enhanced frame $$P'_0$$

and a second encoding-spectrum-modulated frame obtained by performing the encoding spectrum modulation on the predictive frame.

SB244-8. Calculate a residual between the first encoding-spectrum-modulated frame and the second encoding-spectrum-modulated frame to obtain the residual data R.

SB244-9. Input the predictive data PI and the residual data R into the bitstream generation module for combining to obtain the compressed frame.

The data processing method PC200 shown in FIG. 4C corresponds to the flowchart shown in FIG. 3C. As shown in FIG. 4C, the method PC200 may include the following steps.

SC220. Select an original frame from original data. This step is consistent with step SA220, and will not be described again herein.

SC240. Perform the data compression on the original frame to obtain a compressed frame. Step SC240 may include:

SC242. Perform the boundary adjustment on the original frame $P_0$ to obtain a first enhanced frame $$P_0'.$$

This step is consistent with step SA242, and will not be described again herein.

SC244. Perform the encoding spectrum modulation and the encoding on the first enhanced frame $$P_0'.$$

Step SC244 may include:

SC244-2. Determine a frame type of the original frame. This step is consistent with step SA244-2, and will not be described again herein.

SC244-4. First encode the first enhanced frame $$P_0',$$

that is, perform a prediction and calculate a residual to obtain predictive data PI and residual data R1.

SC244-6. Select, based on the frame type of the original frame, a convolution kernel from a group of encoding convolution kernels as the encoding convolution kernel to convolve the under-compression-frame to obtain the residual data R. The under-compression-frame includes the residual data R1. Step SC244-6 may be equivalent to using the encoding spectrum modulation function $H_1(f)$ to perform the encoding spectrum modulation on the residual data R1.

SC244-8. Input the predictive data PI and the residual data R into the bitstream generation module for combining to obtain the compressed frame.

The data processing method PD200 shown in FIG. 4D corresponds to the flowchart shown in FIG. 3D. As shown in FIG. 4D, the method PD200 may include the following steps.

SD220. Select an original frame from original data. This step is consistent with step SA220, and will not be described again herein.

SD240. Perform the data compression on the original frame to obtain a compressed frame. Step SD240 may be first performing the encoding spectrum modulation on the original frame, and then performing the boundary adjustment. Specifically, step SD240 may include:

SD242. Perform the encoding spectrum modulation on the original frame to obtain an encoding-spectrum-modulated frame.

For ease of description, data in the encoding-spectrum-modulated frame obtained in step SD242 is defined as $P_{01}$. Specifically, step SD242 may include:

SD242-2. Determine a frame type of the original frame. This step is consistent with step SA244-2, and will not be described again herein.

SD242-4. Select, based on the frame type of the original frame, a convolution kernel from a group of encoding convolution kernels as the encoding convolution kernel to convolve the under-compression-frame to obtain the encoding-spectrum-modulated frame $P_{01}$. The under-compression-frame includes the original frame $P_0$. Step SD242-4 may be equivalent to using the encoding spectrum modulation function $H_1(f)$ to perform the encoding spectrum modulation on the original frame $P_0$.

SD244. Perform the boundary adjustment on the encoding-spectrum-modulated frame $P_{01}$ to obtain a second enhanced frame.

For ease of description, data in the second enhanced frame obtained in step SD244 is defined as $$P_1'.$$

Figure 9:
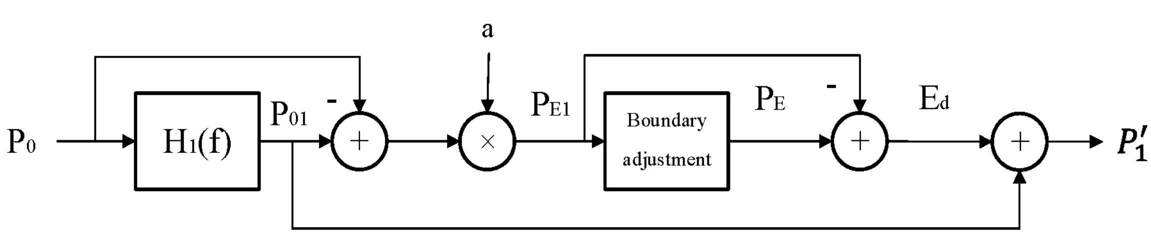
FIG. 9 is a flowchart of obtaining a second enhanced frame according to some exemplary embodiments of this disclosure.

FIG. 9 is a flowchart of obtaining the second enhanced frame $$P_1'$$

according to some exemplary embodiments of this disclosure. As shown in FIG. 9 and FIG. 4D, step SD244 may include:

SD244-2. Calculate a difference between the original frame $P_0$ and the encoding-spectrum-modulated frame $P_{01}$ to obtain a first boundary $P_{E1}$.

As described above, the encoding spectrum modulation may smoothly decrease an amplitude of the original frame $P_0$ in the frequency domain, thereby blurring boundary information of the original frame $P_0$, obtaining the encoding-spectrum-modulated frame $P_{01}$, reducing an amount of information in the original frame $P_0$, and reducing space resources occupied by the original frame $P_0$ after compression. Therefore, the encoding-spectrum-modulated frame $P_{01}$ may be understood as data in which the boundary information of the original frame $P_0$ is attenuated. Next, the difference between the original frame $P_0$ and the encoding-spectrum-modulated frame $P_{01}$ is calculated, and a boundary attenuation value of the original frame $P_0$, that is, the first boundary $P_{E1}$, may be obtained. The first boundary $P_{E1}$ includes the boundary information of the original frame $P_0$.

In some exemplary embodiments, step SD244 may further include:

SD244-4. Enhance the first boundary $P_{E1}$ by using a first coefficient a. This step is basically consistent with step SA242-6, and will not be described again herein.

SD244-6. Adjust a boundary whose boundary value is within the first preset range [−R1, R1] in the first boundary $P_{E1}$ by using the first gamma algorithm to obtain the enhanced boundary $P_E$. This step is basically consistent with step SA242-8, and will not be described again herein.

SD244-8. Calculate a difference between the enhanced boundary $P_E$ and the first boundary $P_{E1}$ to obtain an adjustment value.

For ease of description, data in the adjustment value is defined as $E_d$. The adjustment value $E_d$ includes an adjustment value for adjusting the first boundary $P_{E1}$.

In some exemplary embodiments, step SD244-6 and step SD244-8 may be combined. The data compression device 200 may store Table 4. Table 4 stores a correspondence between an input boundary value of the first boundary $P_{E1}$ and the adjustment value $E_d$. Taking R1=6 as an example, Table 4 may be expressed as follows:

TABLE 4

| | | | | | | | | | | | | | |
|---|---|---|---|---|---|---|---|---|---|---|---|---|---|
| Input boundary value | −6 | −5 | −4 | −3 | −2 | −1 | 0 | 1 | 2 | 3 | 4 | 5 | 6 |
| Adjustment value $E_d$ | 0 | −1 | −2 | −3 | −3 | 0 | 0 | 0 | 3 | 3 | 3 | 2 | 0 |

The data compression device 200 may directly obtain the adjustment value $E_d$ based on Table 4.

SD244-9. Superimpose the adjustment value $E_d$ on the encoding-spectrum-modulated frame $P_{01}$ to obtain the second enhanced frame $$P_1'.$$

As described above, the encoding spectrum modulation may blur a boundary of the encoding-spectrum-modulated frame $P_{01}$. A difference between adjacent pixels in the encoding-spectrum-modulated frame $P_{01}$ becomes smaller. To avoid a loss of details, the adjustment value $E_d$ is superimposed on the encoding-spectrum-modulated frame $P_{01}$, so that a boundary with a small difference between adjacent pixels in the encoding-spectrum-modulated frame $P_{01}$ is enhanced. In this way, a data loss in the encoding process is reduced, and the loss of details is avoided.

Step SD240 may further include:

SD246. Perform a prediction on the second enhanced frame $$P_1'$$

and calculate a residual.

The second enhanced frame $$P_1'$$

is encoded (the prediction and residual calculation are performed) to obtain the predictive data PI and the residual data R, and the predictive data PI and the residual data R are input into the bitstream generation module for combining to obtain the compressed frame.

In summary, the data processing method P200 may simultaneously perform the boundary adjustment and the encoding spectrum modulation on the original data to reduce the data loss and avoid the loss of details, while improving the compression ratio of the original frame and improving the encoding efficiency and transmission efficiency of the original data.

Figure 10:
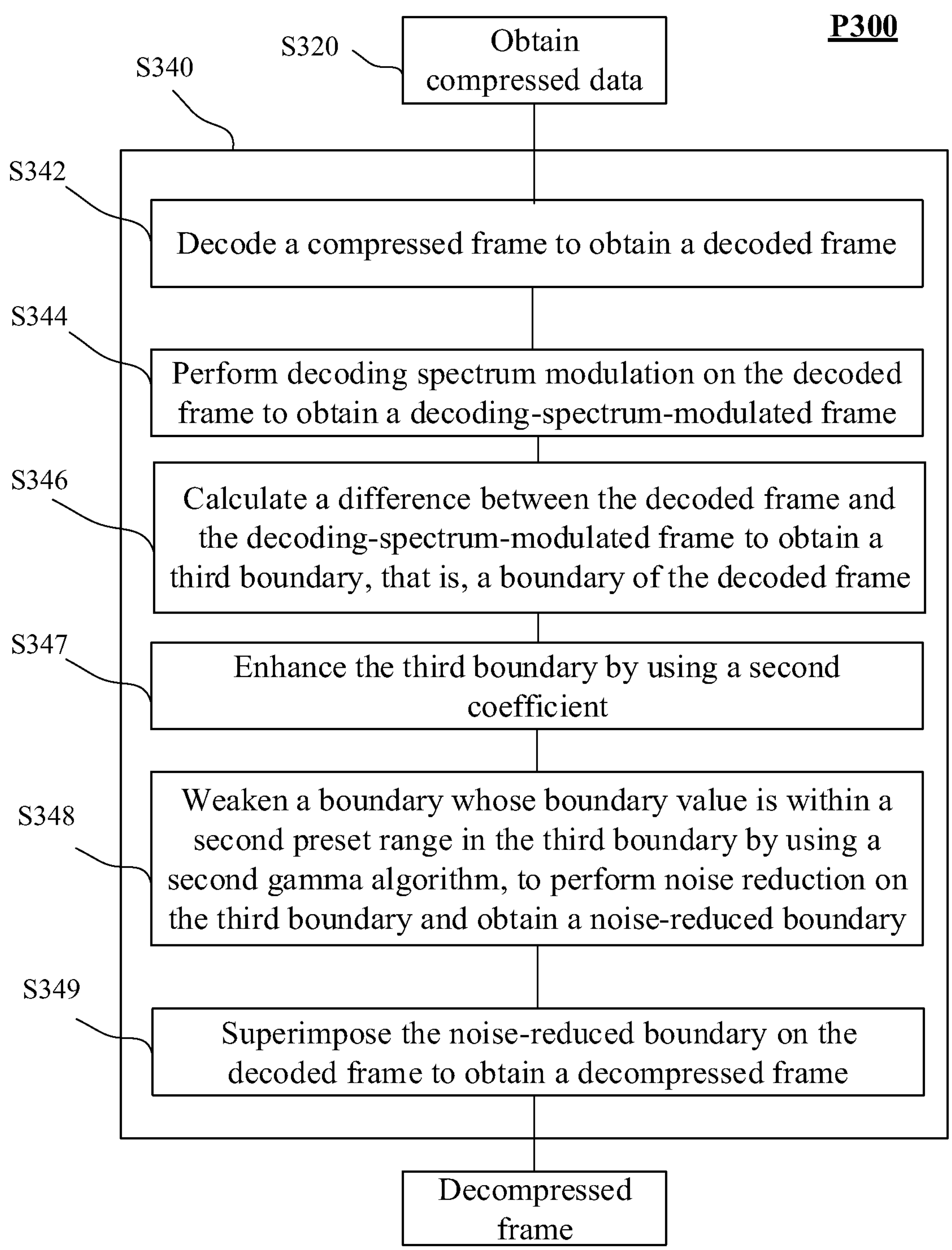
FIG. 10 is a flowchart of a data processing method for decompressing a compressed frame according to some exemplary embodiments of this disclosure.

FIG. 10 is a flowchart of the data processing method P300 for decompressing a compressed frame. As described above, the data decompression device 300 may perform the data processing method P300. Specifically, a storage medium of the data decompression device 300 may store at least one instruction set. The instruction set may be configured to instruct a decompression processor in the data decompression device 300 to implement the data processing method P300. When the data decompression device 300 operates, the decompression processor may read the instruction set and perform the data processing method P300.

For ease of description, the data processing method P300 is described based on the methods shown in FIG. 3A and FIG. 3D. The method P300 may include the following steps.

S320. Obtain compressed data, where the compressed data includes the compressed frame.

The compressed data may include the compressed frame obtained by performing data compression on the original frame in the original data by using the data processing method P200. The compressed frame includes compressed predictive data PI and residual data R. As shown in FIG. 3A and FIG. 3D, step S320 may include: inputting the compressed frame into the bitstream parsing module for analysis calculation to obtain the predictive data PI and the residual data R. As described above, in the present disclosure, a frame is a common processing unit that makes up a data sequence. In data processing, calculation is often performed in the unit of frame. In the data processing method P200 for compressing data by the data compression device 200, the original data may be compressed the unit of frame. When decompressing the compressed frame, the data decompression device 300 may also perform data decompression the unit of frame.

S340. Perform data decompression on the compressed frame to obtain a decompressed frame.

The data decompression refers to performing decompression calculation on the compressed frame to obtain the decompressed frame, so that the original data is restored or basically restored in the decompressed frame, or that the decompressed frame is even clearer than the original data. Taking video data as an example, when an amplitude of the decompressed frame at any frequency in a low-frequency to intermediate-frequency region is restored to a threshold of the original frame or above the threshold, it is difficult for human eyes to perceive a difference between the decompressed frame and the original frame. The threshold may be any value between 80% and 90%. For example, the threshold may be any value within a closed interval defined by any two values of 80%, 81%, 82%, 83%, 84%, 85%, 86%, 87%, 88%, 89%, and 90%. For example, the data decompression should enable the amplitude of the decompressed frame at any frequency in the low-frequency to intermediate-frequency region to be not less than 85%±3% of that of the original frame.

The data decompression includes performing decoding spectrum modulation on an under-decompression-frame, and further performing a boundary correction on data that undergoes the decoding spectrum modulation to obtain a required decompressed frame. The under-decompression-frame, that is, a frame of data being decompressed, includes the compressed frame and any data state before the compressed frame becomes the decompressed frame during the decompression.

Taking the video data as an example, the data processing method P200 uses a combination of encoding spectrum modulation and encoding to compress the original frame, so as to further improve a compression ratio of the video data and efficiency of video transmission. In a video decompression technology, the data processing method P300 may use a combination of decoding (that is, restoring an under-compression-frame based on the residual data R and the predictive data PI) and decoding spectrum modulation to decompress the compressed frame and obtain the required decompressed frame, so as to restore data in the compressed frame. The under-decompression-frame may include the compressed frame and any data state in a process of decoding the compressed frame based on the predictive data PI and the residual data R. For example, the under-decompression-frame may be the compressed frame, or may be a decoded frame obtained through decoding or a predictive frame obtained through a prediction.

The decoding spectrum modulation applied to the data decompression of the compressed frame refers to inputting the under-decompression-frame into a decoding spectrum modulator to perform decoding spectrum modulation. The decoding spectrum modulation may correspond to the encoding spectrum modulation, that is, a preset association relationship should exist between a decoding spectrum modulation function $H_2(f)$ and an encoding spectrum modulation function $H_1(f)$. Because the association relationship between the decoding spectrum modulation function $H_2(f)$ and the encoding spectrum modulation function $H_1(f)$ is carefully set, after the encoding-spectrum-modulated compressed frame undergoes the decoding spectrum modulation and the data processing, data metrics (for example, image definition of image data) before the encoding spectrum modulation are fully restored or basically restored without considering other calculation errors, or some metrics are even better than metrics of data before the encoding spectrum modulation (for example, definition of a decoded image exceeds that of an original image). The specific association relationship between the decoding spectrum modulation function $H_2(f)$ and the encoding spectrum modulation function $H_1(f)$ is related to a manner of performing data processing on the data that undergoes the decoding spectrum modulation. When the data processing manner is different, the association relationship between the decoding spectrum modulation function $H_2(f)$ and the encoding spectrum modulation function $H_1(f)$ is also different. The specific data processing manner and the association relationship between the spectrum modulation function $H_2(f)$ and the encoding spectrum modulation function $H_1(f)$ will be described in the subsequent description.

Similar to the encoding spectrum modulation, the decoding spectrum modulation may perform a convolution in a time domain to modulate a spectrum of the under-decompression-frame by using the decoding spectrum modulation function $H_2(f)$ (that is, a decoding transfer function) in a frequency domain. Therefore, a corresponding association relationship should also exist between a decoding convolution kernel used for the decoding spectrum modulation and an encoding convolution kernel used for the encoding spectrum modulation. By selecting the decoding spectrum modulation function $H_2(f)$ and the decoding convolution kernel corresponding to the encoding spectrum modulation function $H_1(f)$ and the encoding convolution kernel, these two manners may achieve a same effect. For ease of description, the convolution in the time domain is used as an example to describe the decoding spectrum modulation in this disclosure. However, a person skilled in the art should understand that a manner of performing spectrum modulation by performing multiplication by the decoding spectrum modulation function $H_2(f)$ in the frequency domain also falls within the protection scope of this disclosure.

As described above, the encoding spectrum modulation may attenuate an amplitude of the under-compression-frame in an intermediate-frequency region in the frequency domain to blur boundary data of the under-compression-frame, so that an amount of data generated by the encoding is reduced. The decoding spectrum modulation and the data processing may restore or even enhance the data that undergoes the encoding spectrum modulation and data processing. In other words, the decoding spectrum modulation and the data processing may fully restore or basically restore an amplitude of the under-decompression-frame at a sensitive frequency to a state before the attenuation or even enhance an amplitude in comparison with a state before the attenuation. Taking the video data as an example, because human eyes are relatively sensitive to low-frequency to intermediate-frequency information in an image, the decoding spectrum modulation and the data processing may restore or even enhance the amplitude in the low-frequency to intermediate-frequency region in the video data. Therefore, the amplitude of the decompressed frame in the low-frequency to intermediate-frequency region may be at least restored or basically restored to the amplitude of the original frame in the low-frequency to intermediate-frequency region. In the video data, because human eyes are relatively insensitive to high-frequency data, the decoding spectrum modulation and the data processing may not restore an amplitude in a high-frequency region, so that the amplitude in the high-frequency region remains attenuated.

As described above, the data compression operation attenuates the amplitude of the original frame in the intermediate-frequency region or the intermediate-frequency to high-frequency region by performing the encoding spectrum modulation to reduce an amount of data information in the original frame. Taking the video data as an example, because there are rich intermediate-frequency information and high-frequency information at an edge of an object in an image, but an intermediate-frequency region and a high-frequency region carry more data, decreasing an amplitude in an intermediate-frequency to high-frequency region may visually blur boundary data of the under-compression-frame, and also greatly reduce an amount of information in the image. Therefore, the data decompression may extract boundary information from the compressed frame, and perform a boundary enhancement on the boundary information to restore the boundary information to a state of the original frame, or to enhance the boundary information in comparison with a state of the original frame.

There are a lot of boundary enhancement processing methods. In a traditional technology, sometimes a high-pass filter or a band-pass filter is directly used to filter a compressed frame to filter out components in a low-frequency region in the compressed frame and extract components in an intermediate-frequency to high-frequency region in the compressed frame, thereby extracting boundary information. However, a lot of negative coefficients may appear among coefficients of convolution kernels corresponding to the high-pass filter and the band-pass filter. As described above, when a lot of negative coefficients appear in a convolution kernel, a strong ringing effect may occur in an image obtained by performing a convolution by using the convolution kernel. Therefore, to avoid the ringing effect, the data decompression in this disclosure performs spectrum modulation on the compressed frame by using a smooth decoding spectrum modulation function $H_2(f)$, filters out the components in the intermediate-frequency to high-frequency region in the compressed frame, then calculates a difference between the compressed frame and the compressed frame that undergoes the decoding spectrum modulation to obtain the boundary information, and adjusts the boundary information by using an adjustment coefficient, so that the boundary information is restored to an original state or is enhanced in comparison with the original state. When the foregoing solution is used to obtain the boundary information, a decoding convolution kernel may be designed, so that all coefficients of the decoding convolution kernel are non-negative or that a ratio of an absolute value of a sum of negative coefficients to a sum of non-negative coefficients is less than 0.1. In this way, the ringing effect may be avoided.

Specifically, step S340 may include:

S342. Decode the compressed frame to obtain a decoded frame. In the method P300, the under-decompression-frame may be the decoded frame.

The compressed frame may be obtained by encoding the spectrum-modulated frame by the data compression device 200. The data decompression device 300 may decode the compressed frame to obtain the decoded frame. That is, the data decompression device 300 obtains a predictive frame by performing a prediction based on the predictive data PI, and superimposes the residual data R on the predictive frame to obtain superimposed data $P_2$, where superimposed data $P_2$ is data $P_2$ of the decoded frame. Certain errors may exist in the encoding and decoding processes. Assuming that a slight deviation is caused in the encoding and decoding processes, the data $P_2$ in the decoded frame is basically consistent with the data $P_1$ in the encoding-spectrum-modulated frame. Therefore, a relationship between $P_1$ and $P_2$ may be expressed by using the following formula:

$$P_2 \approx P_1 \quad \text{formula (4)}$$

Figure 11A:
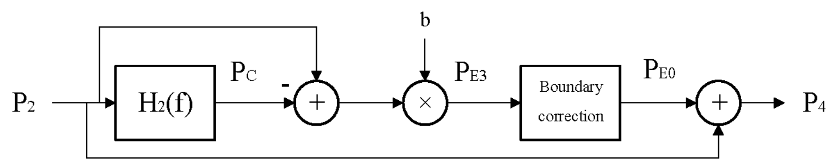
FIG. 11A is a flowchart of performing decoding spectrum modulation and a boundary correction according to some exemplary embodiments of this disclosure.

The data decompression device 300 may perform the decoding spectrum modulation and the boundary correction on the decoded frame. FIG. 11A is a flowchart of performing the decoding spectrum modulation and the boundary correction according to some exemplary embodiments of this disclosure. FIG. 11A corresponds to FIG. 10. As shown in FIG. 11A and FIG. 10, step S340 may further include:

S344. Perform the decoding spectrum modulation on the under-decompression-frame (that is, the decoded frame $P_2$) to obtain a decoding-spectrum-modulated frame.

For ease of description, data in the decoding-spectrum-modulated frame is defined as $P_C$. Thanks to the decoding spectrum modulation, a ringing effect is avoided in the decoded frame. The decoding spectrum modulation includes using the decoding spectrum modulation function $H_2(f)$ to perform the decoding spectrum modulation on the under-decompression-frame to smoothly decrease an amplitude of the under-decompression-frame in the frequency domain to filter out components of the under-decompression-frame in the intermediate-frequency to high-frequency region, so that the decoding-spectrum-modulated frame is obtained. Intermediate-frequency to high-frequency components in a spectrum of each frame of data are mainly centralized in a region in which data changes dramatically in the frame of data, that is, boundary data of the data. For example, for a frame image, the intermediate-frequency to high-frequency data is mainly centralized in a boundary of an object in the image, that is, boundary data of the frame image. Therefore, the data $P_C$ in the decoding-spectrum-modulated frame may be understood as data from which boundary information of the decoded frame $P_2$ is removed. The data $P_C$ in the decoding-spectrum-modulated frame may be expressed by using the following formula:

$$P_C = H_2(f)\cdot P_2 = H_1(f)\cdot H_2(f)\cdot P_0' \approx H_1(f)\cdot H_2(f)\cdot P_0 \quad \text{formula (5)}$$

The decoding spectrum modulation includes using a corresponding decoding convolution kernel to convolve the under-decompression-frame (decoded frame) based on the decoding convolution kernel. To avoid the ringing effect, a ratio of an absolute value of a sum of negative coefficients to a sum of non-negative coefficients in the decoding convolution kernel may be less than a threshold. For example, the threshold may be any value of 0.01, 0.02, 0.03, 0.04, 0.05, 0.06, 0.07, 0.08, 0.09, 0.1, 0.2, 0.3, and 0.4, or any value within an interval defined by any two values thereof. For example, all convolution kernel coefficients in the decoding convolution kernel may be non-negative. An amplitude modulation gain of the decoding spectrum modulation function $H_2(f)$ in the intermediate-frequency to high-frequency region is equal to zero, and may fluctuate within an error range. The error range may be within an interval specified by any two values of 0, ±1%, ±2%, ±3%, ±4%, ±5%, ±6%, ±7%, ±8%, ±9%, ±10%, ±11%, ±12%, ±13%, ±14%, ±15%, ±16%, ±17%, ±18%, ±19%, ±20%, ±21%, ±22%, ±23%, ±24%, ±25%, ±26%, ±27%, ±28%, ±29%, ±30%, ±31%, ±32%, ±33%, ±34%, ±35%, and the like.

The decoding spectrum modulation function $H_2(f)$ may retain a direct current part, that is, an amplitude modulation gain of a part with a frequency of 0 is 1 to ensure that basic information in the original frame may be retained. Therefore, the decoding spectrum modulation function $H_2(f)$ used for the decoding spectrum modulation implements a smooth transition of an amplitude modulation gain from an amplitude modulation gain 1 in a position of the frequency of 0 in the low-frequency region to an amplitude modulation gain approaching 0 in the intermediate-frequency region.

Step S344 may include: determining a frame type of the decoded frame; and selecting, based on the frame type of the decoded frame, a convolution kernel from a group of decoding convolution kernels as the decoding convolution kernel to convolve the decoded frame.

As described above, in the process of compressing the original frame, the data compression device 200 may encode the original frame or the encoding-spectrum-modulated frame into different types. Therefore, before performing the decoding spectrum modulation on the decoded frame, the data decompression device 300 may need to first determine the frame type of the decoded frame, and a decoding convolution kernel selected for different frame types may also be different. The frame type of the decoded frame may include at least one of an I-frame, a P-frame, or a B-frame. The frame type of the decoded frame may include only one frame type, or may include a plurality of different frame types. A method for determining the frame type of the decoded frame is already relatively mature, and is not a focus to be protected in this disclosure, and is therefore not described herein.

As described above, performing the decoding spectrum modulation on the decoded frame may be performed by convolving the decoded frame in the time domain. The storage medium of the data decompression device 300 may store a plurality of different decoding convolution kernels, referred to as a group of decoding convolution kernels. Each encoding convolution kernel corresponds to at least one decoding convolution kernel in the group of decoding convolution kernels. When convolving the decoded frame, the data decompression device 300 may select a convolution kernel from the group of decoding convolution kernels as the decoding convolution kernel based on the frame type of the decoded frame to convolve the decoded frame. The operation of using the decoding convolution kernel to convolve the under-decompression-frame may be referred to as a decoding spectrum modulator. When the decoded frame is an I-frame or a P-frame, convolving the I-frame or P-frame by the data decompression device 300 may include: selecting a convolution kernel from the group of decoding convolution kernels as the decoding convolution kernel, and then convolving the I-frame or P-frame. The data decompression device 300 may also select a convolution kernel with a best decompression effect from the group of decoding convolution kernels as the decoding convolution kernel according to a decoding quality requirement of the decoded frame. When the decoded frame is a B-frame, the decoding convolution kernel for the decoded frame is the same as a decoding convolution kernel for a reference frame closest to the decoded frame, or the decoding convolution kernel for the decoded frame is the same as a decoding convolution kernel corresponding to a reference frame with highest attenuation in adjacent reference frames closest in two directions, or the decoding convolution kernel for the decoded frame is an average value of decoding convolution kernels corresponding to adjacent reference frames closest in two directions. When distances between the decoded frame and two reference frames closest in forward and backward directions are the same, the decoding convolution kernel for the decoded frame is a decoding convolution kernel for a reference frame closest in the forward or backward direction. When the decoded frame is a B-frame, a reference frame corresponding to the decoding convolution kernel selected for the decoded frame should be the same as a reference frame corresponding to the encoding convolution kernel selected when the encoding spectrum modulation is performed on the under-compression-frame.

When the data decompression device 300 uses the decoding convolution kernel to convolve the under-decompression-frame, the under-decompression-frame may be convolved in at least one of a vertical direction, a horizontal direction, or an oblique direction. A convolution direction of the under-decompression-frame is the same as that of the under-compression-frame, and a convolution order of the under-decompression-frame is opposite to that of the under-compression-frame. If the under-compression-frame is convolved only in the vertical direction, the under-decompression-frame is also convolved only in the vertical direction. Likewise, if the under-compression-frame is convolved only in the horizontal direction or the oblique direction, the under-decompression-frame is also convolved only in the horizontal direction or the oblique direction. If the under-compression-frame is convolved in a plurality of directions, the under-decompression-frame is also convolved in a plurality of directions, and convolution directions and orders of the under-decompression-frame are opposite to convolution directions and orders of the under-compression-frame. That is, if the under-compression-frame is first convolved in the vertical direction and then convolved in the horizontal direction, the under-decompression-frame is first convolved in the horizontal direction and then convolved in the vertical direction.

Step S340 may further include:

S346. Calculate a difference between the under-decompression-frame (that is, the decoded frame $P_2$) and the decoding-spectrum-modulated frame $P_C$ to obtain a third boundary.

For ease of description, data in the third boundary is defined as $P_{E3}$. The third boundary $P_{E3}$ is a boundary of the under-decompression-frame and includes boundary information of the original frame $P_0$.

In some exemplary embodiments, step S340 may further include:

S347. Enhance the third boundary $P_{E3}$ by using a second coefficient b.

The second coefficient b is any number greater than 1. In some exemplary embodiments, the third boundary $P_{E3}$ may be data obtained by calculating the difference between the decoded frame $P_2$ and the decoding-spectrum-modulated frame $P_C$. In some exemplary embodiments, the third boundary $P_{E3}$ may be the boundary enhanced by using the second coefficient b. In this case, the third boundary $P_{E3}$ may also be expressed by using the following formula:

$$P_{E3} = P_2 - P_C = P_2 - P_2 * H_2(f) \quad \text{formula (6)}$$

$$P_{E3} = b * (P_2 - P_C) = b * (P_2 - P_2 * H_2(f)) \quad \text{formula (7)}$$

As described above, components in the intermediate-frequency to high-frequency region in the decoding-spectrum-modulated frame are filtered out, and the difference between the decoded frame and the decoding-spectrum-modulated frame is calculated. Therefore, the components in the intermediate-frequency to high-frequency region in the decoded frame, that is, the boundary of the under-decompression-frame, may be obtained. The boundary of the under-decompression-frame includes the boundary information of the original frame. As described above, data in the boundary of the under-decompression-frame is defined as $P_{E3}$, where b is an enhancement coefficient indicating an extent to which the boundary information is enhanced, and the larger the b, the greater the extent to which the boundary information is enhanced. The adjustment coefficient b may be empirically set to a value, or may be obtained through training by machine learning.

Step S340 may further include:

S348. Weaken a boundary whose boundary value is within a second preset range in the third boundary $P_{E3}$ by using a second gamma algorithm to perform noise reduction on the third boundary $P_{E3}$ and obtain a noise-reduced boundary.

For ease of description, data in the noise-reduced boundary is defined as $P_{E0}$. The boundary correction includes weakening the boundary whose boundary value is within the second preset range in the boundary of the under-decompression-frame by using the second gamma algorithm to reduce noise. In general, image noise generated during video/image encoding and decoding is usually within a small range. Therefore, when the data decompression is performed, noise reduction processing may be performed on the image noise generated during the encoding and decoding within the small range. When the noise reduction processing is performed, boundary weakening may be performed on the boundary whose boundary value is within the second preset range [−R4, R4] by using a gamma value γ greater than 1 to achieve a noise reduction effect. The second preset range [−R4, R4] may be a boundary value that requires the boundary correction. The boundary value may be a value corresponding to each pixel in the third boundary $P_{E3}$. R4 may be a boundary threshold. For example, R4 may be 30, 40, or 50. In some exemplary embodiments, R4 may be any number from 5 to 30.

Figure 11B:
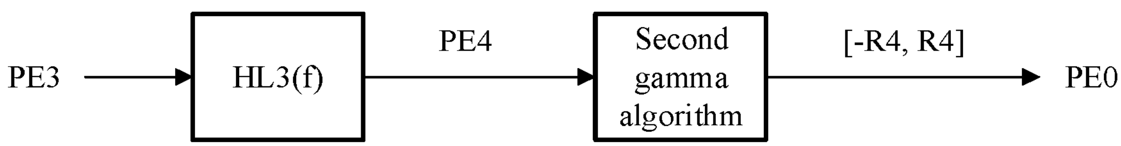
FIG. 11B is a flowchart of performing a boundary correction according to some exemplary embodiments of this disclosure.

FIG. 11B is a flowchart of performing the boundary correction according to some exemplary embodiments of this disclosure. As shown in FIG. 11B, step S348 may be as follows: the data decompression device 300 adjusts the third boundary $P_{E3}$ by using a third adjustment function $H_{L3}(f)$ to obtain a fourth boundary $P_{E4}$; and weakens a boundary whose boundary value is within the second preset range [−R4, R4] in the fourth boundary $P_{E4}$ to obtain the noise-reduced boundary $P_{E0}$.

A lot of components in the intermediate-frequency to high-frequency region are included in a boundary that does not require the boundary correction in the third boundary $P_{E3}$. Therefore, to prevent the boundary correction from affecting another boundary that does not need to be corrected, the data decompression device 300 may first filter the third boundary $P_{E3}$ to filter out the components in the intermediate-frequency to high-frequency region. The third adjustment function $H_{L3}(f)$ may be a low-pass filter whose direct current DC component is equal to 1 to retain a component of the third boundary $P_{E3}$ in the low-frequency region in the frequency domain, but filter out a component thereof in the intermediate-frequency to high-frequency region. The third adjustment function $H_{L3}(f)$ may be the same as the second adjustment function $H_{L2}(f)$.

The second gamma algorithm may be a gamma algorithm whose gamma value $\gamma$ is greater than 1. In step S348, the data decompression device 300 may perform the boundary correction on pixels of the fourth boundary $P_{E4}$ one by one. Specifically, the data decompression device 300 may compare a boundary value corresponding to each pixel in the fourth boundary $P_{E4}$ with the boundary threshold R4; and when the boundary value is within [−R4, R4], correct the boundary value by using the second gamma algorithm, so that an absolute value of the boundary value becomes smaller and that noise in the boundary is reduced; or when the boundary value is beyond [−R4, R4], perform no correction.

The data decompression device 300 may perform the boundary correction by using a table lookup method. The data decompression device 300 may store Table 5. Table 5 stores a correspondence between an input boundary value and an output boundary value in the second gamma algorithm, that is, a correspondence between a boundary value before the correction and a boundary value after the correction. Taking R4=5 as an example, Table 5 may be expressed as follows:

TABLE 5

| | | | | | | | | | | | |
|---|---|---|---|---|---|---|---|---|---|---|---|
| Input boundary value | −5 | −4 | −3 | −2 | −1 | 0 | 1 | 2 | 3 | 4 | 5 |
| Output boundary value | −5 | −3 | −2 | −1 | 0 | 0 | 0 | 1 | 2 | 3 | 5 |

Figure 11C:
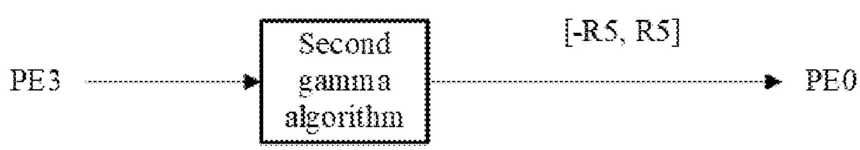
FIG. 11C is another flowchart of performing a boundary correction according to some exemplary embodiments of this disclosure.

FIG. 11C is a flowchart of performing the boundary correction according to some exemplary embodiments of this disclosure. As shown in FIG. 11C, step S348 may also be: the data decompression device 300 directly corrects a boundary whose boundary value is within the second preset range [−R5, R5] in the third boundary $P_{E3}$ by using the second gamma algorithm to obtain the noise-reduced boundary $P_{E0}$. R5 may be different from R4, or may be the same as R4.

In some exemplary embodiments, the data decompression device 300 may further correct the boundary whose boundary value is within the second preset range [−R5, R5] in the third boundary $P_{E3}$ by using a deviation $\Delta E$ to obtain the noise-reduced boundary $P_{E0}$. The noise-reduced boundary $P_{E0}$ is a sum of the third boundary $P_{E3}$ and the deviation $\Delta E$. The data decompression device 300 may store Table 6. Table 6 stores a correspondence between an input boundary value and a deviation $\Delta E$ and a correspondence between an input boundary value and an output boundary value of the third boundary $P_{E3}$. Taking R1=5 as an example, Table 6 may be expressed as follows:

TABLE 6

| | | | | | | | | | | | |
|---|---|---|---|---|---|---|---|---|---|---|---|
| Input boundary value | −5 | −4 | −3 | −2 | −1 | 0 | 1 | 2 | 3 | 4 | 5 |
| Deviation ΔE | 0 | 1 | 1 | 1 | 1 | 0 | −1 | −1 | −1 | −1 | 0 |
| Output boundary value | −5 | −3 | −2 | −1 | 0 | 0 | 0 | 1 | 2 | 3 | 5 |

The data decompression device 300 may directly obtain the noise-reduced boundary $P_{E0}$ based on Table 6.

S349. Superimpose the noise-reduced boundary $P_{E0}$ on the under-decompression-frame (that is, the decoded frame $P_2$) to obtain the decompressed frame $P_4$.

Because the boundary correction is targeted only at a boundary within a small range, a boundary beyond the second preset range and a non-boundary region are not corrected. Therefore, the decompressed frame $P_4$ may be expressed by using the following formula:

$$\begin{aligned} P_4 &= P_2 + P_{E0} \\ &= P_2 + P_{E3} + \Delta E \\ &\approx P_0' \cdot H_1(f) \cdot (1 + b(1 - H_2(f))) \\ &\approx P_0 \cdot H_1(f) \cdot (1 + b(1 - H_2(f))) \end{aligned} \quad \text{formula (8)}$$

Taking the video data as an example, because human eyes are relatively sensitive to information in the low-frequency to intermediate-frequency region, but $H_1(f)$ is designed only to attenuate the amplitude of the original frame in the low-frequency to intermediate-frequency region, while the encoding-spectrum-modulated frame is allowed to retain frequency information of all frequencies in the low-frequency to intermediate-frequency region in the original frame, the data $P_2$ in the decoded frame is basically consistent with the data $P_1$ in the encoding-spectrum-modulated frame, and therefore, the decoded frame also retains the frequency information of the low-frequency to intermediate-frequency region; however, in the decoding-spectrum-modulated frame, the components in the intermediate-frequency to high-frequency region are filtered out, and the frequency information in the low-frequency region is retained; therefore, the boundary of the under-decompression-frame obtained by using the difference between the decoded frame and the decoding-spectrum-modulated frame retains the frequency information of the intermediate-frequency region in the original frame; but in the noise-reduced boundary, only noise within a small range in the boundary of the under-decompression-frame is eliminated, and the boundary beyond the second preset range is not processed; therefore, theoretically, without considering a deviation caused by other algorithms, all the frequency information of the low-frequency to intermediate-frequency region in the original frame may be fully restored or basically restored in the decompressed frame obtained by superimposing the noise-reduced boundary on the decoded frame. In other words, the data decompression may restore or even enhance the data that undergoes the data compression at any frequency in the low-frequency to intermediate-frequency region. Therefore, after the data decompression, the amplitude of the decompressed frame at any frequency in the low-frequency to intermediate-frequency region should be approximately equal to or greater than that of the original frame. Being approximately equal refers to that the amplitude of the decompressed frame is equal to the amplitude of the original frame and fluctuates within an error range. Using the video data as an example, when the amplitude of the decompressed frame at any frequency in the low-frequency to intermediate-frequency region is restored to 85% or above 85% of that of the original frame, it is difficult for human eyes to perceive a difference between the decompressed frame and the original frame. Therefore, after the data decompression, the amplitude of the decompressed frame at any frequency in the low-frequency to intermediate-frequency region should not be less than 85% of that of the original frame. That is, the error range should not cause the amplitude of the decompressed frame at any frequency in the low-frequency to intermediate-frequency region to be less than 85% of that of the original frame. Because human eyes are relatively insensitive to information in the high-frequency region, the information in the high-frequency region may be retained in the decompressed frame to adapt to a scenario requiring high quality, or may be attenuated to suppress unnecessary high-frequency noise. A relationship between $P_0$ and $P_4$ may be expressed by using the following formula:

$$\begin{Bmatrix} P_4 \geq P_0, & (f \leq f_0) \\ P_4 < P_0, & (f > f_0) \end{Bmatrix} \quad \text{formula (9)}$$

or $$\begin{Bmatrix} P_4 \geq P_0, & (f \leq f_0) \\ P_4 \geq P_0, & (f > f_0) \end{Bmatrix} \quad \text{formula (10)}$$

It should be noted that an error range may be allowed in the formula. For example, for $P_4 \geq P_0$, in a case in which a basic value of $P_4$ is greater than or equal to $P_0$, $P_4$ may be allowed to fluctuate within an error range. That is, when $P_4 = P_0$, in a case in which $P_4$ has a negative error, $P_4$ may be allowed to be slightly less than $P_0$. Herein only a basic relationship between $P_4$ and $P_0$ is illustrated in the formulae, but no error is included the formulae. A person skilled in the art should know that a case in which the amplitude of the decompressed frame in the low-frequency to intermediate-frequency region is slightly less than that of the original frame due to a fluctuation within an error range also falls within the protection scope of this disclosure. In the following formulae, errors within an error range are also allowed. The following also provides only a description about the basic relationship that the amplitude of $P_4$ is greater than or equal to the amplitude of the original frame $P_0$. Fluctuations within the error range may be derived by a person skilled in the art.

For ease of description, a global spectrum modulation function between $P_0$ and $P_4$ is defined as $H_0(f)$. In this case, the relationship between $P_0$ and $P_4$ may be expressed by using the following formula:

$$P_4 = H_0(f) \cdot P_0 \quad \text{formula (11)}$$

In this case, the global spectrum modulation function $H_0(f)$ may be expressed by using the following formula:

$$\begin{Bmatrix} H_0(f) \geq 1, & (f \leq f_0) \\ H_0(f) < 1, & (f > f_0) \end{Bmatrix} \quad \text{formula (12)}$$

-continued or $$\begin{Bmatrix} H_0(f) \geq 1, & (f \leq f_0) \\ H_0(f) \geq 1, & (f > f_0) \end{Bmatrix} \quad \text{formula (13)}$$

In the formula, $f_0$ is a boundary value of a frequency to which human eyes are sensitive. For the video data, $f_0$ may be 0.33 or other values larger or smaller than 0.33. For different types of data, a value of $f_0$ may be different.

For $H_0(f)$ in the foregoing formulae (12) and (13), when $H_0(f)$ in a selected frequency domain interval is approximately equal to 1, data of the decompressed frame in the selected frequency domain interval may be restored to data of the original frame; or when $H_0(f)$ in a selected frequency domain interval is greater than 1, data of the decompressed frame in the selected frequency domain interval may be enhanced, that is, an amplitude of the decompressed frame in the selected region is higher than that of the original frame. For example, if the original frame is one frame in a video, as long as $H_0(f)$ in the selected frequency domain interval is greater than 1, a definition enhancement may be implemented. For ease of description, $H_0(f) \approx 1$ is defined as a normal mode, and $H_0(f) > 1$ is defined as an enhanced mode. The following describes the global spectrum modulation function $H_0(f)$ in detail by using the video data as an example.

Figure 12A:
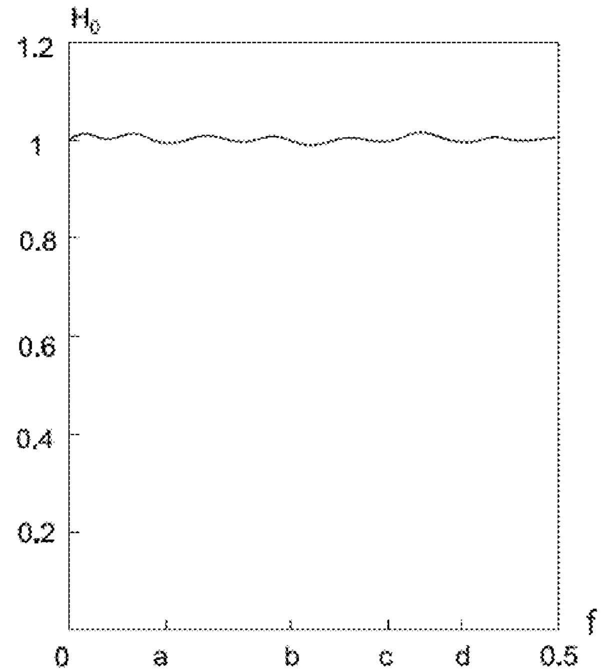
FIG. 12A is a graph of a global modulation function $H_0(f)$ according to some exemplary embodiments of this disclosure.
Figure 12B:
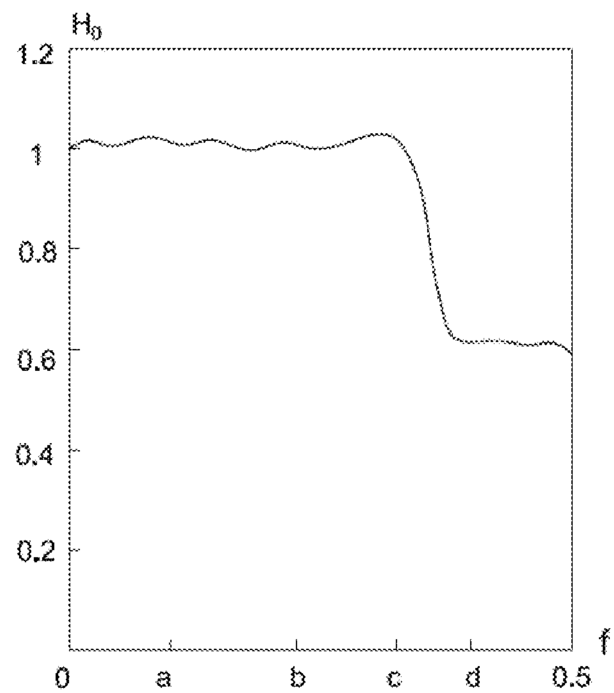
FIG. 12B is a graph of a global modulation function $H_0(f)$ according to some exemplary embodiments of this disclosure.
Figure 12C:
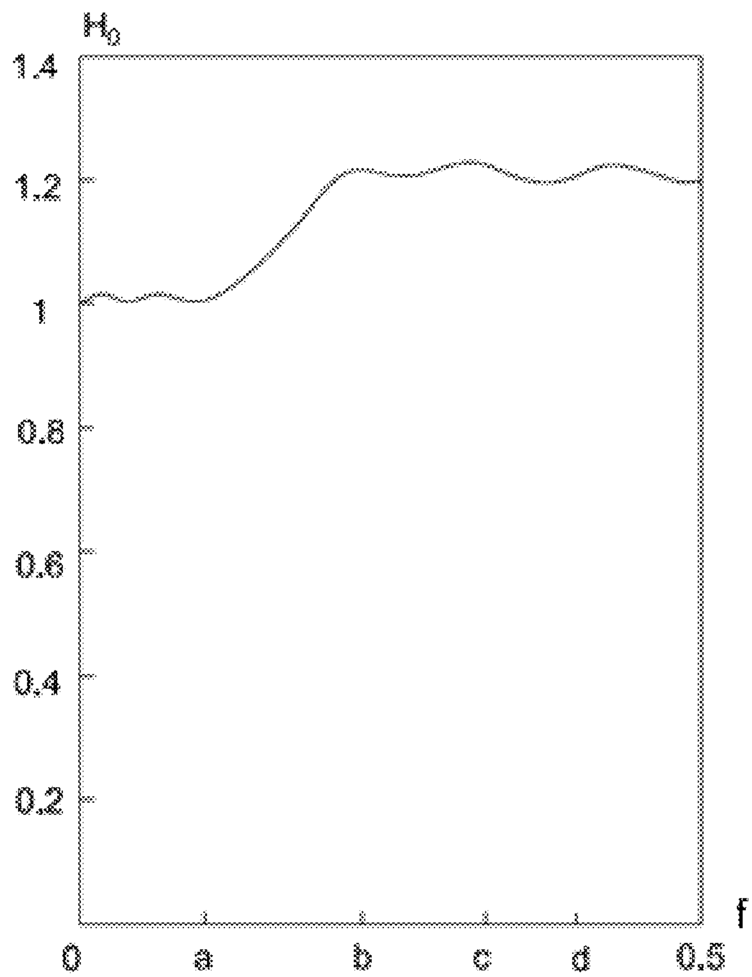
FIG. 12C is a graph of a global modulation function $H_0(f)$ according to some exemplary embodiments of this disclosure.
Figure 12D:
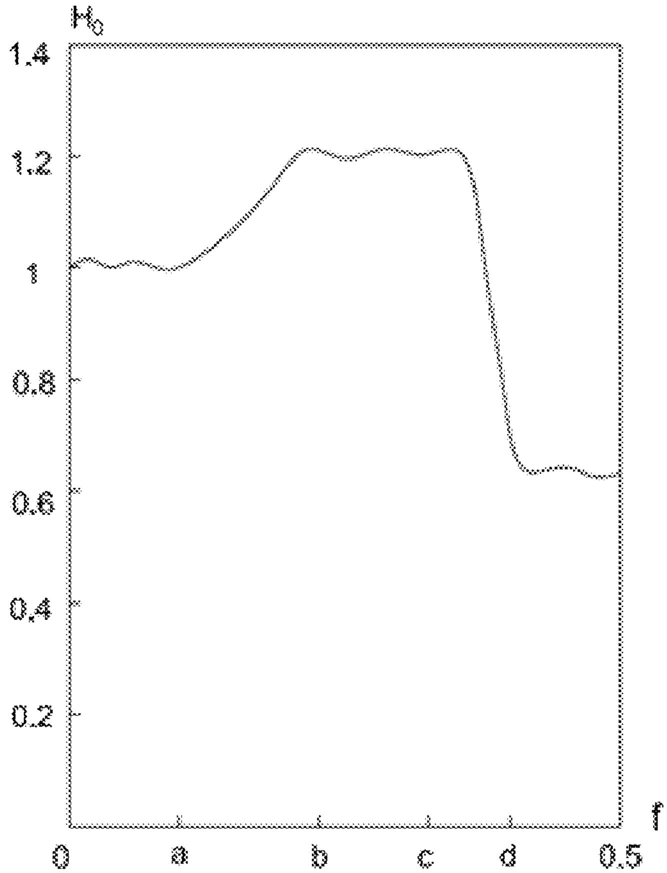
FIG. 12D is a graph of a global modulation function $H_0(f)$ according to some exemplary embodiments of this disclosure.
Figure 12E:
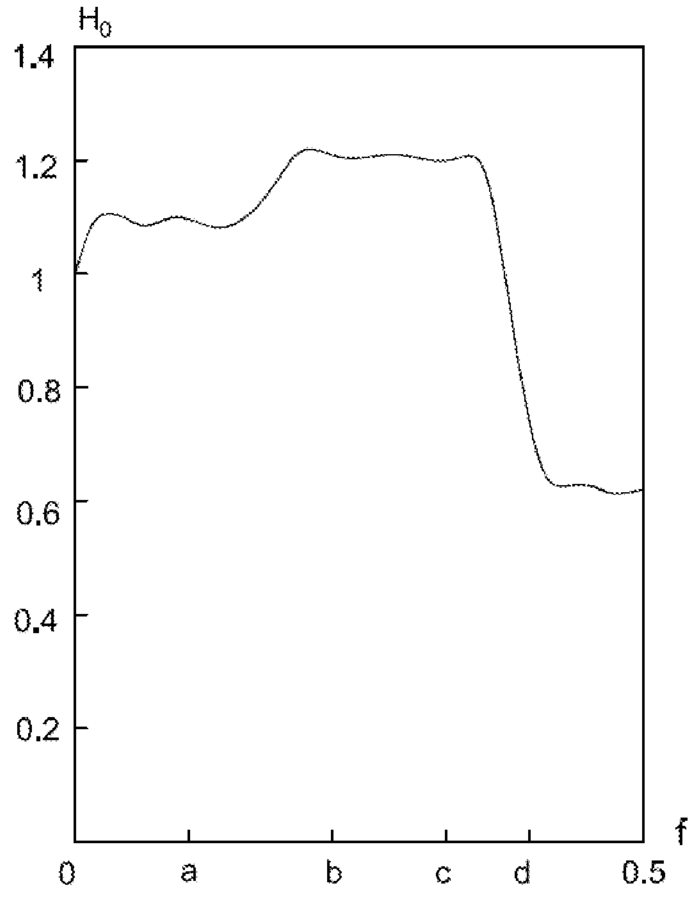
FIG. 12E is a graph of a global modulation function $H_0(f)$ according to some exemplary embodiments of this disclosure.

FIG. 12A is a graph of a global modulation function $H_0(f)$ according to some exemplary embodiments of this disclosure. FIG. 12B is a graph of a global modulation function $H_0(f)$ according to some exemplary embodiments of this disclosure. FIG. 12C is a graph of a global modulation function $H_0(f)$ according to some exemplary embodiments of this disclosure. FIG. 12D is a graph of a global modulation function $H_0(f)$ according to some exemplary embodiments of this disclosure. FIG. 12E is a graph of a global modulation function $H_0(f)$ according to some exemplary embodiments of this disclosure. As shown in FIG. 12A to FIG. 12E, a horizontal axis is a normalized frequency $f$, and a vertical axis is an amplitude modulation gain $H_0$ of the global spectrum modulation function $H_0(f)$. Curves in FIG. 12A to FIG. 12E represent different global spectrum modulation functions $H_0(f)$. A maximum value of the normalized frequency on the horizontal axis is 0.5. The normalized frequency $f$ on the horizontal axis may be divided into a low-frequency region, a medium-low-frequency region, an intermediate-frequency region, a medium-high-frequency region, and a high-frequency region. Frequencies within (0, a] are low frequencies; frequencies within (a, b] are medium-low frequencies; frequencies within (b, c] are intermediate frequencies; frequencies within (c, d] are medium-high frequencies; and frequencies within (d, 0.5] are high frequencies. For values of a, b, c, d, and e, reference may be made to FIG. 8A, and details are not described again herein.

Because human eyes are more sensitive to data in the low-frequency to intermediate-frequency region than data in the high-frequency region in the video data, after the data decompression, the information in the low-frequency to intermediate-frequency region in the decompressed frame relative to the original frame should be retained as much as possible without any loss. In other words, the global spectrum modulation function $H_0(f)$ should cause the amplitude of the decompressed frame in the low-frequency to intermediate-frequency region not to be less than 85% of that of the original frame, or may even enable the former to be greater than that of the original frame. Because human eyes are insensitive to the information in the high-frequency region, the amplitude of the decompressed frame in the high-frequency region may be selected according to different application scenarios. For example, in a scenario requiring low definition, the amplitude of the decompressed frame in the high-frequency region may be less than that of the original frame. In a reconnaissance scenario requiring high definition, the amplitude of the decompressed frame in the high-frequency region may be approximately equal to or greater than that of the original frame. As shown in FIG. 12A to FIG. 12E, an amplitude modulation gain $H_0$ of the global modulation function $H_0(f)$ at any frequency $f$ in the low-frequency to intermediate-frequency region (including the low-frequency region and intermediate-frequency region) is greater than 1 or approximately equal to 1, so that the amplitude of the decompressed frame after the decompression is not less than 85% of that of the original frame, and definition is restored or enhanced, thereby enhancing a visual effect. Being approximately equal to 1 herein may be fluctuating within an error range around to 1. The error range may be within an interval specified by any two values of 0, ±1%, ±2%, ±3%, ±4%, ±5%, ±6%, ±7%, ±8%, ±9%, ±10%, ±11%, ±12%, ±13%, ±14%, ±15%, and the like. For ease of description, the amplitude modulation gain of the global modulation function $H_0(f)$ in the high-frequency region is defined as a first amplitude modulation gain, the amplitude modulation gain in the intermediate-frequency region is defined as a second amplitude modulation gain, and the amplitude modulation gain in the low-frequency region is defined as a third amplitude modulation gain. The third amplitude modulation gain value, the second amplitude modulation gain value, and the first amplitude modulation gain value may fluctuate within the error range.

As shown in FIG. 12A, the third amplitude modulation gain value, the second amplitude modulation gain value, and the first amplitude modulation gain value of the global modulation function $H_0(f)$ in the low-frequency to high-frequency region are all approximately equal to 1, so that none of amplitudes of the decompressed frame in the low-frequency to high-frequency region is less than that of 85% of the original frame and data of the decompressed frame in the low-frequency to high-frequency region may be smoothly restored or basically restored to a state of the original frame.

As shown in FIG. 12B, the third amplitude modulation gain value and the second amplitude modulation gain value of the global modulation function $H_0(f)$ in the low-frequency to intermediate-frequency region are approximately equal to 1, so that data of the decompressed frame in the low-frequency to intermediate-frequency region may be smoothly restored or basically restored to a state of the original frame. The first amplitude modulation gain value of the global modulation function $H_0(f)$ in the high-frequency region is less than 1, so that the amplitude of the decompressed frame in the high-frequency region is smoothly decreased in comparison with that of the original frame, so as to suppress high-frequency noise. The smooth decrease of the amplitude may be that the amplitude is attenuated by the first amplitude modulation gain value, or that the amplitude is attenuated within an error range around the first amplitude modulation gain value. For example, the first amplitude modulation gain may be any value between 0 and 1. For example, the first amplitude modulation gain value may be within an interval specified by any two values of 0, 0.04, 0.08, 0.12, 0.16, 0.20, 0.24, 0.28, 0.32, 0.36, 0.40, 0.44, 0.48, 0.52, 0.56, 0.60, 0.64, 0.68, 0.72, 0.76, 0.80, 0.84, 0.88, 0.92, 0.96, and 1. As shown in FIG. 12B, the first amplitude modulation gain of the global modulation function $H_0(f)$ in the high-frequency region (probably within an interval of 0.4 to 0.5) is around 0.6. Both the second and third amplitude modulation gain values are around 1. The second and third amplitude modulation gain values may fluctuate within an error range. For example, the second and third amplitude modulation gain values may be within an interval specified by any two values of 0.85, 0.90, 0.95, 1, 1.05, 1.10, and 1.15.

As shown in FIG. 12C, the third amplitude modulation gain value of the global modulation function $H_0(f)$ in the low-frequency region is approximately equal to 1, so that data of the decompressed frame in the low-frequency region may be smoothly restored or basically restored to a state of the original frame. Both the second amplitude modulation gain value of the global modulation function $H_0(f)$ in the intermediate-frequency region and the first amplitude modulation gain value in the high-frequency region are greater than 1, so that the amplitude of the decompressed frame in the intermediate-frequency to high-frequency region is smoothly increased in comparison with that of the original frame and that definition of the data in the intermediate-frequency to high-frequency region is enhanced. The smooth increase of the amplitude may be that the amplitude is enhanced by the second amplitude modulation gain value and the first amplitude modulation gain value, or may be that the amplitude is enhanced within an error range around the second amplitude modulation gain value and the first amplitude modulation gain value. The second amplitude modulation gain value and the first amplitude modulation gain value may be approximately consistent, or the second amplitude modulation gain value may be greater than the first amplitude modulation gain value, or the second amplitude modulation gain value may be less than the first amplitude modulation gain value. In the curve shown in FIG. 12C, the second amplitude modulation gain value and the first amplitude modulation gain value are approximately consistent. The second amplitude modulation gain value and the first amplitude modulation gain value may be any values greater than 1. For example, the second amplitude modulation gain value and the first amplitude modulation gain value may be within an interval specified by any two values of 1, 1.1, 1.2, 1.3, 1.4, 1.5, 1.6, 1.7, 1.8, 1.9, 2, 2.1, 2.2, and 2.4. As shown in FIG. 12C, the second amplitude modulation gain and the first amplitude modulation gain of the global modulation function $H_0(f)$ in the intermediate-frequency to high-frequency region are around 1.2.

As shown in FIG. 12D, the third amplitude modulation gain value of the global modulation function $H_0(f)$ in the low-frequency region is approximately equal to 1, so that data of the decompressed frame in the low-frequency region may be smoothly restored or basically restored to a state of the original frame. The second amplitude modulation gain value of the global modulation function $H_0(f)$ in the intermediate-frequency region is greater than 1, so that the amplitude of the decompressed frame in the intermediate-frequency region is smoothly increased in comparison with that of the original frame and that definition of the data in the intermediate-frequency region is enhanced. The first amplitude modulation gain value of the global modulation function $H_0(f)$ in the high-frequency region is less than 1, so that the amplitude of the decompressed frame in the high-frequency region is smoothly decreased in comparison with that of the original frame and that an amount of data in the insensitive high-frequency region is reduced to suppress high-frequency noise. The curve shown in FIG. 12D may enhance definition while reducing the amount of data. The second amplitude modulation gain value may be any value greater than 1. The first amplitude modulation gain may be any value between 0 and 1. As shown in FIG. 12D, the second amplitude modulation gain of the global modulation function $H_0(f)$ in the intermediate-frequency region is around 1.2, and the first amplitude modulation gain in the high-frequency region is around 0.6.

As shown in FIG. 12E, the third amplitude modulation gain value of the global modulation function $H_0(f)$ in the low-frequency region is greater than 1, so that the amplitude of the decompressed frame in the low-frequency region is smoothly increased in comparison with that of the original frame. The second amplitude modulation gain value of the global modulation function $H_0(f)$ in the intermediate-frequency region is greater than 1, so that the amplitude of the decompressed frame in the intermediate-frequency region is smoothly increased in comparison with that of the original frame and that definition of the data in the low-frequency to intermediate-frequency region is enhanced. The second amplitude modulation gain value may be equal to the third amplitude modulation gain value, or may be greater than the third amplitude modulation gain value. In the curve shown in FIG. 12E, the second amplitude modulation gain value is greater than the third amplitude modulation gain value, so that the increase of the amplitude of the decompressed frame in the intermediate-frequency region is greater than the increase of the amplitude of the decompressed frame in the low-frequency region. Therefore, definition of the intermediate-frequency region to which human eyes are most sensitive is enhanced, and the visual effect is enhanced. The first amplitude modulation gain value of the global modulation function $H_0(f)$ in the high-frequency region is less than 1, so that the amplitude of the decompressed frame in the high-frequency region is smoothly decreased in comparison with that of the original frame and that an amount of data in the insensitive high-frequency region is reduced to suppress high-frequency noise. The curve shown in FIG. 12E may enhance definition while reducing the amount of data. The third amplitude modulation gain value may be a value slightly greater than 1. For example, the third amplitude modulation gain value may be within an interval specified by any two values of 1, 1.04, 1.08, 1.12, 1.16, and 1.2. The second amplitude modulation gain value may be any value greater than the third amplitude modulation gain. For example, the second amplitude modulation gain value and the first amplitude modulation gain value may be within an interval specified by any two values of 1, 1.1, 1.2, 1.3, 1.4, 1.5, 1.6, 1.7, 1.8, 1.9, 2, 2.1, 2.2, and 2.4. The first amplitude modulation gain may be any value between 0 and 1. For example, the first amplitude modulation gain value may be within an interval specified by any two values of 0, 0.04, 0.08, 0.12, 0.16, 0.20, 0.24, 0.28, 0.32, 0.36, 0.40, 0.44, 0.48, 0.52, 0.56, 0.60, 0.64, 0.68, 0.72, 0.76, 0.80, 0.84, 0.88, 0.92, 0.96, and 1. As shown in FIG. 12E, the third amplitude modulation gain of the global modulation function $H_0(f)$ in the low-frequency region is around 1.1, the second amplitude modulation gain in the intermediate-frequency region is around 1.2, and the first amplitude modulation gain in the high-frequency region is around 0.6.

Further, when the high-frequency region is not connected to the intermediate-frequency region, the global spectrum modulation function $H_0(f)$ may further modulate the amplitude in the high-frequency region, so that a change of an amplitude modulation gain in the medium-high-frequency region may be smooth and continuous.

Further, when the intermediate-frequency region is not connected to the low-frequency region, the global spectrum modulation function $H_0(f)$ may further modulate an amplitude in the medium-low-frequency region, so that a change of an amplitude modulation gain in the medium-low-frequency region may be continuous.

The curve of the global modulation function $H_0(f)$ may be a smooth curve. In engineering implementation, on a basis that the amplitude of the decompressed frame in the low-frequency to intermediate-frequency region is approximately equal to or greater than that of the original frame, the curve of the global modulation function $H_0(f)$ may be allowed to fluctuate within a small range, and the fluctuation has no impact on a decompression effect. For other forms of data than video data, parameters of the global modulation function $H_0(f)$ may be set according to a receiver's sensitivity to the data. For different forms of data, the receiver's sensitivity to frequencies may also be different.

For ease of description, the case shown in the formula (13) is used as an example for description. With reference to the formula (8) and the formula (13), the decompressed frame $P_4$ may be expressed by using the following formula:

$$\left\{\begin{matrix} P_4 \approx P_0 \cdot H_1(f) \cdot (1 + b(1 - H_2(f))) \geq P_0, & (f \leq f_0) \\ P_4 \approx P_0 \cdot H_1(f) \cdot (1 + b(1 - H_2(f))) \geq P_0, & (f > f_0) \end{matrix}\right\} \quad \text{formula (14)}$$

In this case, the relationship between the encoding spectrum modulation function $H_1(f)$ corresponding to the encoding convolution kernel and the decoding spectrum modulation function $H_2(f)$ corresponding to the decoding convolution kernel may be expressed by using the following formula:

$$\left\{\begin{matrix} H_0(f) \approx H_1(f) \cdot (1 + b(1 - H_2(f))) \geq 1, & (f \leq f_0) \\ H_0(f) \approx H_1(f) \cdot (1 + b(1 - H_2(f))) \geq 1, & (f > f_0) \end{matrix}\right\} \quad \text{formula (15)}$$

Therefore, the relationship between $H_1(f)$ and $H_2(f)$ may be expressed by using the following formula:

$$\left\{\begin{matrix} 1 \geq H_1(f) \geq \dfrac{1}{1 + b(1 - H_2(f))}, & (f \leq f_0) \\ H_1(f) \geq \dfrac{1}{1 + b(1 - H_2(f))}, & (f > f_0) \end{matrix}\right\} \quad \text{formula (16)}$$

In the decoding spectrum modulation function $H_2(f)$, except the amplitude modulation gain 1 of the part with the frequency 0, amplitude modulation gains at all frequencies are less than 1. Therefore, a value of $1/(1+b(1-H_2(f)))$ is less than 1 at all other frequencies than the frequency 0. Therefore, the formula (16) can ensure that the amplitude modulation gain of the part with the frequency 0 in the encoding spectrum modulation function $H_1(f)$ is 1 and that amplitude modulation gains corresponding to other frequencies are less than 1.

As described above, if the original frame is convolved in a plurality of directions, the decoded frame may also be convolved in a plurality of directions, and convolution directions and orders of the decoded frame are opposite to the convolution directions and orders of the original frame. That is, if the original frame is first convolved in the vertical direction and then convolved in the horizontal direction, the decoded frame is first convolved in the horizontal direction and then convolved in the vertical direction. It should be noted that the decoded frame needs to be first convolved in the horizontal direction to obtain compensation information in the horizontal direction, and after the compensation information of the decoded frame in the horizontal direction is then superimposed on the decoded frame, the decoded frame is convolved in the vertical direction to obtain compensation information in the vertical direction, and the compensation information of the decoded frame in the vertical direction is superimposed on the decoded frame.

Figure 13A:
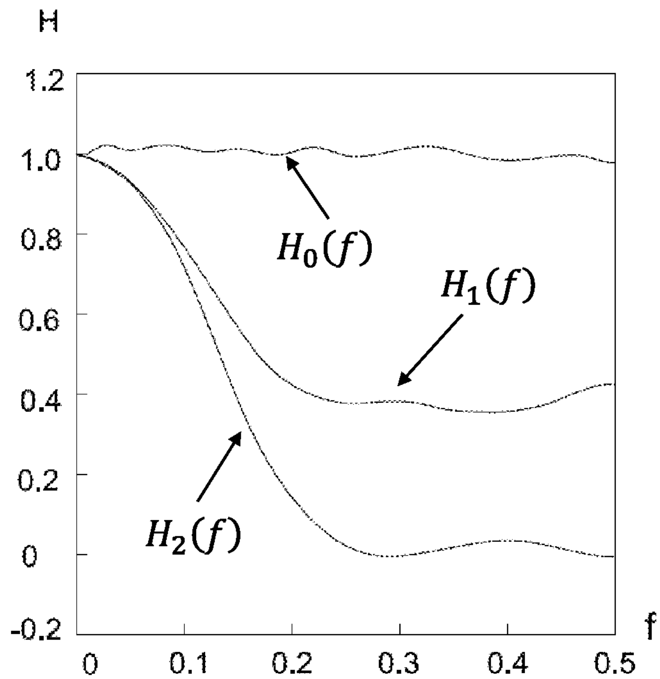
FIG. 13A is a graph of curves of a global modulation function $H_0(f)$, an encoding spectrum modulation function $H_1(f)$, and a decoding spectrum modulation function $H_2(f)$ in normal mode according to some exemplary embodiments of this disclosure.
Figure 13B:
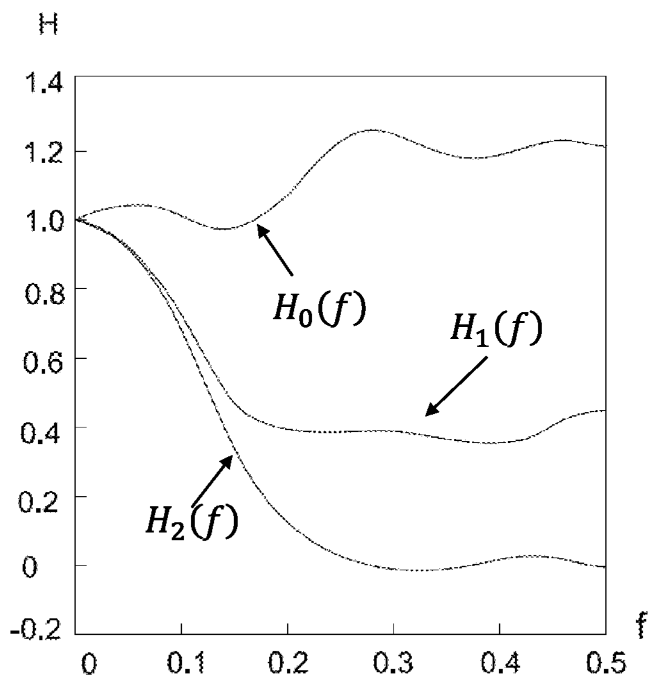
FIG. 13B is a graph of curves of a global modulation function $H_0(f)$, an encoding spectrum modulation function $H_1(f)$, and a decoding spectrum modulation function $H_2(f)$ in enhanced mode according to some exemplary embodiments of this disclosure.

FIG. 13A is a graph of curves of a global modulation function $H_0(f)$, an encoding spectrum modulation function $H_1(f)$, and a decoding spectrum modulation function $H_2(f)$ in a normal mode according to some exemplary embodiments of this disclosure. FIG. 13B is a graph of curves of a global modulation function $H_0(f)$, an encoding spectrum modulation function $H_1(f)$, and a decoding spectrum modulation function $H_2(f)$ in an enhanced mode according to some exemplary embodiments of this disclosure. Encoding convolution kernels and decoding convolution kernels used in FIG. 13A and FIG. 13B are the same, and adjustment coefficients b are the same. In FIG. 13A and FIG. 13B, b=1.5 is used as an example for description. As shown in FIG. 13A and FIG. 13B, a horizontal axis is a normalized frequency $f$, and a vertical axis is an amplitude modulation gain H. As shown in FIG. 13A, the global spectrum modulation function $H_0(f)$ in any frequency region is approximately equal to 1; and the global spectrum modulation function $H_0(f)$ performs spectrum modulation on the superimposed decompressed frame in the normal mode, that is, information of all frequencies is fully retained in the global spectrum modulation function $H_0(f)$, and data in the decompressed frame may be basically restored to the data in the original frame. As shown in FIG. 13B, the global spectrum modulation function $H_0(f)$ in the low-frequency region is approximately equal to 1; and the global spectrum modulation function $H_0(f)$ in the intermediate-frequency to high-frequency region is greater than 1. The global spectrum modulation function $H_0(f)$ performs spectrum modulation in the enhanced mode on the intermediate-frequency to high-frequency region in the decompressed frame, that is, the global spectrum modulation function $H_0(f)$ enhances information in the intermediate-frequency to high-frequency region. The data in the intermediate-frequency to high-frequency region in the decompressed frame is enhanced in comparison with the data in the intermediate-frequency to high-frequency region in the original frame. It should be noted that the curves shown in FIG. 13A and FIG. 13B are only exemplary illustrations. A person skilled in the art should understand that the curves of $H_0(f)$, $H_1(f)$, and $H_2(f)$ are not limited to the forms shown in FIG. 13A and FIG. 13B. All curves of $H_0(f)$, $H_1(f)$, and $H_2(f)$ that comply with the formula (15) fall within the protection scope of this disclosure. It should be noted that any linear combination of decoding spectrum modulation functions $$H_2(f)=\Sigma_{i=1}^{n}k_iH_{2i}(f)$$

or product combination of encoding spectrum modulation functions $$H_2(f)=\Pi_{j=1}^{n}k_jH_{2j}(f),$$

or a combination of a linear combination and a product combination that complies with the formula (15) falls within the scope of this disclosure, where $$i\geq 1,\ H_2(f)=\Sigma_{i=1}^{n}k_iH_{2i}(f)$$

represents a linear combination of n functions, $H_{2i}(f)$ represents an ith function, $k_i$ represents a weight corresponding to the ith function, $$j\geq 1,\ H_2(f)=\Pi_{j=1}^{n}k_jH_{2j}(f)$$

represents a product combination of the n functions, $k_j$ represents a weight corresponding to a jth function, and $H_{2j}(f)$ may be any function.

Table 7 is a parameter table of a decoding convolution kernel according to some exemplary embodiments of this disclosure. Table 7 exemplarily lists parameters of a decoding convolution kernel. All the parameters of the decoding convolution kernel are non-negative, so that a ringing effect of data convolved by the decoding convolution kernel is avoided. Table 7 is only an exemplary illustration. A person skilled in the art would know that the decoding convolution kernel is not limited to the parameters shown in Table 7. All decoding convolution kernels that satisfy the foregoing requirement fall within the protection scope of this disclosure.

TABLE 7

| | | | | | | |
|---|---|---|---|---|---|---|
| Decoding convolution kernel | 1 | 1 | 1 | 1 | 1 | 1 |

Table 8 is a parameter table of an encoding convolution kernel in a normal mode according to some exemplary embodiments of this disclosure. Table 8 exemplarily lists parameters of an encoding convolution kernel in the normal mode. The encoding convolution kernel in the normal mode is obtained by performing a Fourier transform on an encoding spectrum modulation function $H_1(f)$ obtained based on the global spectrum modulation function $H_0(f)$ in the normal mode and the decoding spectrum modulation function $H_2(f)$ corresponding to the parameter table of the decoding convolution kernel shown in Table 7, that is, the encoding spectrum modulation function $H_1(f)$ is obtained based on a correspondence thereof to $H_0(f)=1$. The data compression device 200 and the data decompression device 300 use the encoding convolution kernel in the normal mode shown in Table 8 and the decoding convolution kernel shown in Table 7, so that the data of the decoded frame can be basically consistent with the data of the original frame. Table 8 is only an exemplary illustration. A person skilled in the art should know that the encoding convolution kernel in the normal mode is not limited to the parameters shown in Table 8. All encoding convolution kernels that satisfy the foregoing requirement fall within the protection scope of this disclosure.

TABLE 8

| | | | | | | | | | |
|---|---|---|---|---|---|---|---|---|---|
| Encoding convolution kernel | 6 | 8 | 23 | 26 | 130 | 26 | 23 | 8 | 6 |

Table 9 is a parameter table of an encoding convolution kernel in the enhanced mode according to some exemplary embodiments of this disclosure. The encoding convolution kernel in the enhanced mode is obtained by performing a Fourier transform on an encoding spectrum modulation function $H_1(f)$ obtained based on the global spectrum modulation function $H_0(f)$ in the enhanced mode and the decoding spectrum modulation function $H_2(f)$ corresponding to the parameter table of the decoding convolution kernel shown in Table 7, that is, the encoding spectrum modulation function $H_1(f)$ is obtained in a correspondence to $H_0(f)>1$. The data compression device 200 may use the encoding convolution kernel in the enhanced mode shown in Table 9 and the decoding convolution kernel shown in Table 7 to enhance the data of the superimposed frame. Table 9 is only an exemplary illustration. A person skilled in the art should know that the encoding convolution kernel in the enhanced mode is not limited to the parameters shown in Table 9. All encoding convolution kernels that satisfy the foregoing requirement fall within the protection scope of this disclosure.

TABLE 9

| | | | | | | | | | |
|---|---|---|---|---|---|---|---|---|---|
| Encoding convolution kernel | 8 | 10 | 24 | 23 | 126 | 23 | 24 | 10 | 8 |

It should be noted that normalization processing may need to be performed after the convolution operation, so that a grayscale value of an image after the convolution operation is between 0 and 255.

It should be noted that in a case of a high bitrate, noise in the decompressed frame is low, and therefore, the foregoing boundary correction may not be performed. In a case of a low bitrate, or in the enhanced mode, that is, in $H_0(f)>1$ mode, an excessive enhancement may cause noise in the decompressed frame, which has impact on the visual effect. The boundary correction may be performed on the boundary of the under-decompression-frame to obtain the decompressed frame to effectively eliminate noise.

Figure 14A:
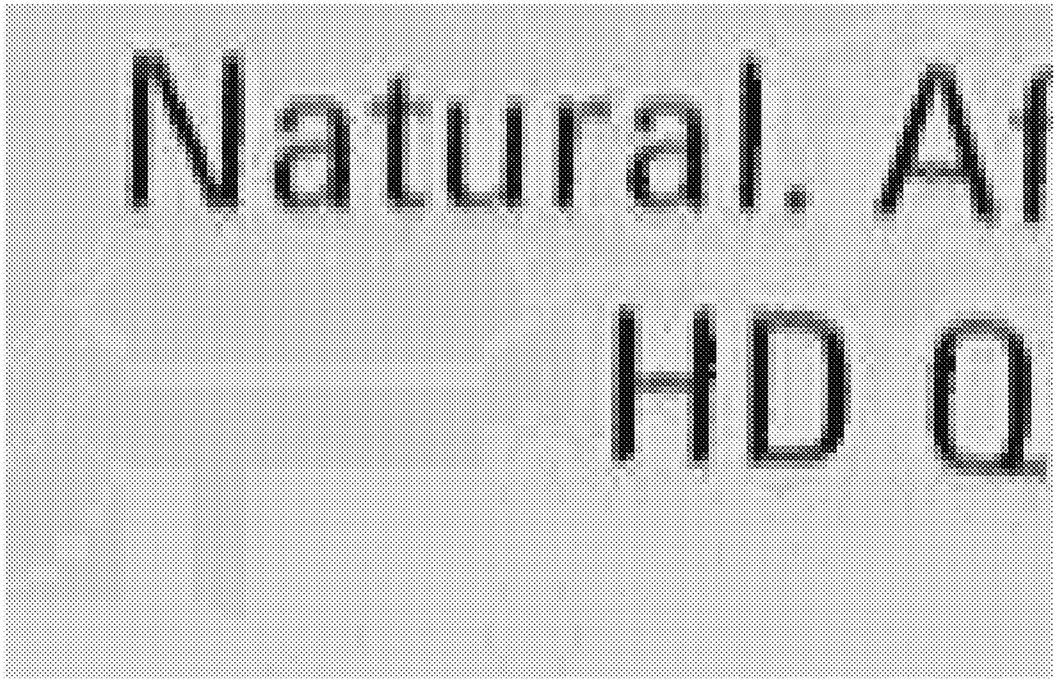
FIG. 14A is an exemplary diagram of a decompressed image without a boundary correction according to some exemplary embodiments of this disclosure.

FIG. 14A is an exemplary diagram of a decompressed image without a boundary correction according to some exemplary embodiments of this disclosure.

Figure 14B:
FIG. 14B is an exemplary diagram of a decompressed image with a boundary correction according to some exemplary embodiments of this disclosure.

FIG. 14B is an exemplary diagram of a decompressed image with a boundary correction according to some exemplary embodiments of this disclosure. By comparing FIG. 14A with FIG. 14B, it is found that the boundary correction method in this disclosure may effectively eliminate noise.

In summary, when compressing the original data, the data processing system 100 provided in this disclosure performs the method P200 by using the data compression device 200, and adjusts a boundary within a small range in the original frame in the original data by using the first gamma algorithm, thereby avoiding a loss of boundary information with a small difference between adjacent pixels during the data compression and avoiding a loss of details. In addition, in the method P200, encoding spectrum modulation is performed on the original frame by using an encoding convolution kernel, so that the amplitude of the original frame in the low-frequency to high-frequency region in the frequency domain is smoothly decreased, thereby reducing the data information in the original frame, improving encoding efficiency, reducing a compressed data volume, and improving data compression efficiency and data transmission efficiency. When decompressing the compressed frame, the data processing system 100 provided in this disclosure performs the method P300 by using the data decompression device 300, performs decoding spectrum modulation on the compressed frame by using the decoding convolution kernel, performs spectrum modulation on the compressed frame by using a smoothly transitioned decoding spectrum modulation function $H_2(f)$, filters out components in the intermediate-frequency to high-frequency region in the compressed frame, then calculates the difference between the compressed frame and the compressed frame that undergoes the decoding spectrum modulation to obtain the boundary information of the original frame, weakens a boundary within a small range in the boundary information of the original frame by using the second gamma algorithm to eliminate noise in the boundary, and superimposes the noise-reduced boundary information on the decoded frame to obtain the decompressed frame. The decoding convolution kernel corresponding to the decoding spectrum modulation function $H_2(f)$ corresponds to the encoding convolution kernel, and all coefficients are non-negative, or the ratio of the absolute value of the sum of negative coefficients to the sum of non-negative coefficients is less than 0.1. In this way, noise is effectively avoided, and the decompressed frame is clearer. The method and system may improve the data compression efficiency, improve transmission efficiency, and avoid the loss of details, while improving the definition of the decompressed data and effectively eliminating noise.

In addition, this disclosure provides a non-transitory storage medium. The non-transitory storage medium stores at least one set of executable instructions for data processing. When the executable instructions are executed by a processor, the executable instructions instruct the processor to implement steps of the data processing method P200. In some possible implementations, each aspect of this disclosure may be further implemented in a form of a program product, where the program product includes program code. When the program product operates on the data compression device 200, the program code is used to enable the data compression device 200 to perform the data processing steps described in this disclosure. The program product for implementing the foregoing method may use a portable compact disc read-only memory (CD-ROM) and include program code. In addition, the program product may run on the data compression device 200, for example, run on a personal computer. However, the program product in this disclosure is not limited thereto. In this disclosure, a readable storage medium may be any tangible medium containing or storing a program, and the program may be used by or in combination with an instruction execution system (for example, the compression processor 220). The program product may use any combination of one or more readable media. The readable medium may be a readable signal medium or a readable storage medium. For example, the readable storage medium may be but is not limited to an electronic, magnetic, optical, electromagnetic, infrared, or semi-conductor system, apparatus, or device, or any combination thereof. More specific examples of the readable storage medium include: an electrical connection with one or more conducting wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination thereof. The computer-readable storage medium may include a data signal propagated in a baseband or as part of a carrier, where the data signal carries readable program code. The propagated data signal may be in a plurality of forms, including but not limited to an electromagnetic signal, an optical signal, or any appropriate combination thereof. Alternatively, the readable storage medium may be any readable medium other than the readable storage medium. The readable medium may send, propagate, or transmit a program to be used by or in combination with an instruction execution system, apparatus, or device. The program code contained in the readable storage medium may be transmitted by using any appropriate medium, including but not limited to wireless, wired, optical cable, RF, or the like, or any appropriate combination thereof. The program code for performing operations in this disclosure may be compiled in any combination of one or more programming languages. The programming languages include object-oriented programming languages such as Java and C++, and further include conventional procedural programming languages such as a "C" language or the like. The program code may be fully executed on the data compression device 200, partially executed on the data compression device 200, executed as an independent software package, partially executed on the data compression device 200 and partially executed on a remote computing device, or fully executed on a remote computing device. In a case in which a remote computing device is used, the remote computing device may be connected to the data compression device 200 through the transmission medium 120, or may be connected to an external computing device.

Specific embodiments of this disclosure have been described above. Other embodiments also fall within the scope of the appended claims. In some cases, actions or steps described in the claims may be performed in an order different from orders in the exemplary embodiments and still achieve expected results. In addition, the processes depicted in the drawings do not necessarily require a specific order or sequence to achieve the expected results. In some implementations, multitask processing and parallel processing are also possible or may be advantageous.

In summary, after reading this detailed disclosure, a person skilled in the art may understand that the foregoing detailed disclosure may be presented by using examples only, and may not be restrictive. A person skilled in the art may understand that this disclosure is intended to cover various reasonable changes, improvements, and modifications to the embodiments, although this is not stated herein. These changes, improvements, and modifications are intended to be made in this disclosure and are within the spirit and scope of the exemplary embodiments of this disclosure.

In addition, some terms in this disclosure have been used to describe the embodiments of this disclosure. For example, "one embodiment", "an embodiment", and/or "some exemplary embodiments" refer to/refers to that a specific feature, structure, or characteristic described with reference to the embodiment(s) may be included in at least one embodiment of this disclosure. Therefore, it can be emphasized and should be understood that in various parts of this disclosure, two or more references to "an embodiment" or "one embodiment" or "an alternative embodiment" do not necessarily all refer to the same embodiment. Further, specific features, structures, or characteristics may be appropriately combined in one or more embodiments of this disclosure.

It should be understood that in the foregoing description of the embodiments of this disclosure to help understand one feature and for the purpose of simplifying this disclosure, various features in this disclosure are combined in a single embodiment, single drawing, or description thereof. However, this does not mean that the combination of these features is necessary. It is entirely possible for a person skilled in the art to extract some of the features as a separate embodiment for understanding when reading this disclosure. In other words, an embodiment of this disclosure may also be understood as the integration of a plurality of sub-embodiments. It is also true when content of each sub-embodiment is less than all features of a single embodiment disclosed above.

Each patent, patent application, patent application publication, and other materials cited herein, such as articles, books, disclosures, publications, documents, and materials, can be incorporated herein by reference, which are applicable to all content used for all purposes, except for any history of prosecution documents associated therewith, any identical, or any identical prosecution document history, which may be inconsistent or conflicting with this document, or any such subject matter that may have a restrictive effect on the broadest scope of the claims associated with this document now or later. For example, if there is any inconsistency or conflict in descriptions, definitions, and/or use of a term associated with this document and descriptions, definitions, and/or use of the term associated with any material, the term in this document shall prevail.

Finally, it should be understood that the implementation solutions disclosed herein illustrate the principles of the implementation solutions of this disclosure. Other modified embodiments also fall within the scope of this disclosure. Therefore, the embodiments disclosed in this disclosure are merely exemplary and not restrictive. A person skilled in the art may use alternative configurations to implement the application in this disclosure according to the embodiments of this disclosure. Therefore, the embodiments of this disclosure are not limited to those embodiments precisely described in this disclosure.

What is claimed is:

1. A data processing method, comprising:

obtaining compressed data including a compressed frame obtained by performing data compression on an original frame; and performing data decompression on the compressed frame to obtain a decompressed frame, including:

performing decoding spectrum modulation and a boundary correction on an under-decompression-frame, wherein the under-decompression-frame includes the compressed frame and any data state during the data decompression before obtaining the decompressed frame, the decoding spectrum modulation includes using a decoding convolution kernel to convolve the under-decompression-frame so as to smoothly decrease an amplitude of the under-decompression-frame in a frequency domain to filter out a component in a region of intermediate-frequency to high-frequency, the decoding spectrum modulation has a preset association relationship with an encoding spectrum modulation, and the boundary correction includes correcting a boundary whose boundary value is within a second preset range in a boundary of the under-decompression-frame by using a second gamma algorithm to reduce noise.

2. The data processing method according to claim 1, wherein the second gamma algorithm includes a gamma algorithm with a gamma value of greater than 1, so that the boundary whose boundary value is within the second preset range in the boundary of the under-decompression-frame is weakened.

3. The data processing method according to claim 1, wherein the performing of the data decompression on the compressed frame includes:

performing the decoding spectrum modulation on the under-decompression-frame to obtain a decoding-spectrum-modulated frame;

determining a difference between the under-decompression-frame and the decoding-spectrum-modulated frame to obtain a third boundary, wherein the third boundary is a boundary of the under-decompression-frame and includes boundary information of the original frame;

weakening a boundary whose boundary value is within the second preset range in the third boundary by using the second gamma algorithm to perform noise reduction on the third boundary and obtain a noise-reduced boundary; and superimposing the noise-reduced boundary on the under-decompression-frame to obtain the decompressed frame.

4. The data processing method according to claim 3, wherein prior to the obtaining of the noise-reduced boundary, the performing of the data decompression on the compressed frame includes:

enhancing the third boundary by using a second coefficient, wherein the second coefficient is any number greater than 1, and the third boundary includes a boundary enhanced by using the second coefficient.

5. The data processing method according to claim 3, wherein the weakening of the boundary whose boundary value is within the second preset range in the third boundary by using the second gamma algorithm to perform the noise reduction on the third boundary and obtain the noise-reduced boundary includes:

adjusting the third boundary by using a third adjustment function to obtain a fourth boundary, so that a component of the third boundary in a region of low-frequency in the frequency domain is retained, but a component of the third boundary in the region of intermediate-frequency to high-frequency is filtered out; and weakening a boundary whose boundary value is within the second preset range in the fourth boundary by using the second gamma algorithm.

6. The data processing method according to claim 3, wherein prior to the performing of the decoding spectrum modulation on the under-decompression-frame to obtain the decoding-spectrum-modulated frame, the performing of the data decompression on the compressed frame further includes:

decoding the compressed frame to obtain a decoded frame, wherein the under-decompression-frame includes the decoded frame.

7. The data processing method according to claim 1, wherein the data compression includes the encoding spectrum modulation;

the encoding spectrum modulation includes using an encoding convolution kernel to convolve an under-compression-frame to smoothly decrease an amplitude of the under-compression-frame in a region of intermediate-frequency in the frequency domain;

the under-compression-frame includes the original frame and any data state during the data compression prior to obtaining the compressed frame; and the decoding convolution kernel corresponds to the encoding convolution kernel.

8. A data processing system, comprising:

at least one storage medium storing a set of instructions for data processing; and at least one processor in communication with the at least one storage medium, wherein during operation, the at least one processor executes the set of instructions to:

obtain compressed data including a compressed frame obtained by performing data compression on an original frame; and perform data decompression on the compressed frame to obtain a decompressed frame, including:

performing decoding spectrum modulation and a boundary correction on an under-decompression-frame, wherein the under-decompression-frame includes the compressed frame and any data state during the data decompression before obtaining the decompressed frame, the decoding spectrum modulation includes using a decoding convolution kernel to convolve the under-decompression-frame so as to smoothly decrease an amplitude of the under-decompression-frame in a frequency domain to filter out a component in a region of intermediate-frequency to high-frequency, the decoding spectrum modulation has a preset association relationship with an encoding spectrum modulation, and the boundary correction includes correcting a sub-boundary whose boundary value is within a second preset range in a boundary of the under-decompression-frame by using a second gamma algorithm to reduce noise.

* * * * *